US012636130B2

(12) United States Patent
Marshall et al.

(10) Patent No.: US 12,636,130 B2
(45) Date of Patent: May 26, 2026

(54) TOOLS AND AUTOMATION FOR TOOTH SETUP

(71) Applicant: Voyager Dental, Inc., Minneapolis, MN (US)

(72) Inventors: Michael C. Marshall, Edina, MN (US); Bruce Willard Hultgren, Victoria, MN (US)

(73) Assignee: Voyager Dental, Inc., Minneapolis, MN (US)

( * ) Notice: Subject to any disclaimer, the term of this patent is extended or adjusted under 35 U.S.C. 154(b) by 217 days.

(21) Appl. No.: 17/876,090

(22) Filed: Jul. 28, 2022

(65) Prior Publication Data

US 2023/0035538 A1        Feb. 2, 2023

Related U.S. Application Data

(60) Provisional application No. 63/226,653, filed on Jul. 28, 2021.

(51) Int. Cl.
| | |
|---|---|
| *A61C 9/00* | (2006.01) |
| *A61C 13/34* | (2006.01) |
| *G06T 19/20* | (2011.01) |

(52) U.S. Cl.
CPC ............ *A61C 9/0053* (2013.01); *A61C 13/34* (2013.01); *G06T 19/20* (2013.01);
(Continued)

(58) Field of Classification Search
CPC ....... A61C 7/002; A61C 9/0053; A61C 13/34; G06T 19/20; G06T 2200/24; G06T 2210/41; G06T 2219/2004
See application file for complete search history.

(56) References Cited

U.S. PATENT DOCUMENTS

| | | | | | |
|---|---|---|---|---|---|
| 5,683,243 | A | * | 11/1997 | Andreiko ................. | A61C 7/16 |
| | | | | | 433/24 |
| 5,879,158 | A | * | 3/1999 | Doyle .................. | A61C 9/0053 |
| | | | | | 433/24 |

(Continued)

FOREIGN PATENT DOCUMENTS

WO        WO 2016/210323        12/2016

OTHER PUBLICATIONS

International Search Report and Written Opinion in International Appln. No. PCT/US2022/038686, mailed on Dec. 2, 2022, 13 pages.

*Primary Examiner* — Nicholas D Lucchesi
*Assistant Examiner* — Hao D Mai
(74) *Attorney, Agent, or Firm* — Barnes & Thornburg LLP

(57)        ABSTRACT

In one implementation, method includes receiving, by a computing system, a digital representation of the patient's jaw movement, receiving a digital model of at least a portion of the patient's upper and lower teeth, receiving user input indicating selection of at least a first tooth in the digital model as moveable, at least a second tooth as fixed, and at least a third tooth as ignored, moving the at least portion of the upper teeth and the lower teeth along movement pathways indicated by the digital representation of jaw movement, and automatically adjusting a position of the selected first tooth based on detecting the position of the selected at least first tooth as colliding or interfering with one or more other teeth represented by the digital model along one of the movement pathways.

24 Claims, 30 Drawing Sheets

(52) U.S. Cl.
CPC ...... *G06T 2200/24* (2013.01); *G06T 2210/41*
(2013.01); *G06T 2219/2004* (2013.01)

(56) References Cited

U.S. PATENT DOCUMENTS

| | | | |
|---|---|---|---|
| 2002/0064748 A1* | 5/2002 | Chishti | .................. G16H 50/50 |
| | | | 433/24 |
| 2002/0072027 A1* | 6/2002 | Chishti | .................... A61C 7/00 |
| | | | 433/24 |
| 2004/0029068 A1* | 2/2004 | Sachdeva | .............. G16H 50/50 |
| | | | 433/24 |
| 2008/0057466 A1* | 3/2008 | Jordan | ................. A61C 9/0046 |
| | | | 433/69 |
| 2010/0145898 A1* | 6/2010 | Malfliet | .............. A61B 6/5247 |
| | | | 703/1 |
| 2013/0073265 A1* | 3/2013 | Kraemer | .............. A61C 19/045 |
| | | | 703/1 |
| 2013/0151208 A1* | 6/2013 | Ito | ........................... G06F 30/20 |
| | | | 703/1 |
| 2014/0294273 A1* | 10/2014 | Jaisson | .................. A61C 7/002 |
| | | | 382/131 |
| 2014/0329194 A1* | 11/2014 | Sachdeva | .............. A61C 7/002 |
| | | | 433/24 |
| 2016/0175076 A1 | 6/2016 | Hultgren et al. | |
| 2019/0175303 A1* | 6/2019 | Akopov | ................. A61C 7/002 |
| 2019/0290408 A1 | 9/2019 | Fisker et al. | |
| 2020/0000554 A1* | 1/2020 | Makarenkova | ........ G16H 10/60 |
| 2020/0383752 A1* | 12/2020 | Willers | ................. G16H 50/50 |
| 2021/0093421 A1* | 4/2021 | Michaeli | ............... A61C 7/002 |

* cited by examiner

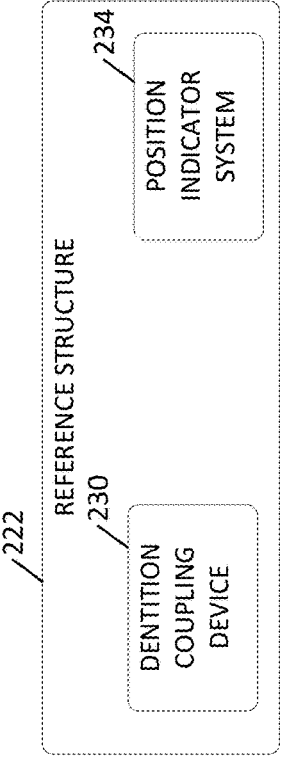
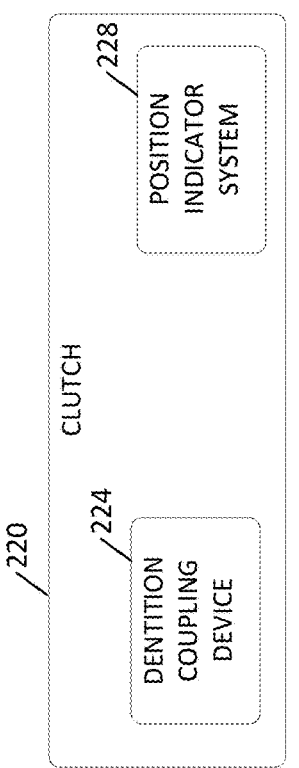
*FIG. 3*

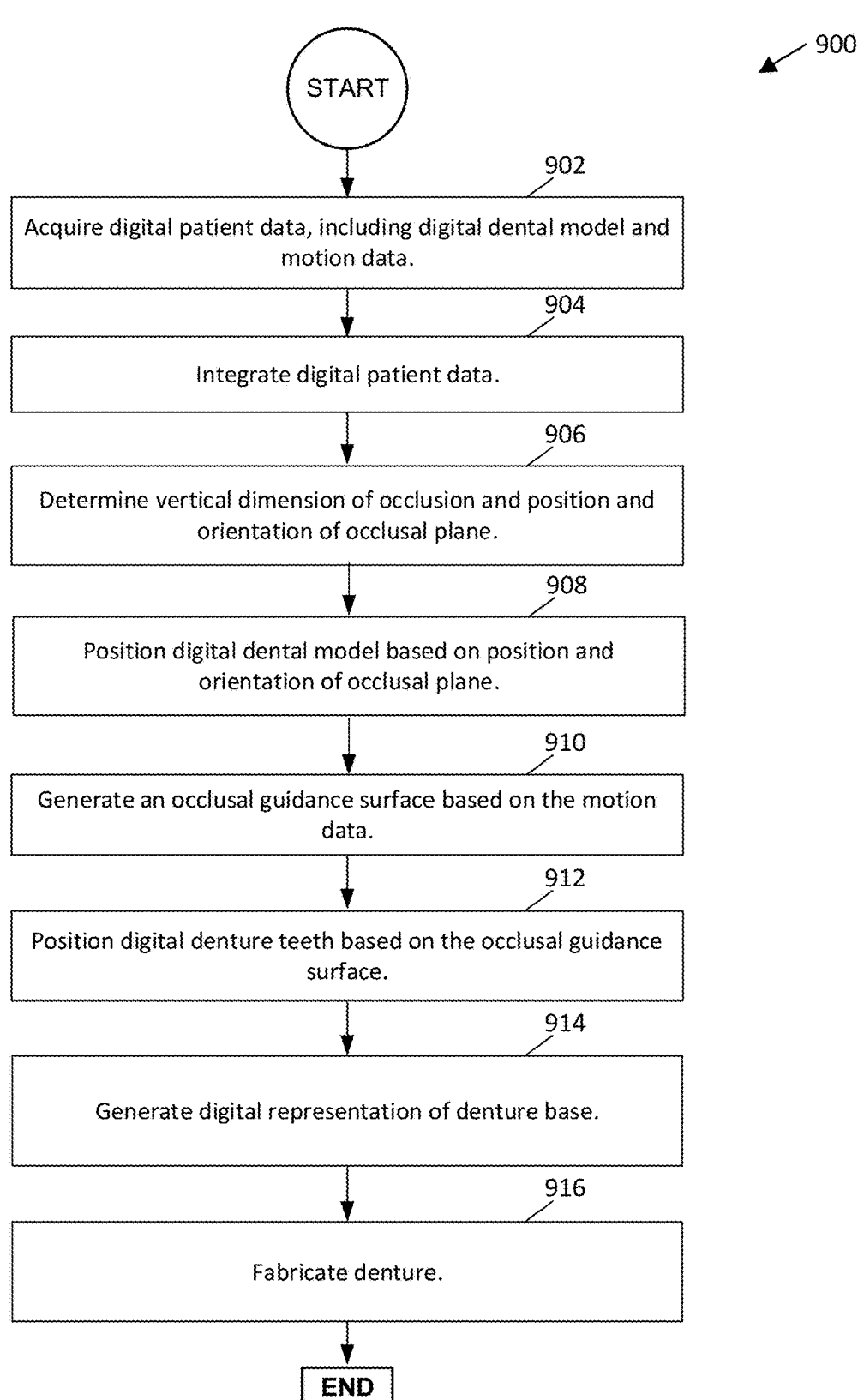

900

START

902
Acquire digital patient data, including digital dental model and motion data.

904
Integrate digital patient data.

906
Determine vertical dimension of occlusion and position and orientation of occlusal plane.

908
Position digital dental model based on position and orientation of occlusal plane.

910
Generate an occlusal guidance surface based on the motion data.

912
Position digital denture teeth based on the occlusal guidance surface.

914
Generate digital representation of denture base.

916
Fabricate denture.

END

FIG. 9

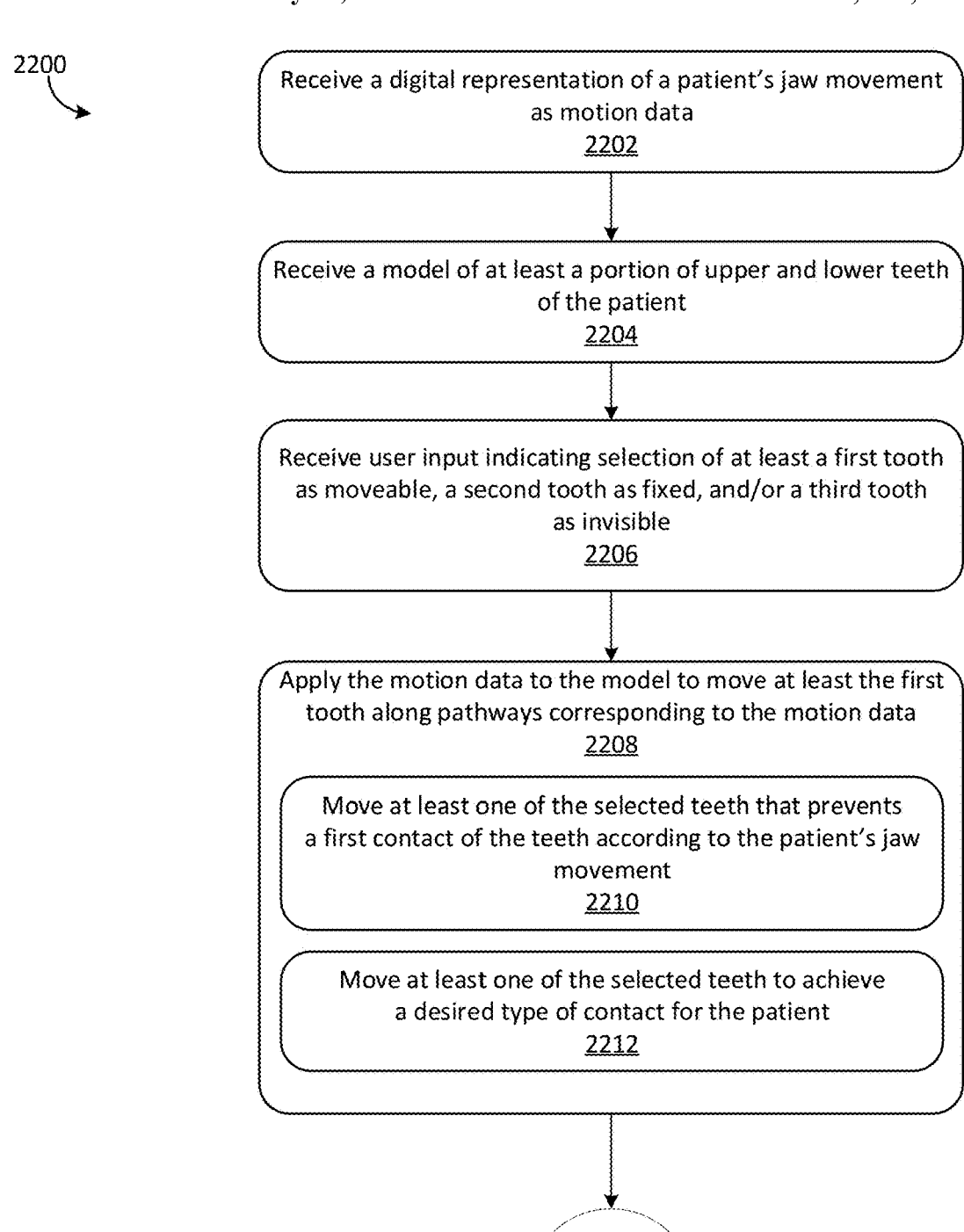

2200

Receive a digital representation of a patient's jaw movement
as motion data
2202

Receive a model of at least a portion of upper and lower teeth
of the patient
2204

Receive user input indicating selection of at least a first tooth
as moveable, a second tooth as fixed, and/or a third tooth
as invisible
2206

Apply the motion data to the model to move at least the first
tooth along pathways corresponding to the motion data
2208

Move at least one of the selected teeth that prevents
a first contact of the teeth according to the patient's jaw
movement
2210

Move at least one of the selected teeth to achieve
a desired type of contact for the patient
2212

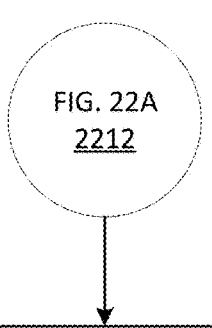

FIG. 22A
2212

Automatically adjust positioning of one or more of the selected teeth based on detecting collision(s) when the motion data is applied to the model
2214

Detect when at least one of the selected teeth intersect another tooth
2216

Adjust position of a tooth until an upper position limit is met
2218

Adjust angle of a tooth until a threshold angle movement is met
2220

Adjust at least one tooth until a threshold amount of contact between the tooth and one or more other teeth is met
2222

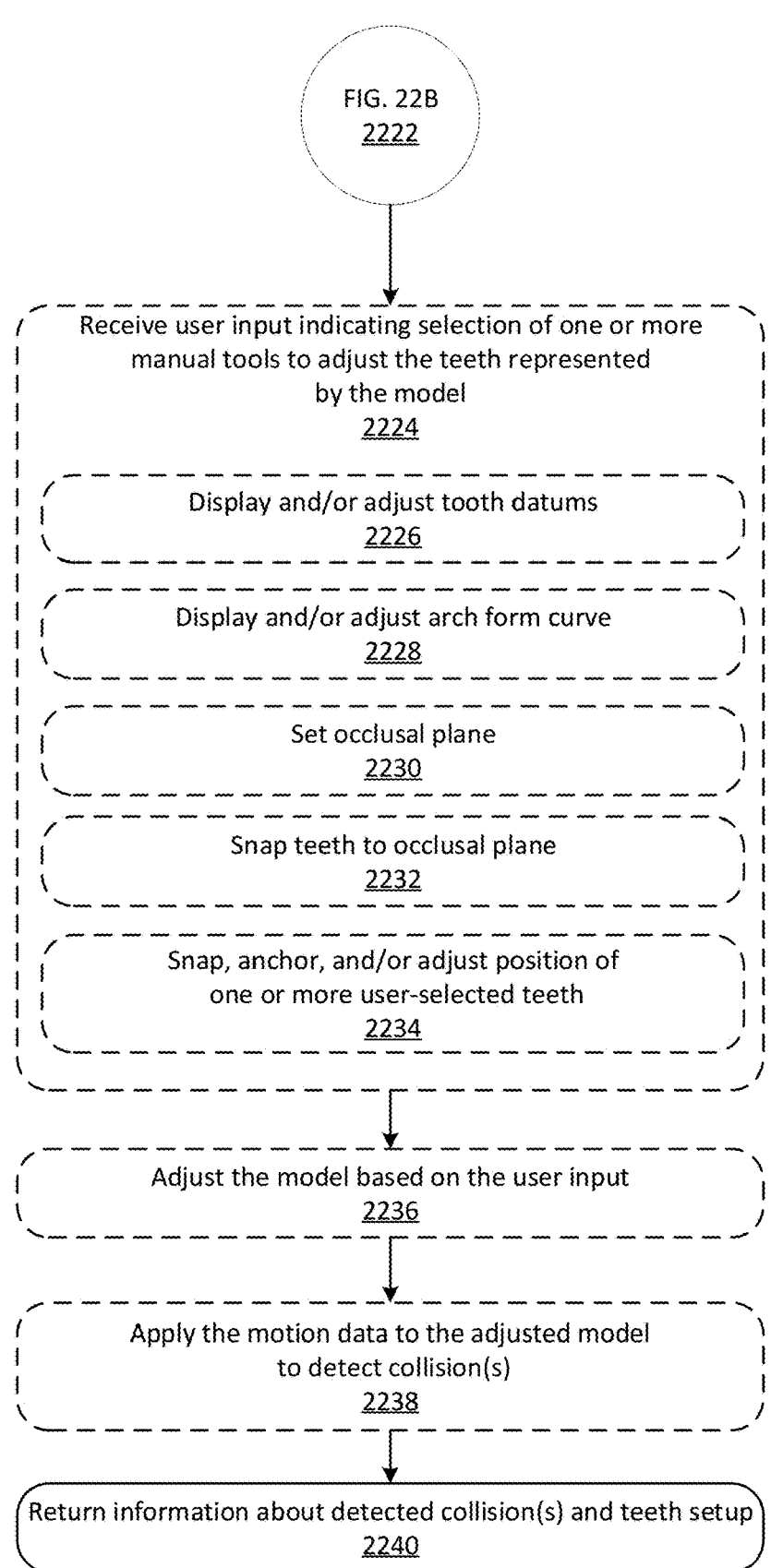

FIG. 22B
2222

Receive user input indicating selection of one or more
manual tools to adjust the teeth represented
by the model
2224

Display and/or adjust tooth datums
2226

Display and/or adjust arch form curve
2228

Set occlusal plane
2230

Snap teeth to occlusal plane
2232

Snap, anchor, and/or adjust position of
one or more user-selected teeth
2234

Adjust the model based on the user input
2236

Apply the motion data to the adjusted model
to detect collision(s)
2238

Return information about detected collision(s) and teeth setup
2240

Receive a digital representation of a patient's jaw movement as motion data
2302

Receive a model of at least a portion of upper and lower teeth of the patient
2304

Receive user input indicating selection of a first set of teeth as moveable, a second set of teeth as fixed, and/or a third set of teeth as invisible
2306

Apply the motion data to the model to move the first set of teeth along pathways corresponding to the motion data
2308

For each frame in the motion data, automatically adjust positioning of the first set of teeth to avoid interference(s) with the second and/or third sets of teeth
2310

Receive user input indicating motion correction per tooth
2312

Correct motion in at least one of 6 degrees of freedom
2314

Apply a predetermined amount of position correction to upper arch teeth and/or lower arch teeth
2316

Apply an amount of position correction to each of upper and lower arch teeth based on a predetermined ratio of correction
2318

Automatically adjust position of a condyle hinge axis
for each frame in the motion data
2320

Rotate lower arch teeth to a first contact point
based on the adjusted condyle hinge axis
2322

Return information about adjusting position(s) of one or more
teeth and teeth setup
2324

TOOLS AND AUTOMATION FOR TOOTH SETUP

CROSS-REFERENCE TO RELATED APPLICATIONS

This application claims priority to U.S. Provisional Application Ser. No. 63/226,653, filed on Jul. 28, 2021, the disclosure of which is incorporated by reference in its entirety.

TECHNICAL FIELD

This document generally describes technology for system-automated collection and analysis of digital dental data of a particular patient for use in motion-based digital dental appliance design, fabrication, and setup for the particular patient.

BACKGROUND

Tooth setup refers to a process of arranging teeth in a patient, which can be part of a process for designing dental appliances and/or planning dental treatments. Dental appliances may be used to treat dental conditions. Examples of dental appliances can include therapeutic appliances (e.g., surgical splints, occlusal splints, orthodontic retainers, orthodontic aligners) and restorative appliances (e.g., dental restorations). A dental restoration is a type of dental appliance that can be used to restore a tooth or multiple teeth (e.g., to restore functionality after a tool is damaged). Dental restorations may also be used to aesthetically improve a patient's dentition. A crown, as an illustrative example, is a dental restoration used for restoring a single tooth. Bridges and implants are additional non-limiting examples of dental restorations. Dental implants can include prosthetic devices placed in bone tissue of a patient's jaw and used to secure other dental restorations, such as implant abutments, crowns, partial dentures, and/or full dentures.

A denture is another example of a dental restoration. Denture are dental prostheses that can replace missing teeth. Dentures can be supported by surrounding soft and hard tissue of a patient's oral cavity. For example, a denture may be designed to fit over and be supported by the patient's gum tissue. Dentures may include a denture base region that can be formed from an acrylic material and colored to appear similar to gum tissue. Denture teeth formed from acrylic or other materials may be secured to the denture base. Dentures may be fixed or removable, implant-supported, and/or non-implant supported. In some implementations, dentures may be complete (e.g., replacing teeth of a dental arch) or partial (e.g., replacing less than all of teeth of the dental arch).

A removable denture can be made so that a patient may remove the denture during ordinary use. For example, the patient may remove the denture on a daily basis for overnight cleaning. Non-implant supported, removable dentures can be held in place by a suction fit between a bottom of the denture and the patient's gum tissue. The bases of removable dentures may follow a shape of the patient's gum tissue so that when the base is pressed against the patient's gum tissue, air may be forced out, creating a low-pressure suction seal between the denture base and the patient's tissue. Partial removable dentures may include clasps that mechanically secure the denture to the patient's remaining teeth.

Implant-supported dentures can be designed to couple to dental implants that have been implanted in the patient.

Implant-supported dentures may be fixed or removable. Some implant-supported dentures may be removable by the patient to allow for cleaning.

A fixed denture may not be removed by a patient during ordinary use. Typically, a fixed denture can be placed by a care provider, such as a dentist or prosthodontist, and can be removed, if necessary, by the care provider. A fixed denture may, for example, be secured to one or more dental implants.

SUMMARY

This document generally describes technology for generating a digital tooth setup, which can be used to produce any of a variety of physical dental appliances, such as dentures, orthodontia, liners, dental implants (e.g., crowns, bridges), and/or other dental appliances. More particularly, the disclosed technology can be used to automatically determine an appropriate setup (e.g., design, fabrication, installation) of dentures or other dental appliances based on movement of a particular patient's mouth and other information about the patient's mouth that is unique to that particular patient. The disclosed technology can combine accurate motion data with three-dimensional (3D) intraoral scans (IOS), 3D cone beam CTs (CBCT), or other types of imaging data for improved treatment planning, digital appliance design, and case presentation. The disclosed technology provides a digital workflow presentable through various user-interactive user interfaces with precision data for designing crowns, bridges, dentures, splints, and other types of digital appliances for the different needs of different patients.

Motion and/or image data can be captured of a patient's mouth and used in combination with a 3D model of the patient's mouth/teeth to design and set up dentures or other dental appliances for the patient. For example, motion data can be applied to a mandibular arch of the patient's teeth in the 3D model, since the mandibular arch affects tooth positioning. Applying the motion data to the arch can set the arch into motion, and a relevant user, such as a dentist, caregiver, or other operator, can use graphical user interface (GUI) features presented at a computing device to select which teeth to be moved. The motion data can be applied, by a computer system, to the selected teeth, thereby causing the computer system to automatically displace the selected moveable teeth to avoid interference with other teeth throughout an animation sequence. This animation sequence can help inform the user of an appropriate design for a dental appliance based on actual movement of the patient's jaw.

Accordingly, setup tools described herein can be applied, by the computer system, in an automated and animated sequence. The user can select one or more tools to apply to teeth setup during automation. The user can also make interactive and iterative adjustments to the teeth setup throughout the automated process, then apply those adjustments through automated processing any number of times and in any order. As a result, teeth can be set up, such as dentures or other dental appliances, in such a way that accurately and efficiently accounts for movement of the patient's jaw. While performing both automated and interactive adjustments, the disclosed technology can perform actions that may prevent teeth from overlapping each other, thereby allowing the simulated teeth to behave like actual physical teeth. This simulation can assist the user in fabricating accurate dental appliances for the particular patient.

For example, a motion-based digital denture design system can use actual motion data captured of a patient's mouth to generate a design of dentures unique to the particular patient's mouth. The system can automatically and efficiently design dentures that fit the particular patient better than other dentures that may be designed without using actual motion data of the patient's mouth. As an illustrative example, teeth of the dentures may be positioned so as to avoid interference with opposing teeth (e.g., opposing actual teeth or denture teeth) during the particular patient's biting motion.

A motion-based digital denture design generated using the disclosed technology can be based on motion data of the patient's jaw movement as captured by a motion capture system. As an illustrative example, the motion capture system can record motion of the patient's mandible relative to the patient's maxilla. The disclosed technology can also infer, based on the motion data, an approximate location of an axis corresponding to a condyloid process of a temporomandibular joint of the patient's jaw. The axis may be a hinge axis or a screw axis. Further, the disclosed technology can generate a model indicating a range of motion of the patient's mandible relative to the maxilla, based on the inferred location of the axis, the recorded motion, or both data.

The recorded motion can also be applied to a 3D digital model of at least a portion of the patient's dentition. This motion can then be used, with the 3D digital model, to design and fabricate dentures that are unique to the particular patient's mouth. Accordingly, the dentures can be accurately designed based on analysis of a range of actual motion for the patient.

Although many of the examples described herein are presented in terms of designing or fabricating dentures, such examples may also be applicable to other tooth setup applications, including but not limited to designing and fabricating other dental appliances, such as aligners, and/or planning oral treatments, such as orthognathic surgery.

One or more embodiments described herein can include a method for setting up teeth based on motion data of jaw movements of a patient, the method including: receiving, by a computing system, digital patient data, the digital patient data including a digital dental model representing teeth of a patient and motion data corresponding to a series of jaw movements performed by the patient and recorded by a motion capture system, applying, by the computing system, the motion data to the digital dental model, determining, by the computing system and based on the digital dental model set to motion, (i) a vertical dimension of occlusion, (ii) a position of an occlusal plane, and (iii) an orientation of the occlusal plane, positioning, by the computing system, the digital dental model based on at least one of (i), (ii), and (iii), repositioning, by the computing system, at least a portion of the digital dental model based on the motion data to avoid occlusions throughout a motion pathway of the motion data, and returning, by the computing system, the repositioned digital dental model.

The embodiments described herein can optionally include one or more of the following features. For example, returning, by the computing system, the repositioned digital dental model can include outputting the repositioned digital dental model in a graphical user interface (GUI) display at a user computing device. The motion data can include movements of at least a portion of upper teeth and movements of at least a portion of lower teeth relative each other. The digital dental model can represent at least a portion of upper teeth and at least a portion of lower teeth of the patient.

As another example, the method can include receiving, by the computing system, user input indicating selection of at least one tooth represented by the digital dental model as a moveable tooth, the movable tooth being moveable within a position, by the computing system, when the motion data is applied to the digital dental model, automatically moving, by the computing system, the selected tooth along one or more motion pathways that correspond to the motion data, and automatically adjusting, by the computing system, the position of the selected tooth based on detecting at least one collision of the selected tooth with other teeth represented by the digital dental model when the motion data is applied to the digital dental model. The computing system can determine the adjusted position of the selected tooth as a new position of the selected tooth in which the selected tooth does not interfere with the other teeth represented by the digital dental model. The position of the selected tooth can be automatically adjusted, by the computing system, for each frame in the motion data. Automatically adjusting, by the computing system, the position of the selected tooth can include at least one of a group consisting of: (i) translating the position of the selected tooth along an X axis, (ii) translating the selected tooth along a Y axis, (iii) translating the selected tooth along a Z axis, (iv) rotating the selected tooth about the X axis, (v) rotating the selected tooth about the Y axis, and (vi) rotating the selected tooth about the Z axis. The method further can include applying, by the computing system, a coordinate system to each tooth represented by the digital dental model, the coordinate system relative the tooth, the Z axis being in a vertical dimension, the Y axis being buccal-lingual, and the X axis being mesial-distal.

As another example, the at least one collision can include the selected tooth passing through at least one other tooth that is in vertical alignment with the selected tooth. The method can also include automatically adjusting, by the computing system, the position of the selected tooth, which can include at least one of rotating the selected tooth, adjusting a height of the selected tooth, torqueing the tooth, and adjusting an angle of the tooth. Automatically adjusting, by the computing system, the position of the selected tooth can be based on a current position of the selected tooth preventing a first contact between one or more teeth during a natural jaw movement of the patient. Automatically adjusting, by the computing system, the position of the selected tooth can also be based on adjusting a current position of the selected tooth to achieve a predetermined type of first contact between one or more teeth during a natural jaw movement of the patient.

In some implementations, the method can also include receiving, by the computing system, user input indicating selection of a second tooth as a fixed tooth, the fixed tooth remaining in a fixed position when the motion data is applied to the digital dental model. The method can also include receiving, by the computing system, user input indicating selection of a third tooth as an ignored tooth, the ignored tooth remaining in a fixed position when the motion data is applied to the digital dental model and the selected tooth being configured to pass through or contact the ignored tooth. As another example, automatically adjusting, by the computing system, the position of the selected tooth can include adjusting the position of the selected tooth until a threshold position limit is met, the threshold position limit indicating a maximum amount of distance the selected tooth can be moveable in a vertical or horizontal direction while remaining in a gum tissue of the patient. Automatically adjusting, by the computing system, the position of the selected tooth can also include adjusting an angle of the selected tooth until a threshold angle movement is met. Automatically adjusting, by the computing system, the position of the selected tooth can include adjusting the position of the selected tooth until a threshold amount of contact is met between the selected tooth and another tooth.

In some implementations, repositioning, by the computing system, the digital dental model can include performing the steps of receiving the user input indicating selection of the moveable tooth, automatically moving the selected tooth, and automatically adjusting the position of the selected tooth. The method may also include receiving, by the computing system, user input indicating selection of at least one manual tool to adjust one or more teeth represented by the digital dental model, automatically adjusting, by the computing system, the one or more teeth represented by the digital dental model based on the user-selected manual tool, and applying, by the computing system, the motion data to the adjusted teeth represented by the digital dental model to determine at least one of interferences, collisions, and a teeth setup. The user input can include selection of at least one of a group including a manual tool to: (i) display tooth datums overlaying the teeth represented by the digital dental model in a GUI display at a user computing device, (ii) adjust one or more of the tooth datums as the tooth datums overlay the teeth in the GUI display, (iii) display an arch form curve overlaying at least a portion of the teeth represented by the digital dental model in the GUI display, (iv) adjust one or more points of the arch form curve as the arch form curve and the one or more points overlay the at least portion of the teeth in the GUI display, (v) set the occlusal guidance surface for the at least portion of the teeth, (vi) snap at least another portion of the teeth to the occlusal guidance surface, (vii) anchor at least one user-selected tooth, (viii) snap the user-selected tooth to a predetermined reference point, and (vix) adjust a position of the user-selected tooth.

In some implementations, repositioning, by the computing system, the digital dental model can include: automatically adjusting a position of a condyle hinge axis for each frame in the motion data, rotating at least a portion of lower teeth represented by the digital dental model to a first contact point based on the adjusted condyle hinge axis, and returning a tooth setup indicating an arrangement of the portion of lower teeth based on the first contact point. Returning, by the computing system, the repositioned digital dental model can include generating a digital representation of a dental appliance based on the repositioned digital dental model. The digital representation of the dental appliance can include instructions for manufacturing the dental appliance. The method can also include transmitting, by the computing system, at least one of the digital representation of the dental appliance and the instructions for manufacturing the dental appliance to a rapid fabrication machine that can be configured to fabricate the dental appliance.

In some implementations, the method can also include transmitting, by the computing system, the digital representation of the dental appliance to a user computing device for presentation in a GUI display at the user computing device, receiving, by the computing system, user input indicating one or more adjustments to the digital representation of the dental appliance, and automatically adjusting, by the computing system, the digital representation of the dental appliance based on the received user input. The dental appliance can be at least one of dentures, a crown, and an aligner.

One or more embodiments described herein can include a method for setting up teeth based on motion data of jaw movements of a patient, the method including: receiving, by a computing system, a digital representation of jaw movement of a patient, the digital representation indicating movement of upper teeth and lower teeth relative each other, receiving, by the computing system, a digital model of at least a portion of the upper teeth and the lower teeth of the patient, receiving, by the computing system, user input indicating selection of at least a first tooth in the digital model as moveable, at least a second tooth in the digital model as fixed, and at least a third tooth in the digital model as ignored, moving, by the computing system, the at least portion of the upper teeth and the lower teeth represented by the digital model along movement pathways indicated by the digital representation of jaw movement of the patient, automatically adjusting, by the computing system, a position of the selected at least first tooth based on detecting the position of the selected at least first tooth as colliding or interfering with one or more other teeth represented by the digital model along one of the movement pathways indicated by the digital representation of jaw movement of the patient, and returning, by the computing system, the digital model.

The method can optionally include one or more of the abovementioned features.

One or more embodiments described herein can include a system for setting up teeth based on motion data of jaw movements of a patient, the system including: a dental impression station that can be configured to generate a dental impression of upper teeth and lower teeth of a patient, a 3D scanner that can be configured to generate a digital dental model of at least a portion of the upper teeth and the lower teeth of the patient based on receiving the dental impression from the dental impression station, an image capture system that can be configured to capture image data of the upper teeth and the lower teeth of the patient, a motion capture system that can be configured to generate a digital representation of jaw movement of the patient, the digital representation indicating movement of the upper teeth and the lower teeth relative each other, and a computing system in communication with the 3D scanner, the image capture system, and the motion capture system. The computing system can be configured to perform operations including: receiving, from the motion capture system, the digital representation of jaw movement of the patient, receiving, from the 3D scanner, the digital model, receiving, from a user device, user input indicating selection of at least a first tooth in the digital model as moveable, at least a second tooth in the digital model as fixed, and at least a third tooth in the digital model as ignored, moving the at least portion of the upper teeth and the lower teeth represented by the digital model along movement pathways indicated by the digital representation of jaw movement of the patient, automatically adjusting a position of the selected at least first tooth based on detecting the position of the selected at least first tooth as colliding or interfering with one or more other teeth represented by the digital model along one of the movement pathways indicated by the digital representation of jaw movement of the patient, and returning the digital model. Returning the digital model can include transmitting, to the user device, the digital model for presentation in a GUI display at the user device.

The system can optionally include one or more of the abovementioned features.

One or more embodiments described herein can include a system for setting up teeth based on motion data of jaw movements of a patient, the system including: a 3D scanner to generate a digital dental model representing teeth of a patient, a motion capture system to generate motion data corresponding to a series of jaw movements performed by the patient, and a computing system in communication with the 3D scanner and the motion capture system. The computing system can be configured to perform operations that include: receiving, from the 3D scanner, the digital dental model, receiving, from the motion capture system, the motion data, applying the motion data to the digital dental model, determining, based on the digital dental model set to motion, (i) a vertical dimension of occlusion, (ii) a position of an occlusal plane, and (iii) an orientation of the occlusal plane, positioning the digital dental model based on at least one of (i), (ii), and (iii), repositioning at least a portion of the digital dental model based on the motion data to avoid occlusions along a motion pathway of the motion data, and returning the repositioned digital dental model.

The system can optionally include one or more of the abovementioned features.

The technology described herein can optionally provide one or more of the following advantages. For example, the disclosed technology provides for accurately molding and fitting dentures to patients' mouths. When properly made and fit, such dentures may provide numerous benefits to a patient. These benefits include, but are not limited to, improved mastication (chewing) since the dentures replace edentulous (gum tissue) regions with denture teeth, improved aesthetics when the patient's mouth is open due to presence of denture teeth as well as when the patient's mouth is closed due to cheek and lip support provided by the denture structure, and improved pronunciation since the presence of properly sized front teeth is important for making several speech sounds.

As another example, the disclosed technology provides computer system-based techniques for accurately and efficiently analyzing and recording relationships between teeth in a patient's upper jaw and lower jaw to more efficiently, precisely, and consistently set up teeth (e.g., dentures) for the particular patient. Moreover, the disclosed technology can be used to more accurately arrange teeth based on identification and analysis of dynamic movements of the patient's jaw, thereby providing a better fit of teeth for the particular patient. When complex or multiple dental appliances, dental restorations, or dental therapies are applied to a patient simultaneously, inaccuracies in the representation of dental motion—whether due to measurement error or approximation—may be compounded, thereby resulting in inadequate or suboptimal tooth setup and results for patients. Inaccurate motion data can result in failure of the appliances, restorations, or treatment at high clinical, financial, emotional, safety, and/or health costs. The disclosed technology, on the other hand, may eliminate and/or reduce these costs by providing dynamic computer system-based imaging techniques and analysis of real-time movement of the patient's mouth that can be used to determine custom teeth setup solutions for the particular patient.

Moreover, the disclosed technology may reduce chair time and number of visits required to fit dentures or other dental appliances to a patient. The disclosed technology may also provide for designing and setting up of dental appliances, such as dentures, that have balanced occlusal support throughout functional movements (e.g., excursive movements). This can increase durability of the dental appliances to mitigate or otherwise prevent a patient from having to replace their dental appliances and/or experience issues/difficulties while using and/or wearing them.

As another example, the disclosed technology allows for digital denture teeth to remain in contact as they are positioned (e.g., automatically by a computer system or manually by the relevant user), thereby increasing efficiency for the user and/or computing system to accurately position the digital denture teeth and understand collisions, occlusions, or other interferences between moved teeth and other teeth. For example, fewer processing cycles may be used to automatically move a tooth into contact with another tooth using the motion data than would be used to generate a user interface and receive user inputs to manually position the digital denture tooth in contact with another tooth. Another advantage of automatically moving the digital denture tooth into contact, by the computer system, is that a resulting arrangement of digital denture teeth may be more consistently high quality than an arrangement where each digital denture tooth can be moved manually into contact by a user.

As described herein, the disclosed technology provides design guides for relevant users to accelerate quality and development of dental appliance designs. The disclosed technology can save design time, processing power, and reduce a need for physical adjustments once a design is made (and optionally installed in the patient's mouth). Furthermore, as described herein, motion-informed setups can result in better designs that save fabrication time in the lab and appliance seating and adjustment time in the clinic. Follow-up visits to the clinic and rework returns to the lab may also be reduced using the disclosed technology. Moreover, some appliances have staining and glazing that can be compromised if an appliance needs to be modified. This can affect aesthetics but may also affect surface integrity of the appliance. Better fitting and functioning appliances, using the disclosed technology, can improve patient comfort, reduce anatomic stresses, and reduce appliance wear.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

FIG. 3 illustrates a block diagram of an example patient assembly of FIG. 2 for capturing jaw movement of the patient.

FIG. 9 is a flowchart of an example process for fabricating a denture for a particular patient based on motion data of that patient's jaw.

FIGS. 22A-C is a flowchart of a process for applying motion data to a digital representation of teeth to determine a teeth setup.

DETAILED DESCRIPTION

Figure 1:
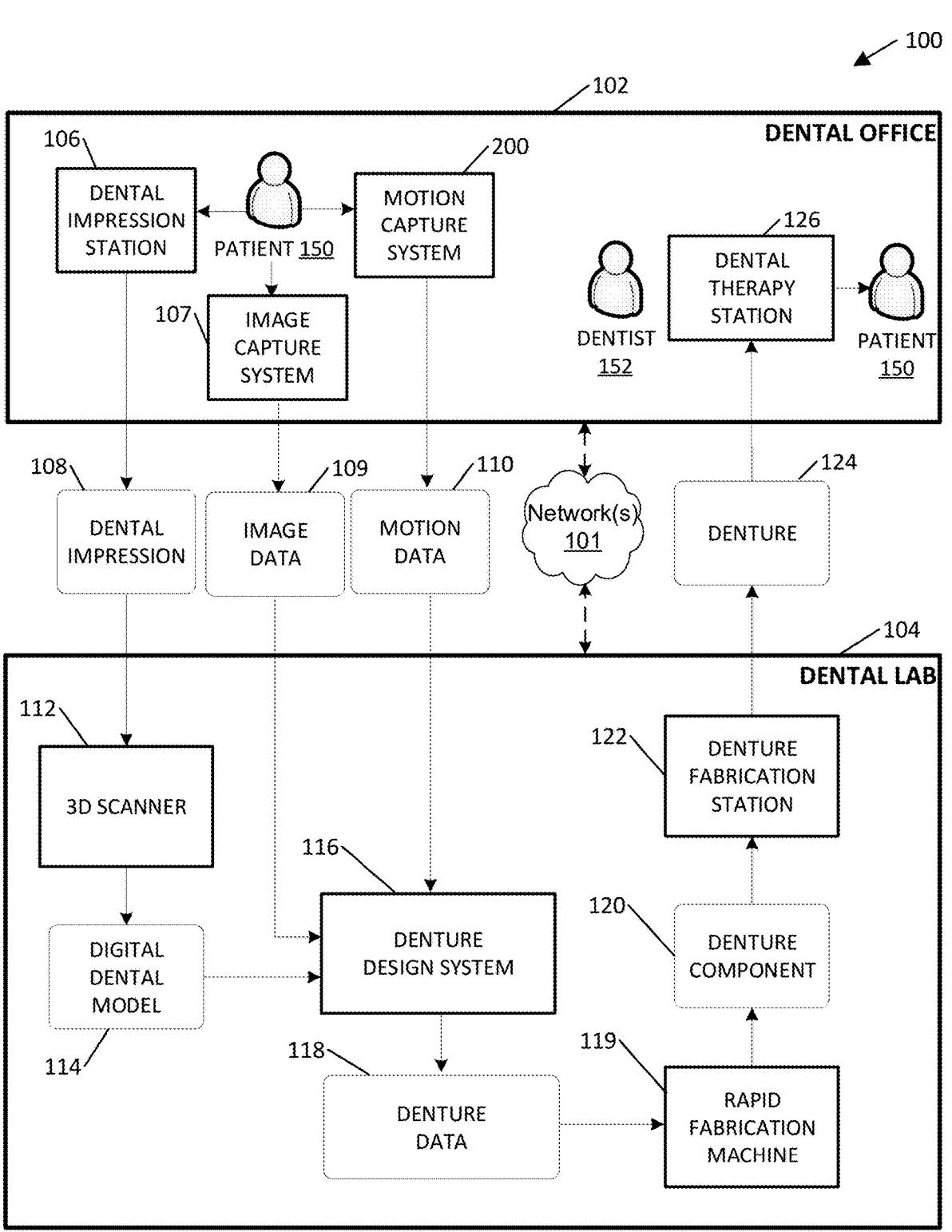
FIG. 1 is a schematic block diagram illustrating an example system for fabricating a motion-based denture.

This document describes technology related to designing, fabricating, and/or setting up dental appliances, such as dentures, for patients using digital patient data of a particular patient. The digital patient data can include image data of the patient's mouth, motion data indicating movement of the patient's jaw, and a 3D digital dental model of the patient's mouth. A computer system can process and analyze the digital patient data to automatically and efficiently determine a setup of dental appliances unique for the particular patient.

Various embodiments may be described throughout this disclosure with reference to the figures. Like reference numerals represent like parts and assemblies. Reference to various embodiments does not limit scope of the claims attached hereto. Additionally, any examples set forth in this disclosure are not intended to be limiting and merely set forth some of many possible embodiments of the disclosed technology.

Referring to the figures, FIG. 1 is a schematic block diagram illustrating an example system 100 for fabricating a motion-based denture. The system 100 can be used to fabricate motion-based dentures, such as the denture 124, using jaw motion data captured by a motion capture system 200 described herein. In this example, the system 100 can be implemented in a dental office 102 and a dental lab 104. The system 100 can also be implemented in one or more other settings and/or environments. Components of the system 100 can communicate (e.g., wired and/or wireless) in the environment using network(s) 101.

In the example environment of FIG. 1, the dental office 102 can include the motion capture system 200 (which is described further with respect to at least FIG. 2), a dental impression station 106, an image capture system 107, and a dental therapy station 126, all of which may communicate with each other and other components via the network(s) 101. Any of these components can, for example, communicate with a denture design system 116, which can be part of a same or different environment than the components. The denture design system 116 can be any type of computing system, network of computing devices, cloud-based system, and/or computing device configured to perform the techniques described herein. Moreover, although shown as separate components, one or more of the components described herein can be sub-components of each other or part of a system. For example, the image capture system 107 may be a sub-component of the motion capture system 200. As another example, any one or more of the dental impression station 106, the motion capture system 200, and the image capture system 107 can be part of the denture design system 116.

In some implementations, the dental office 102 can include multiple dental offices or other settings/environments. For example, one or more of the dental impression station 106, the image capture system 107, and the motion capture system 200 can be located in a different dental office than the dental therapy station 126 and can communicate with each other via the network(s) 101. Sometimes, one or more of the dental impression station 106, the motion capture system 200, and the dental therapy station 126 may be located in settings/environments other than dental offices.

The example dental impression station 106 can be configured to generate a dental impression 108 of dentition of patient 150. The dental impression 108 can be a geometric representation of the dentition of the patient 150, which may include teeth (if any) and edentulous (gum) tissue. The dental impression 108 can also be a physical impression captured using an impression material, such as sodium alginate, polyvinylsiloxane or another impression material.

The dental impression 108 may also be a digital impression. The digital impression 108 may be represented by one or more of a point cloud, a polygonal mesh, a parametric model, or voxel data. The digital impression 108 can be generated directly from the dentition of the patient 150, using, for example, an intraoral scanner or other image capture system 107. The digital impression 108 may also be captured using other imaging technologies, such as computed tomography (CT), including cone beam computed tomography (CBCT), ultrasound, and/or magnetic resonance imaging (MRI). The digital impression 108 can also be generated from a physical impression of the patient 150's dentition, by scanning an impression or plaster model of the dentition of the patient 150 created from the physical impression. Examples of technologies for scanning a physical impression or model can include but are not limited to 3D laser scanners and CT scanners. One or more other technologies may also be used to generate the dental impression 108 for the patient 150.

The motion capture system 200 can be configured to capture a representation of movement of dental arches relative to each other in the patient 150's mouth. The motion capture system 200 can generate motion data 110. The motion capture system 200 can export the motion data 110 in a file that may contain a pair of 4×4 transformation matrices that can describe a location and orientation of a patient's upper and lower arch per video frame. Various types of the motion capture system 200 can export motion files in differing formats. In some implementations, the dental impression 108 can be used, by a dentist 152, other relevant user, and/or computing system (e.g., the motion capture system 200) to generate a patient-specific dentition coupling device. The dentition coupling device can then be used in combination with the motion capture system 200 to accurately capture movement of the patient's jaw using the disclosed technology.

The motion capture system 200 can generate the motion data 110 from optical measurements of dental arches that are captured while the dentition of the patient 150 is moving. The optical measurements can be extracted from image and/or video data recorded (such as by the image capture system 107) while the dentition of the patient 150 is moving. The optical measurements can also be captured indirectly, such as by being extracted from images and/or video data generated by one or more other devices (e.g., a patient assembly such as patient assembly 204 described in FIGS. 2 and 3) that are secured to a portion of the dentition of the patient 150. The motion data 110 can be generated using other processes in some implementations. Further, the motion data 110 can include transformation matrices that represent position and orientation of the dental arches of the patient 150. Transformation matrices can describe relative position and orientation of the lower arch to the upper arch of the patient's teeth for each video frame. This information can be used to accurately animate the lower arch so that tooth relationships between the arches, throughout the motion, can be assessed and used to reposition any one or more of the teeth. These animated tooth positions can identify potential tooth interferences, which therefore can inform appropriate appliance design. Teeth can be repositioned, reshaped, and/or removed to avoid such interferences. For some appliances, multiple tooth contact points may be desirable as this can provide better support and potentially prevent fracturing at a single point of contact. The motion data 110 may also include a series of transformation matrices that represent various motions or functional paths of movement for the patient 150's dentition.

Moreover, still images and/or video data can be captured, by the image capture system 107, of the patient 150's dentition while the dentition is positioned in various bite locations. Image processing techniques can be used to determine positions of the patient 150's upper and lower arches relative to each other (either directly or based on the positions of the attached patient assembly 204). In some implementations, the motion data 110 can be generated, by the motion capture system 200, by interpolating between the positions of the upper and lower arches as determined from at least some of the captured images. Additional motion frames can be interpolated between the images that have been captured.

The motion data 110 may be captured with the patient 150's jaw is in various static positions and/or moving through various motions. For example, the motion data 110 may include a static measurement representing a centric occlusion (e.g., the patient's mandible closed with teeth fully engaged) and/or centric relation (e.g., the patient's mandible nearly closed, just before any shift occurs that is induced by tooth engagement or contact) bite. The motion data 110 may also include static measurements or sequences of data corresponding to protrusive (e.g., the patient's mandible being shifted forward while closed), lateral excursive (e.g., the patient's mandible shifted/rotated left and right while closed), hinging (e.g., the patient's mandible opening and closing without lateral movement), chewing (e.g., the patient's mandible chewing naturally to, for example, determine the most commonly used tooth contact points), and/or border movements (e.g., the patient's mandible is shifted in all directions while closed, for example, to determine the full range of motion). In some implementations, the motion data 110 can be captured while the patient 150 is using a Lucia jig or leaf gauge so that the patient 150's teeth (for patients who are not completely edentulous, for example) may not impact/contribute to the generated movement data. This motion data 110 may be used to determine properties of the patient 150's temporomandibular joint (TMJ). For example, hinging motion identified in the motion data 110 may be used, by the denture design system 116 described herein, to determine location of the hinge axis of the patient 150's TMJ. Knowing the location of the hinge axis for the particular patient 150 can be beneficial to design accurate and appropriately-fitting dentures for the patient 150.

In some implementations, a representation of the motion of the hinge axis may be displayed (e.g., at a computing device of the dentist 152, at the motion capture system 200) while the motion data 110 is being captured. For example, a computing device may execute instructions to display, in a graphical user interface (GUI) display, a line segment in relation to a representation of the patient 150's dentition. The line segment may be outputted at a location that is approximately where the patient 150's condyle is located. The line segment may move in concert with relative motion of the patient 150's mandible (lower dentition). Visually, movement of the line may appear to rotate at a location approximately equal to the hinge axis of the patient 150's TMJ. Furthermore, during motion capture, the dentist 152 or other caregiver may annotate the motion data 110 in real-time and/or near real-time to identify portions of the motion data 110 that correspond to the jaw hinging open/closed. For example, the dentist 152 may annotate the motion data 110 by providing user input at the computing device and/or the motion capture system 200, such as by pressing/selecting a button on a GUI, pressing a physical button, and/or pressing on a foot pedal. The dentist 152 can provide user input in one or more other forms while the patient 150's dentition are being imaged and the motion data 110 is being captured.

Still referring to FIG. 1, the image capture system 107 can capture image data 109 of the patient 150's dentition. The image data 109 may include one or more static images and/or videos. The image data 109 can be associated with the motion data 110 by the denture design system 116. The image data 109 can be captured at a same time as the motion data 110. Sometimes, the image data 109 can be captured at different times than the motion data 110 (e.g., before a particular motion of the patient's jaw, after a motion of the patient's jaw). A particular image of the image data 109 may be associated with a particular frame of the motion data 110, indicating that the image was captured while the patient 150's jaw was in the position indicated by the particular frame of the motion data 110.

The image capture system 107 can sometimes include a 3D camera that generates one or more 3D images in the image data 109. Examples of 3D cameras include, but are not limited to, stereo cameras (e.g., using two or more separate image sensors that are offset from one another). The 3D camera may also include a projector, such as a light projector or laser projector, that can be configured to project a pattern on the patient 150's face. For example, the projector may be offset relative to the camera or cameras so that the images captured by the camera include distortions of the projected pattern caused by the patient 150's face. Based on these distortions, a 3D structure of portions of the patient 150's face can be approximated by the denture design system 116. Various different patterns can be projected on the patient 150's face, such as stripes and/or fringes (e.g., sinusoidally changing intensity values). In some implementations, the 3D image(s) can be captured in relation to the motion capture system 200 or a portion thereof so that the 3D image(s) can be associated/correlated with the same coordinate system as the motion data 110.

As shown in the example of FIG. 1, the example dental lab 104 can include a 3D scanner 112, the denture design system 116, a rapid fabrication machine 119, and a denture fabrication station 122. As described above, any of these components can communicate with each other and/or with other components (e.g., components in the dental office 102) via the network(s) 101. Moreover, any of these components can be sub-components or otherwise part of a same system as other components described herein. Although shown as a single dental lab 104, the dental lab 104 can also include multiple dental labs. For example, the 3D scanner 112 can be in a different dental lab than one or more of the other components shown in the dental lab 104. Further, one or more of the components shown in the dental lab 104 may be located in other settings and/or environments. For example, one or more of the 3D scanner 112, denture design system 116, rapid fabrication machine 119, and denture fabrication station 122 can be located in the dental office 102. Sometimes, not all components shown in the dental lab 104 may be used in the system 100.

The 3D scanner 112 can be a device configured to create a 3D digital representation of the dental impression 108, which can be received from the dental impression station 106. The 3D scanner 112 can, for example, generate a point cloud, a polygonal mesh, a parametric model, or voxel data representing the dental impression 108. The 3D scanner 112 can also generate a digital dental model 114. The 3D scanner 112 can include a laser scanner, a touch probe, and/or an industrial CT scanner. Yet other implementations of the 3D scanner 112 are possible. In some implementations, the dental impression station 106 can generate the digital dental model 114 instead of the 3D scanner 112. In some implementations, the dental impression 108 generated by the dental impression station 106 can be the digital dental model 114 and/or may be used directly to generate the digital dental model 114.

The denture design system 116, as described above, can be a computing system configured to generate denture data 118. The denture data 118 can be 3D digital data that represents a denture component 120, which can further be in a format suitable for fabrication (e.g., manufacturing) using the rapid fabrication machine 119. The denture design system 116 may use the digital dental model 114, the image data 109, and/or the motion data 110 to generate the denture data 118. For example, the denture design system 116 can generate a denture base having a geometric form that is shaped to fit a portion of the digital dental model 114 (e.g., a portion of the model representing an edentulous region of the patient's dentition). The denture design system 116 may also determine various parameters that are used to generate the denture data 118 based on the image data 109. For example, the denture design system 116 can use image processing techniques to estimate a vertical dimension parameter from the image data 109. The vertical dimension parameter can be a distance between the patient's upper and lower edentulous arches, measured at a midline when the patient's mouth is positioned in a desired bite relationship. The vertical dimension parameter and/or occlusal plane positioning can be based on desired geometric relationships between edentulous arches, lips, condyle hinge axis, and/or eye pupils of the patient. A clinician can, for example, determine this for the patient by considering jaw function, lip position, and/or other anatomic factors. Motion data described herein can be used to help determine a location and orientation of a desired occlusal plane (e.g., biting surface) by determining a condyle hinge axis, based on a motion recording of the patient opening and closing their jaw, as described throughout this disclosure. Additionally, the denture design system 116 may use the motion data 110 to design the denture data 118. For example, the denture design system 116 can use the motion data 110 to ensure that the denture design avoids interferences with the opposing dentition (or dentures) during a bite motion that is represented by the motion data 110.

The denture design system 116 can include a computing device having one or more user input devices. The denture design system 116 may also include computer-aided-design (CAD) software that can be configured to generate a GUI display of the denture data 118 and allow an operator (e.g., the dentist 152) to interact with and manipulate the denture data 118. In some implementations, the denture design system 116 may include a GUI that allows a relevant user to specify and/or adjust parameters of the denture design such as vertical dimension, overbite, overjet, or tip, torque, and rotation parameters for one or more denture teeth. For example, the denture design system 116 may include, in the GUI display, virtual, selectable tools that mimic tools and techniques used by a laboratory technician to physically design a denture. In some implementations, the denture design system 116 can include a user interface tool to move a digital representation of the patient 150's dentition (e.g., the digital dental model 114) according to the motion data 110 (which may be similar to a physical articulator). Additionally, the denture design system 116 can include a server or other computing system that is configured to partially or fully automate generation of designs based on the denture data 118, which may further use the motion data 110.

The rapid fabrication machine 119 can include one or more 3D printers. Another example of the rapid fabrication machine 119 can include stereolithography equipment. Yet another example of the rapid fabrication machine 119 can be a milling device, such as a computer numerically controlled (CNC) milling device. In some implementations, the rapid fabrication machine 119 can be configured to receive files in STL format. Other embodiments of the rapid fabrication machine 119 may also be possible. The rapid fabrication machine 119 can be configured to receive the denture data 118 from the denture design system 116 and use that data 118 to fabricate (e.g., manufacture, build, produce) denture component 120.

The denture component 120 can be a physical component that can be used as part or all of denture 124 for the particular patient 150. For example, the denture component 120 can be milled from zirconium, acrylic, or another material that can be used directly as a dental appliance for the patient 150. The denture component 120 can also be a mold formed from wax or another material and can be used indirectly (e.g., through a lost wax casting or ceramic pressing process) to fabricate the denture 124 for the patient 150. The denture component 120 can also be formed using laser sintering technology or other similar technology.

The denture fabrication station 122 can be configured to fabricate the denture 124 for the patient 150 based on the denture component 120 from the rapid fabrication machine 119. The denture 124 can be a complete or partial denture 124. The denture 124 may include one or both of a maxillary denture and a mandibular denture, for example. The denture 124 can be formed, by the denture fabrication station 122, from an acrylic, ceramic, or metallic material. The dental impression 108 can also be used in the fabrication of the denture 124. For example, the dental impression 108 can be used to form a plaster model of the dentition of the patient 150. Additionally, a model of the dentition of the patient 150 can be generated by the rapid fabrication machine 119. The denture fabrication station 122 can include equipment and processes to perform some or all of the techniques used in dental laboratories to generate dental appliances. Other implementations of the denture fabrication station 122 may also be possible.

The denture 124 can then be seated in the mouth of the patient 150 in the dental therapy station 126 by the dentist 152. The dentist 152 may confirm that an occlusal surface of the denture 124 is properly defined by instructing the patient 150 to engage in various bites, such as the bite motions that were imaged and/or detected by the image capture system 107 and/or the motion capture system 200.

The network(s) 101 described herein may be an electronic communication network that facilitates communication between components described herein. An electronic communication network can be a set of computing devices and links between the computing devices. The computing devices in the network(s) 101 can use the links to enable communication among the computing devices. The network(s) 101 can include routers, switches, mobile access points, bridges, hubs, intrusion detection devices, storage devices, standalone server devices, blade server devices, sensors, desktop computers, firewall devices, laptop computers, handheld computers, mobile telephones, and/or other types of computing devices.

The network(s) 101 can include various types of links. For example, the network(s) 101 can include one or both of wired and wireless links, including BLUETOOTH, ultra-wideband (UWB), 802.11, ZIGBEE, and other types of wireless links. Furthermore, the network(s) 101 can be implemented at various scales. For example, the network(s) 101 can be implemented as one or more local area networks (LANs), metropolitan area networks, subnets, wide area networks (such as the Internet), and/or can be implemented at another scale.

In some implementations, the system 100 may also be used to plan treatments for implant supported dentures. For example, the system 100 may be used to determine appropriate positions for implants based on a denture design. The system 100 can also be used to generate digital design data for an implant surgical guide and fabricate the implant surgical guide using rapid fabrication technology. Beneficially, in at least some of these implementations, location of implants can be determined based, at least in part, on a design of the final dentures, as determined using the denture design system 116.

Some implementations of the system 100 may integrate with one or more of an inventory management system and a parts management system. Based on the design of a denture or implant-supported denture treatment plan, a part pick list may be generated (e.g., by the denture design system 116) that lists the different components (e.g., denture teeth, implant abutments, support components). An inventory system may also be updated to adjust quantities of parts and one or more orders may be generated and directed to one or more suppliers.

Figure 2:
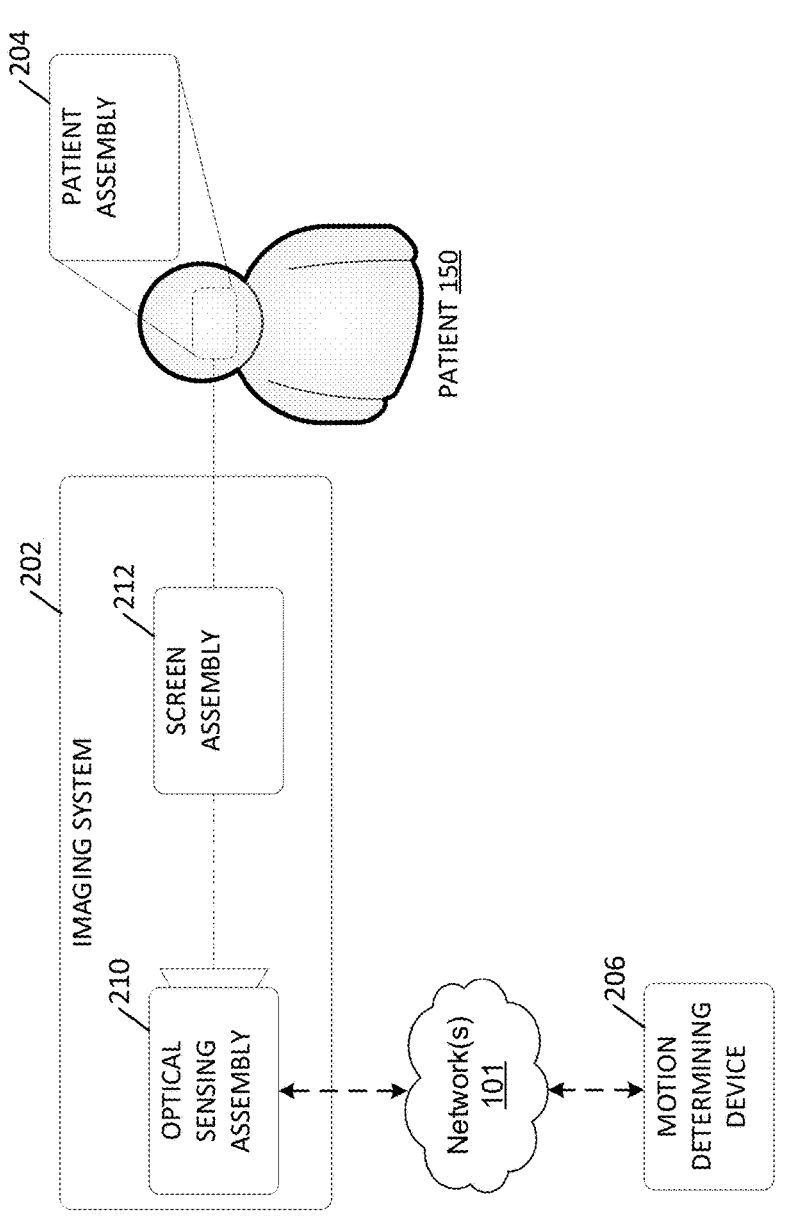
FIG. 2 is a schematic block diagram illustrating an example motion capture system for capturing jaw movement of a patient.

FIG. 2 is a schematic block diagram illustrating the motion capture system 200 for capturing jaw movement of the patient 150. The motion capture system 200 can include an imaging system 202, a patient assembly 204, and a motion determining device 206.

The imaging system 202 can include an optical sensing assembly 210 and a screen assembly 212. The optical sensing assembly 210 may capture images as the patient 150's jaw moves in one or more predetermined and/or desired positions, orientations, or other movements. For example, the optical sensing assembly 210 can include one or more cameras, such as video cameras. The optical sensing assembly 210 can capture images that may not include the patient assembly 204, but can be used to determine a position of the patient assembly 204 relative to the patient 150. For example, the patient assembly 204 can emit lights that project onto surfaces of the screen assembly 212 and the optical sensing assembly 210 may capture images of those surfaces of the screen assembly 212. Sometimes, the optical sensing assembly 210 may not capture images but otherwise can determine a position of the projected light or lights on the surfaces of the screen assembly 212.

The screen assembly 212 can include one or more screens. A screen can be any type of surface upon which light may be projected. Some implementations include flat screens that have a planar surface. Some implementations may include rounded screens, having cylindrical (or partially cylindrical) surfaces. The screens may be formed from a translucent material. For example, locations of the lights projected on the screens of the screen assembly 212 may be visible from a side of the screens opposite the patient assembly 204 (e.g., the screen assembly 212 may be positioned between the optical sensing assembly 210 and the patient assembly 204).

In addition to capturing the images, the imaging system 202 can capture or generate various information about the images. As an example, the imaging system 202 may generate timing information about the images. The timing information can include a timestamp corresponding to each of the images. Alternatively or additionally, a frame rate (e.g., 10 frames/second, 24 frames/second, 60 frames/second) can be stored with a group of images and/or each captured image. Other types of information that can be generated for the images can include an identifier of a camera, a position of a camera, and/or settings used when capturing the image(s).

The patient assembly 204 can be secured to the patient 150. The patient assembly 204 or parts thereof may be worn by the patient 150 and may move freely with the patient 150 (e.g., at least a part of the patient assembly 204 may, when mounted to the patient 150, move in concert with patient head movement). Sometimes, the imaging system 202 may not be mounted to the patient 150 and/or may not move in concert with patient head movement.

The patient assembly 204 can optionally include one or more light emitters (or projectors) that emit a pattern of light that projects on one or more surfaces (e.g., screens of the screen assembly 212). The projected light from the patient assembly 204 can then be imaged to determine a position of the patient assembly 204 relative the patient 150. For example, the light emitters may emit beams of substantially collimated light (e.g., laser beams) that project onto the surfaces of the screen assembly 212 as points. Based on the locations of these points on the surfaces, a coordinate system can be determined, such as by the imaging system 202, the motion determining device 206, or another computing system described herein, for the patient assembly 204. The coordinate system can then be used, by any of the computing systems described above, to determine a position and orientation of the patient assembly 204 and the patient 150's dentition.

Sometimes, the patient assembly 204 can include separate components that can be configured to be worn on upper dentition and lower dentition of the patient 150 and to move independently of each other so that motion of the lower dentition relative to the upper dentition can be determined (e.g., by the motion capture system 200). Examples of the patient assembly 204 are illustrated and described throughout, such as in FIG. 3.

The motion determining device 206 can be configured to determine motion of the patient assembly 204 based on images captured by the imaging system 202. The motion determining device 206 can be a computing device that uses image processing techniques to determine 3D coordinates of the patient assembly 204 (or portions of the patient assembly) as the patient 150's jaw is in different positions. For example, images captured by the optical sensing assembly 210 of screens of the screen assembly 212 may be processed by the motion determining device 206 to determine positions on the screens at which light from the patient assembly 204 is projected. These positions may be converted, by the motion determining device 206, to 3D coordinates with respect to the screen assembly 212. From those 3D coordinates, one or more positions and orientations of the patient assembly 204 (or components of the patient assembly 204) may be determined by the motion determining device 206. The motion determining device 206 can be any other type of computing system, network of computing devices, and/or cloud-based system. The motion determining device 206 can also be part of one or more other components described herein, such as the imaging system 202.

Based on the determined positions and orientations of the patient assembly 204, the motion determining device 206 can determine relative positions and movements of the patient 150's upper and lower dentition. Further, the device 206 can also infer a location of a kinematically-derived axis that can be usable in modeling motion of the patient 150's mandible (including the lower dentition) about a temporomandibular joint. The kinematically-derived axis may be a hinge axis or a screw axis. For example, the hinge axis may be derived, by the device 206, from a portion of the motion data (e.g., the motion data 110 corresponding to a hinging open/closed of the patient's jaw, as described in FIG. 1). The hinge axis location may also be determined, by the device 206, based on radiographic imaging techniques, such as CBCT data. Additional motion data may be synthesized, by the device 206, based on the location of the hinge axis. For example, if a location of the hinge axis is inferred based on motion data corresponding to hinging open/closed, motion data for other bite movements (e.g., excursive or protrusive movements) may also be synthesized by the device 206 and based on that hinge axis.

FIG. 3 illustrates a block diagram of the patient assembly 204 of FIG. 2 for capturing jaw movement of the patient. In this example, the patient assembly 204 includes a clutch 220 and a reference structure 222. The clutch 220 and the reference structure 222 may not be physically connected and can move independently of one another. In some implementations, the clutch 220 and the reference structure 222 can be physically connected and/or can move together.

The clutch 220 can be configured to couple to a patient's dentition. For example, the clutch 220 may grip any remaining teeth of the dentition of the patient. The clutch 220 may also couple to an edentulous region of a patient's dentition and/or to dental implants that have been placed in edentulous regions of the patient's dentition.

The clutch 220 can include a dentition coupling device 224 and a position indicator system 228. Sometimes, the clutch 220 can couple to the lower dentition of the patient so as to move with the patient's mandible. Sometimes, the clutch 220 may couple to the patient's upper dentition so as to move with the patient's maxilla.

The dentition coupling device 224 can be configured to removably couple to the patient's dentition. The dentition coupling device 224 can rigidly couple to the patient's dentition such that while coupled, the movement of the dentition coupling device 224 relative to the patient's dentition can be minimized.

In some implementations, the device 224 can couple to the patient's dentition using brackets adhered to the patient's teeth with a dental or orthodontic adhesive. As another example, the device 224 can couple to the patient's dentition using an impression material. For example, the dentition coupling device 224 can include an impression tray and an impression material such as polyvinyl siloxane. To couple the dentition coupling device 224 to the patient's dentition, the impression tray can be filled with impression material and placed over the patient's dentition. As the impression material hardens, the dentition coupling device 224 couples to the patient's dentition.

Sometimes, the dentition coupling device 224 can be custom designed for a particular patient based on a 3D model of the patient's dentition (refer to FIG. 1). For example, the dentition coupling device 224 may be formed using a rapid fabrication machine. The rapid fabrication machine can include, but is not limited to, a 3D printer and/or a milling device, such as a computer numerically controlled (CNC) milling device. The dentition coupling device 224 may include various mechanical retention devices such as clasps that can be configured to fit in an undercut region of the patient's dentition and/or wrap around any remaining teeth.

The dentition coupling device 224 may couple to the patient's dentition using a combination of one or more mechanical retention structures, adhesives, and impression materials. For example, the dentition coupling device 224 may include apertures through which a fastening device (also referred to as a fastener), such as a temporary anchorage device, may be threaded to secure the dentition coupling device 224 to the patient's dentition, gum tissue, and/or underlying bone tissue. For example, the temporary anchorage devices may screw into the patient's bone tissue to secure the dentition coupling device 224.

The dentition coupling device 224 can additionally or alternatively include one or more fiducial markers, such as hemispherical inserts, that can be used to establish a static relationship between a position of the clutch 220 and the patient's dentition. For example, the dentition coupling device 224 may include three fiducial markers disposed along its surface. The location of these fiducial markers can then be determined relative to the patient's dentition, such as by capturing a physical impression of the patient with the clutch 220 attached or using imaging techniques, such as capturing a digital impression (e.g., with an intraoral scanner) or other types of images of the dentition and fiducial markers. Sometimes, the dentition coupling device 224 may not include fiducial markers. One or more images or a digital impression of the patient's dentition captured while the dentition coupling device 224 is mounted may be aligned, by any of the computing systems described herein, to one or more images or a digital impression of the patient's dentition that can be captured while the dentition coupling device 224 is not mounted to the patient.

The position indicator system 228 can be configured to determine position and orientation of the clutch 220. The position indicator system 228 can include multiple fiducial markers. In some examples, the fiducial markers can be spheres because a location of a center of a sphere can be determined, by a computing system, in an image regardless of an angle from which an image containing the sphere is captured. The multiple fiducial markers may be disposed (e.g., non-collinearly) so that by determining locations of each (or at least three) of the fiducial markers, the position and orientation of the clutch 220 can be determined. For example, the fiducial markers may be used to determine a position of the position indicator system 228 relative to the dentition coupling device 224, through which the position of the position indicator system 228 relative to the patient's dentition can also be determined.

Some implementations of the position indicator system 228 may not include separate fiducial markers. Rather, structural aspects of the position indicator system 228 may be used to determine the position and orientation of the position indicator system 228. For example, one or more flat surfaces, edges, or corners of the position indicator system 228 can be imaged to determine the position and orientation of the position indicator system 228. In some implementations, an intraoral scanner can be used to capture/generate a 3D model (or image) that includes a corner of the position indicator system 228 and at least part of the patient's dentition while the dentition coupling device 224 is mounted. This 3D model can then be used to determine a relationship between the position indicator system 228 and the patient's dentition. The determined relationship may be a static relationship that defines the position and orientation of the position indicator system 228 relative to the 3D model of the patient's dentition (e.g., based on the corner of the position indicator system 228 that was captured by the intraoral scanner).

The position indicator system 228 can be magnetically attached to an upper arch projector via a repeatable kinematic mount. This coupling can make it possible to easily remove the position indicator system 228 once an upper projector registration is completed. The tip of the position indicator system 228 can be sufficiently close to the upper arch dentition such that both it and a partial scan of the upper arch dentition can be captured together in an intraoral (IOS) scan. The teeth in this partial IOS scan can then be used to best fit the partial IOS scan to a complete IOS scan of the upper arch dentition. The position indicator system 228 can also be calibrated to the upper arch projector during manufacturing such that a location and orientation of laser beams emitted by the projector can be known relative the position indicator system 228. The emitted laser beams can define a coordinate system for the projector. Since the projector coordinate system can be known relative the position indicator system 228 via calibration and the location and orientation of the position indicator system 228 are known relative the patient's dentition via the IOS scans, it may be possible to accurately relate the upper projector coordinate system to the patient's upper dentition. A complete IOS scan of the lower arch may also be completed and properly related to the full arch upper arch scan using features provided by the IOS scanner. The bite relationship established by the IOS scanner software can typically be a centric occlusion (CO) bite, but may not be limited to this type of bit. A clinician can also capture the same bite relationship using a motion capture system described throughout this disclosure. Since the relationship of the upper and lower IOS scans may be known together with upper and lower projector coordinate systems for the same bite relationship, it can also be possible to animate the IOS scans using recorded motion frames. Other types of 3D scans, such as those from a cone beam CT scanner or 3D camera, can also be related to the motion data, typically by best fitting features, such as teeth, that are common to both the IOS scan and the other 3D scans.

In some embodiments, the position indicator system 228 can include a light source assembly that emits beams of light. The light source assembly may emit substantially collimated light beams (e.g., laser beams). The light source assembly can be rigidly coupled to the dentition coupling device 224 so that as the dentition coupling device 224 moves with the patient's dentition, the beams of light may also move. The position of the dentition coupling device 224 can then be determined by capturing images of where the light beams intersect with various surfaces (e.g., translucent screens disposed around the patient).

The reference structure 222 can be worn by the patient so as to provide a point of reference to measure a motion of the clutch 220. When the clutch 220 is coupled to the patient's lower dentition, the reference structure 222 can mount elsewhere on the patient's head so that the motion of the clutch 220 (and the patient's mandible) can be measured relative to the rest of the patient's head. For example, the reference structure 222 may be worn on the upper dentition. Beneficially, when the reference structure 222 is mounted securely to the patient's upper dentition, the position of the reference structure 222 may not be impacted by movement of the mandible (e.g., muscle and skin movement associated with the mandibular motion may not affect] position of the reference structure 222). Alternatively or additionally, the reference structure 222 may be worn elsewhere on the patient's face or head. Moreover, the reference structure 222 can be similar to the clutch 220 but may be worn on a dental arch opposite the clutch 220 (e.g., the upper dentition if the clutch 220 is for the lower dentition). For example, the reference structure 222 shown in FIG. 3 includes a dentition coupling device 230 that may be similar to or the same as the dentition coupling device 224, and a position indicator system 234 that may be similar to or the same as the position indicator system 228.

In some implementations, the patient assembly 204 may also include a gothic arch tracer. For example, the clutch 220 may include one or more tracing components that may move across a surface of the reference structure 222. The tracing components may have adjustable heights. For example, the gothic arch tracer can be an adjustable device that fits over a patient's edentulous arches. An adjustable screw in one arch can ride against a pad in the opposing arch. This configuration can allow a clinician to set a desired vertical dimension and then have the patient slide left, right, forward, etc. to assess functionality at that vertical dimension. Attaching motion capturing system projectors to such a device can also allow the clinician to capture the vertical dimension precisely and record motion data at this height.

Figure 4:
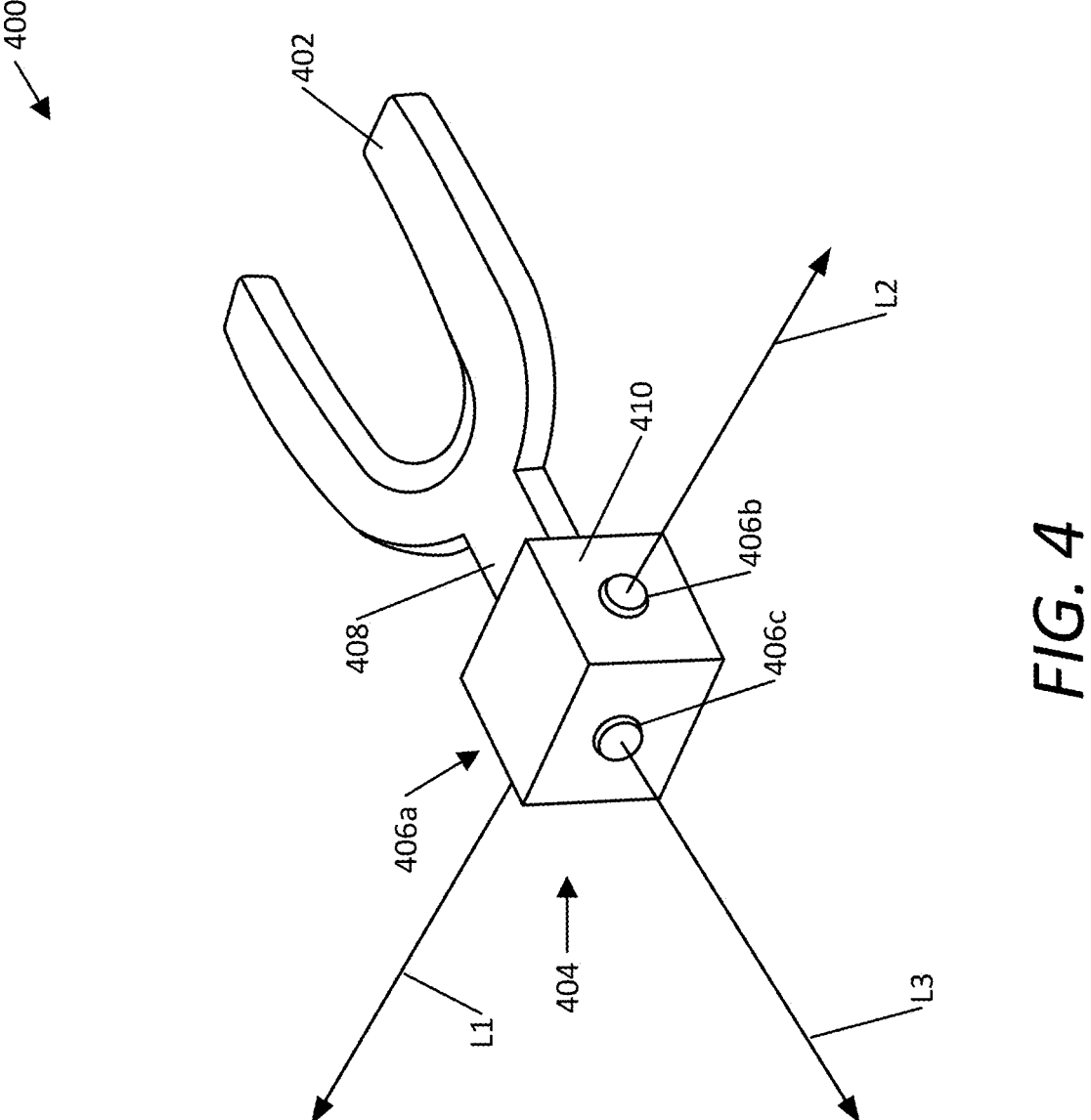
FIG. 4 illustrates an example clutch that can couple to a patient's dentition.

FIG. 4 illustrates an example clutch 400 that can couple to a patient's dentition. The clutch 400 can be an example of the clutch 220 or other clutches that may be used with the disclosed technology. In this example, the clutch 400 includes a dentition coupling device 402, a light source assembly 404, and an extension member 408. The dentition coupling device 402 can be an example of the dentition coupling device 224 described in FIG. 3. The light source assembly 404 can be an example of the position indicator system 228 described in FIG. 4.

The light source assembly 404, which may also be referred to as a projector, can be configured to emit light beams, such as light that is substantially collimated. Collimated light travels in one direction. A laser beam can be an example of collimated light. The light source assembly 404 can also include one or more lasers. Although alternatives are possible, the one or more lasers may include semiconductor lasers, such as laser diodes or solid-state lasers (e.g., diode-pumped solid-state lasers).

The light source assembly 404 can include a first, second, and/or third light emitters. The first and second light emitters can emit substantially collimated light in parallel but may be in opposite directions (e.g., the first and second light emitters may emit light in antiparallel directions) such as to the left and right of the patient when the clutch 400 is coupled to the patient's dentition. In some implementations, the first and second light emitters can be collinear and/or substantially collinear (e.g., offset by a small amount such as less than 5 micrometers, less than 10 micrometers, less than 25 micrometers, less than 50 micrometers, less than 100 micrometers, etc.). The third light emitter can emit substantially collimated light in a direction of a line that intersects with or substantially intersects with lines corresponding to a direction of the first and second light emitters. Lines that intersect share a common point. Lines that substantially intersect may not necessarily share a common point, but may intersect if offset by a small amount such as less than 5 micrometers, less than 10 micrometers, less than 25 micrometers, less than 50 micrometers, less than 100 micrometers, etc. In some implementations, the third light emitter can emit light in a direction that is perpendicular to the first and second light emitters, such as towards a direction the patient is facing.

In some implementations, the third light emitter can emit light in a direction that is offset from the direction of the first light emitter so as to be directed toward a same side of the patient as a direction of the first light emitter. For example, the third light emitter may be offset from the first light emitter by an offset angle that can be an acute angle. The third light emitter may be offset from the first light emitter by an offset angle that can be less than 90 degrees such that the light emitted by both the first light emitter and the second light emitter may intersect with the same screen (e.g., a planar screen having a rectangular shape and being disposed on a side of the patient). The third light emitter may be offset from the first light emitter by an offset angle of between approximately 1 degree to 45 degrees. In some implementations, the offset angle can be between 3 degrees and 30 degrees. In some implementations, the offset angle can between 5 degrees and 15 degrees. For example, the offset angle may be less than 10 degrees. The offset angle can be any one or more other desired angles.

In some implementations, one or more compensation factors can be determined to compensate for an offset from the first and second light emitters being collinear, or an offset from the third light emitter emitting light in a direction of a line that intersects with the directions of the first and second light sources. A compensation factor may also be determined for the offset angle of the third light emitter with respect to the first and second light emitters. For example, an offset angle compensation factor may specify an angle between the direction of the third light emitter and a line defined by the first light emitter. In implementations in which the orientation of the third light emitter is directed perpendicular to or substantially perpendicular to the direction of the first light emitter, the offset angle compensation factor may be 90 degrees or approximately 90 degrees. In implementations in which the orientation of the third light emitter is directed toward a side of the patient, the offset angle compensation factor may, for example, be between approximately 5 and 45 degrees. The compensation factors may be determined, by any of the computing systems described herein, specifically for each position indicator system manufactured to account for minor variation in manufacturing and assembly. The compensation factors may be stored in a data store (such as on the motion determining device 206 or on a computer readable medium accessible by the motion determining device 206). Each position indicator system may be associated with a unique identifier that can be used to retrieve the associated compensation factor. The position indicator system 234 may include a label with the unique identifier or a barcode, QR code, etc. that specifies the unique identifier.

Some implementations of the light source assembly 404 can include a single light source and use one or more beam splitters such as prisms or reflectors (e.g., mirrors) to cause that light source to function as multiple light emitters by splitting the light emitted by that light source into multiple beams. The emitted light can also emanate from a common point. As another example, the light source assembly 404 may include apertures or tubes through which light from a common source can be directed. Some implementations may include separate light sources for each of the light emitters.

In the example of FIG. 4, the light source assembly 404 can include light emitters 406a, 406b, and 406c (referred to collectively as light emitters 406) and a housing 410. The light emitter 406a can emit a light beam L1, the light emitter 406b can emit a light beam L2, and the light emitter 406c can emit a light beam L3. The light beams L1 and L2 can be parallel to each other, and/or directed in opposite directions. The light beam L3 can be perpendicular to the light beams L1 and L2. In at least some implementations, the housing 410 can position the light emitters 406 so that the light beams L1, L2, and L3 are approximately coplanar with an occlusal plane of the patient's dentition. Although the light beam L3 may be perpendicular to the light beams L1 and L2 in the example of FIG. 4, alternative implementations are possible.

The housing 410 may be approximately cube shaped and can include apertures through which the light emitters 406 extend. The light emitters also may not extend through apertures in the housing 410 and instead light emitted by the light emitters 406 can pass through apertures in the housing 410.

In the example of FIG. 4, the dentition coupling device 402 is rigidly coupled to the light source assembly 404 by an extension member 408. The extension member 408 can extend from the dentition coupling device 402 and can extend out of the patient's mouth when the dentition coupling device 402 is worn on the patient's dentition. In some implementations, the extension member 408 can be permanently attached to the light source assembly 404 such as by being formed integrally with the housing 410 or joined by welding or a permanent adhesive. The extension member 408 can also be removably attach to the light source assembly 404. Because the light source assembly 404 can be rigidly coupled to the dentition coupling device 402, the position and orientation of the dentition coupling device 402 can be determined from the position and orientation of the light source assembly 404.

The housing 410 and the dentition coupling device 402 can also be integral (e.g., formed from a single material or coupled together in a manner that is not configured to be separated by a user). The housing 410 can also include a coupling structure to removably couple to the extension member 408 of the dentition coupling device 402. In this manner, the dentition coupling device 402 can be a disposable component that may be custom fabricated for each patient, while the light source assembly 404 may be reused with multiple dentition coupling devices. The housing 410 may also include a connector that can mate with a connector on the dentition coupling device 402.

Additionally or alternatively, the housing 410 may couple to the dentition coupling device 402 with a magnetic clasp. Some implementations may include a registration structure that can cause the housing 410 to join with the dentition coupling device 402 in a repeatable arrangement and orientation. In some implementations, the registration structure can include a plurality of pins and corresponding receivers. In an illustrative example, the registration structure can include a plurality of pins disposed on the housing 410 and corresponding receivers (e.g., holes) in the dentition coupling device 402 (or vice versa). The registration structure can include a plurality of spherical attachments and a plurality of grooves. In an illustrative example, the registration structure can include three or more spherical attachments disposed on the housing 410 and two or more v-shaped grooves disposed on the dentition coupling device 402 that are disposed such that the spherical attachments may fit into the grooves when the housing 410 is in a particular orientation and position relative to the dentition coupling device 402. In some implementations, the registration structure can include a spring-mounted pin or screw that serves as a detent to impede movement of the housing 410 with respect to the dentition coupling device 402.

Figures 5A, 5B:
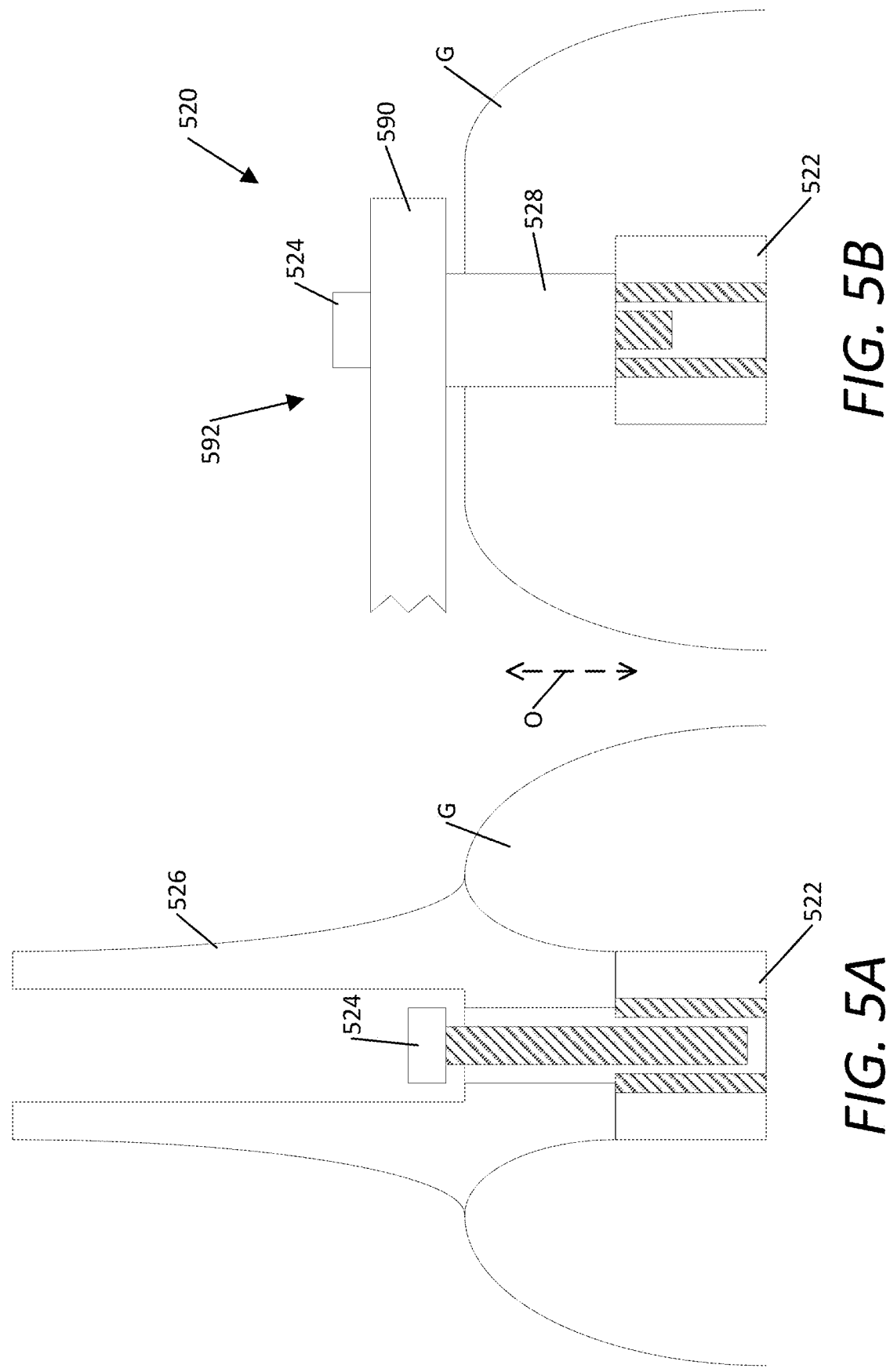
FIGS. 5A-B are cross-sectional side views that illustrate attachment of a dentition coupling device to a dental implant.

FIGS. 5A-B are cross-sectional side views that illustrate attachment of a dentition coupling device 520 to a dental implant 522. The dentition coupling device 520 is an example of the dentition coupling device 224 or the dentition coupling device 230. The dentition coupling device 520 may include one or more fixed arms and one or more pivotable arms that can be positioned to align with the patient's dentition.

FIG. 5A is a cross-sectional side view that illustrates an implant abutment 526 attached to a dental implant 522 that is disposed in the patient's gingival tissue G. The implant abutment 526 can be held in place with an implant screw 524. The implant screw 524 has threads that mate with corresponding threads in a receiver of the dental implant 522. A patient receiving dentures may have several dental implants placed to support and secure the denture.

FIG. 5B is a cross-sectional side view of the dental implant 522 and gingival tissue G with the implant abutment 526 removed and the dentition coupling device 520 attached to the dental implant 522. Here, the implant screw 524 passes through a slot 592 of an arm 590 of the dentition coupling device 520, through an offset 528, and into the dental implant 522. As shown in this figure, at least a portion of the threads of the implant screw 524 can be interlocked with the threads of the receiver of the dental implant 522. The offset 528 may be a cylindrical structure that includes an aperture through which a portion of the implant screw 524 may pass. For example, an aperture in the offset 528 may allow passage of the threaded portion of the implant screw 524 but not the head of the implant screw 524. The offset 528 may be sized in the occlusal dimension (O) so as to offset the arm 590 from the gingival tissue G.

Some implementations may use a washer to couple the implant screw 524 to the arm 590 (e.g., when an aperture in the arm 590 is larger than the head of the screw). The washer may be formed from a flexible material such as rubber. In some implementations, the arm 590 may be secured to the threads of the receiver of the dental implant 522 with a scanning abutment. A scanning abutment may include a threaded region that can be sized to fit into and mate with the threads of the receiver of the dental implant 522. The scanning abutment may also include a fiducial structure that can used to determine a location and orientation of the implant 522 when the scanning abutment is attached. For example, the scanning abutment may be imaged with a component of the image capture system (e.g., an intraoral scanner or a 2D or 3D camera) to determine locations of the associated dental implant.

Figure 6:
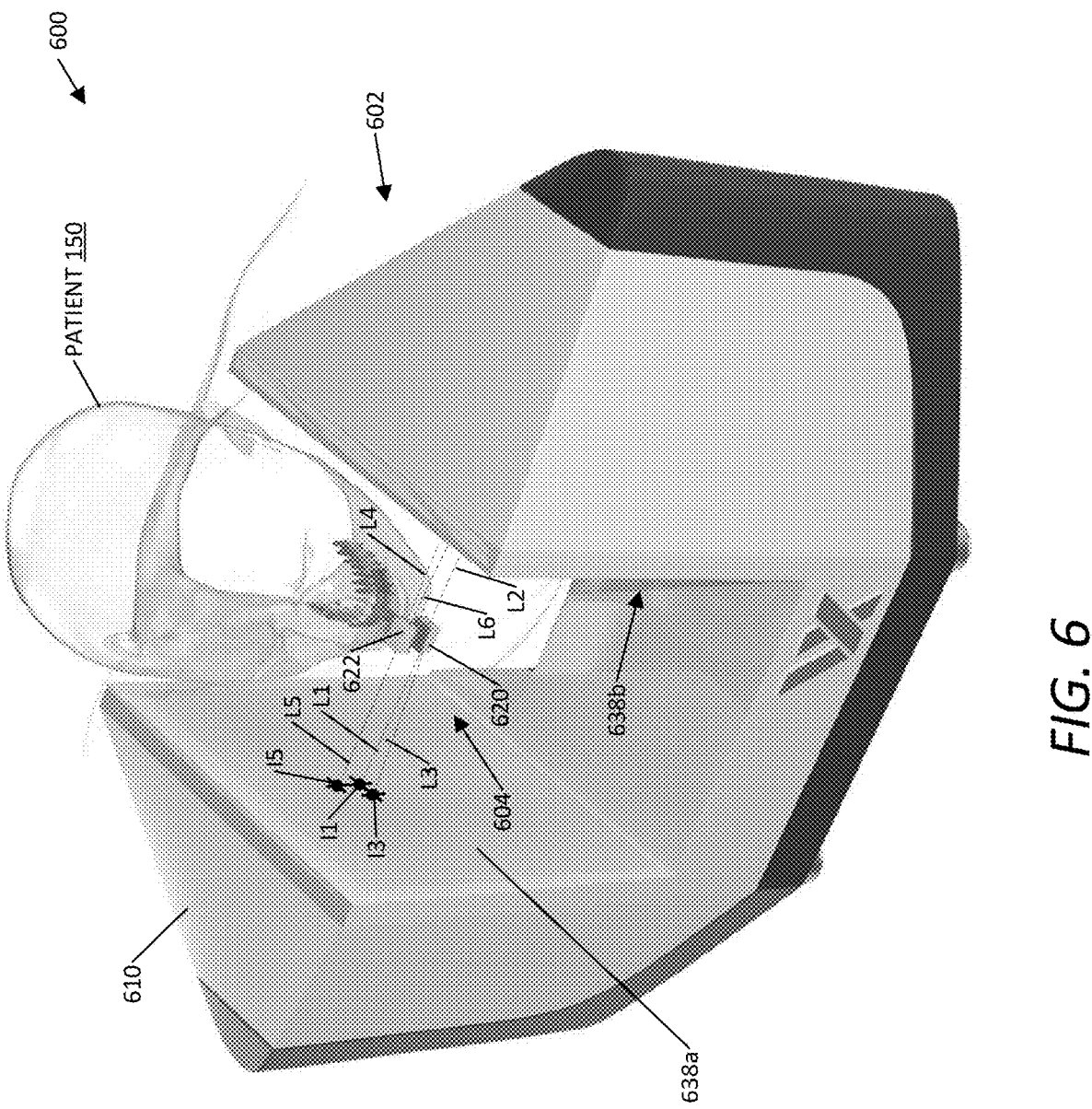
FIG. 6 illustrates an example motion capture system.

FIG. 6 illustrates an example motion capture system 600 for capturing jaw movement. The motion capture system 600 can implement two screens, although additional or fewer screens may be used. The motion capture system 600 is an example of the motion capture system 200 described herein. The motion capture system 600 includes an imaging system 602 and a patient assembly 604. In this example, the imaging system 602 includes a housing 610. The imaging system also may include a screen 638a and a screen 638b (collectively referred to as screens 638), which can be positioned so as to be on opposite sides of a patient's face (e.g., screen 638b to the left of the patient's face and screen 638a to the right of the patient's face). In some implementations, a screen framework can be disposed within housing 610 to position the screens 638 with respect to each other and the housing 610.

As shown in FIG. 6, this implementation may not include a screen disposed in front of the patient's face. Beneficially, by not having a screen in front of a patient's face, the motion capture system 600 may provide better access to the patient's face by a caregiver. Also shown is patient assembly 604 of the motion capture system 600.

In some implementations, the patient assembly 604 can include a clutch 620 and a reference structure 622, each of which may include a light source assembly having one or more light emitters (e.g., 3 light emitters). The clutch 620 is an example of the clutch 220 described herein and the reference structure 622 is an example of the reference structure 222. In FIG. 6, the clutch 620 can be attached to the patient's mandible (e.g., lower dentition) and can emit light beams L1, L2, and L3. Light beams L1 and L3 can be directed towards the screen 638a, intersecting at intersection points I1 and I3, respectively. Light beam L2 can be directed toward the screen 638b. Although alternatives are possible, in this example, the light beams L1 and L3 can be offset from each other by approximately 15 degrees. The light beams L1 and L2 can be collinear and directed in opposite directions (e.g., L2 may be offset from L1 by 180 degrees).

The reference structure 622 can be attached to the patient's maxilla (e.g., upper dentition) and can emit light beams L4, L5, and L6. Light beams L4 and L6 can be directed towards the screen 638b. Light beam L5 can be directed towards the screen 638a, intersecting at intersection point I5. Although alternatives are possible, in this example, the light beams L4 and L6 can be offset from each other by approximately 15 degrees. The light beams L4 and L5 can be collinear and directed in opposite directions (e.g., L4 may be offset from L5 by 180 degrees).

As the patient's dentition moves around, the clutch 620 and the reference structure 622 can move in concert with the patient's dentition, causing the light beams to move and the intersection points to change. An optical sensing assembly of the motion capture system 600 (e.g., cameras embedded within the housing 610 of the motion capture system 600 behind the screens 638*a* and 638*b*) may capture images of the screens 638 so that the intersection points can be determined by any of the computing systems described herein.

A location of a first axis associated with the clutch 620 may be identified based on the intersection points from the light beams L1 and L2. An intersection coordinate between the light beams L1 and L3 may then be determined based on the distance between the intersection points I1 and I3 on the screen 638*a*. For example, the distance from the intersection point I1 along the first axis can be determined, by any of the computing systems described herein, based on the distance between the points I1 and I3 and the angle between I1 and I3. As described throughout this disclosure, the angle between I1 and I3 can be determined for the clutch 620 and may be stored in a data store, for example, on a non-transitory computer-readable storage medium. Using this distance, the intersection coordinate can be found, which may have a known relationship to the clutch 620 and therefore the patient's dentition. A coordinate system for the clutch 620 can also be determined based on the intersection points (e.g., a second axis can be defined by a cross product of the first axis and a vector between the intersection points I1 and I3, and a third axis can be defined by a cross product of the first axis and the second axis). In a similar manner, position and orientation of the reference structure 622 can be determined based on the intersection points of the light beams L4, L5, and L6 with the screens 638*a* and 638*b*.

In some implementations, 3D coordinate systems for the clutch 620 and the reference structure 622 can be determined using only two screens. In some implementations, the motion capture system 600 includes only two screens and the motion capture system 600 may not include a third screen. In some implementations, the imaging system captures images of only two screens. Some implementations identify intersection points using images captured of only two screens. For example, two intersection points from light beams emitted by a reference structure can be identified on an image of the same screen.

In some implementations, a light emitter being oriented to emit light in a first direction toward the screen can indicate that the light emitter is oriented to emit light in a first direction toward the screen when the light emitter is attached to a patient (or other structure) and positioned for motion tracking with respect to the imaging system.

Figure 7:
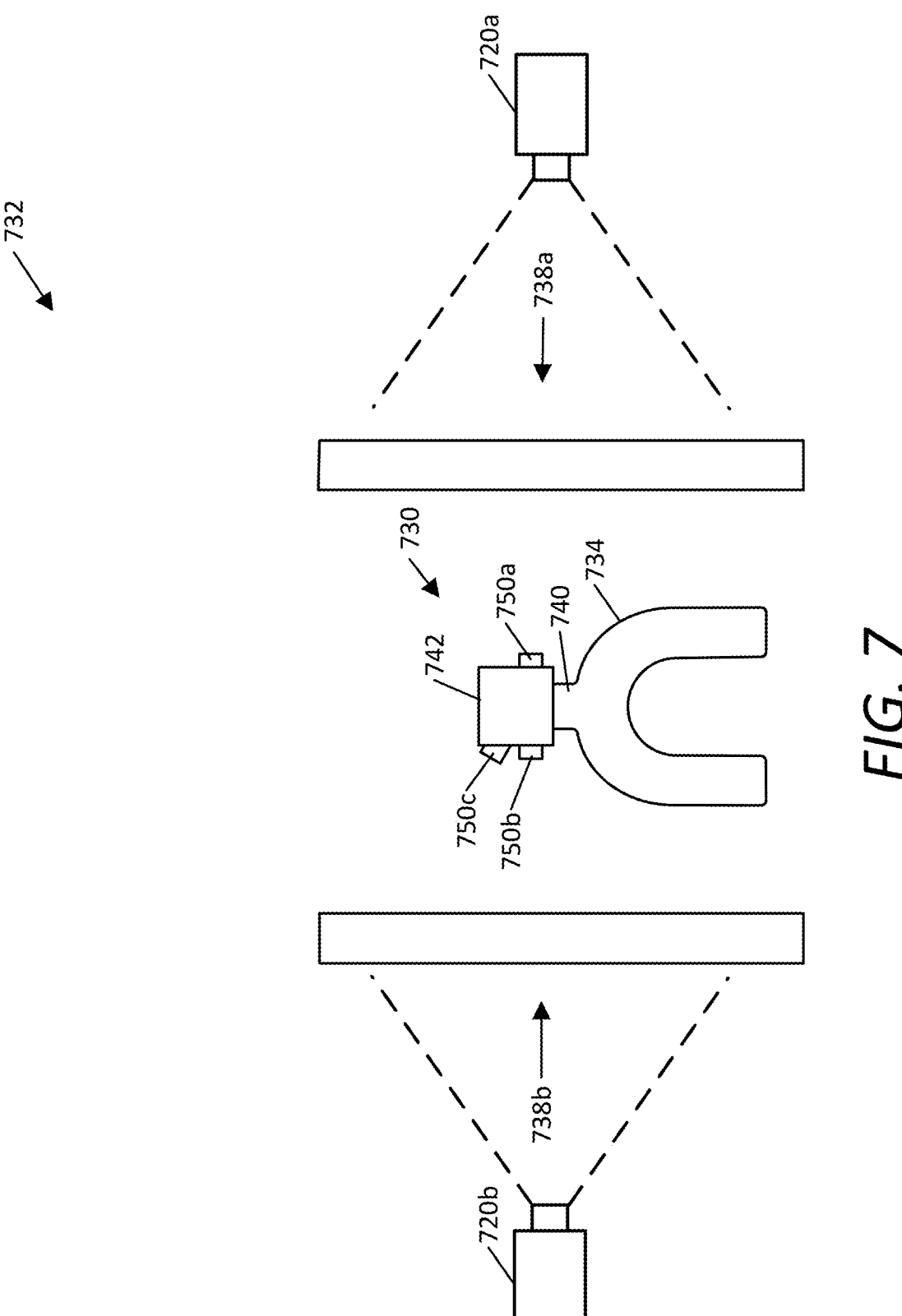
FIG. 7 illustrates a top view of an example reference structure and imaging system for use with the disclosed technology.

FIG. 7 illustrates a top view of an example reference structure 730 and imaging system 732 for use with the disclosed technology. The reference structure 730 is an example of the reference structure 622 described herein. The imaging system 732 is an example of the imaging system 602.

The reference structure 730 includes a dentition coupling device 734, an extension member 740, and a light source assembly 742. The dentition coupling device 734 is an example of the dentition coupling device 230 and may be similar to the example dentition coupling devices previously described. The light source assembly 742 is an example of the position indicator system 234. In this example, the light source assembly 742 includes light emitters 750*a*, 750*b*, and 750*c* (collectively referred to as light emitters 750).

The dentition coupling device 734 is configured to removably couple to the dentition of the patient. The dentition coupling device 734 can be coupled to an opposite arch of the patient's dentition as the clutch (e.g., the dentition coupling device 734 of the reference structure 730 couples to a maxillary arch when a clutch is coupled to a mandibular arch). In some implementations, the dentition coupling device 734 can be coupled to the extension member 740 that can extend out through the patient's mouth when the dentition coupling device 734 is coupled to the patient's dentition. The extension member 740 may be similar to the extension member 408.

The imaging system 732 includes screens 738*a* and 738*b* (referred to collectively as screens 738), and cameras 720*a* and 720*b* (referred to collectively as cameras 720). In this example, the screen 738*a* can be oriented parallel to the screen 738*b*. In some implementations, the imaging system 732 may also include a screen framework (not shown) that positions the screens 738 with respect to each other. For example, the screen framework may extend beneath the reference structure 730 and couple to the bottoms of the screens 738. Together, the screens 738 and the screen framework can be an example of the screen assembly 212. The cameras 720 can be an example of the optical sensing assembly 210.

The screens 738 may be formed from a translucent material so that the points where the light beams emitted by the light source assembly 742 intersect with the screens 738 may be viewed from outside of the screens 738. Images that include these points of intersection may be recorded by the cameras 720. The motion determining device 206 may analyze these captured images using image processing techniques to determine points of intersection of the light beams with the screens 738 to determine a location of the light source assembly 742. The position of the light source assembly of a clutch (not shown) may be determined in a similar manner.

The cameras 720 can be positioned and oriented to capture images of the screens 738. For example, the camera 720*a* can be positioned and oriented to capture images of the screen 738*a*, and the camera 720*b* can be positioned and oriented to capture images of the screen 738*b*. In some implementations, the cameras 720 can be mounted to the screen framework so that the position and orientation of the cameras 720 may be fixed with respect to the screens. For example, each of the cameras 720 may be coupled to the screen framework by a camera mounting assembly. In this manner, the position and orientation of the cameras 720 relative to the screens 738 may not change if the screen framework is moved. In some implementations, the screen framework includes a housing (e.g., as shown at 610 in FIG. 6), within which the cameras 720 are disposed.

Figure 8:
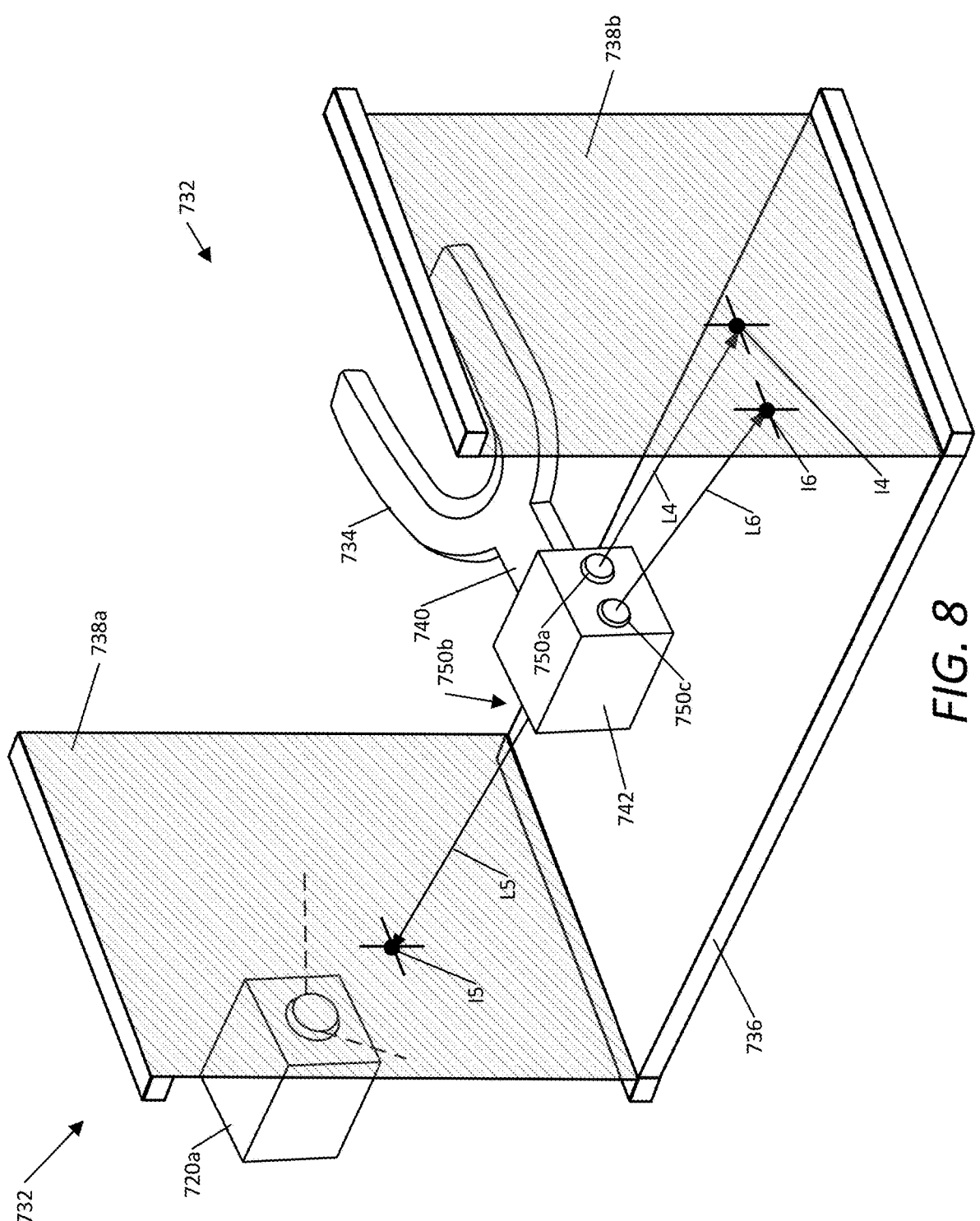
FIG. 8 illustrates a perspective view of the reference structure and imaging system in FIG. 7.

FIG. 8 illustrates a perspective view of the reference structure 730 disposed between the screens 738 of the imaging system 732 in FIG. 7. The screens 738 may be joined together by a screen framework 736 that positions and orients the screens 738 with respect to one another. In this example, the light emitter 750*a* can be emitting a light beam L4, which intersects with the screen 738*b* at intersection point I4; the light emitter 750*b* can emit a light beam L5, which intersects with the screen 738*a* at intersection point I5; and the light emitter 750*c* can emit a light beam L6, which intersects with the screen 738*a* at intersection point I6. As the position and orientation of the reference structure 730 change relative to the screens 738, the locations of at least some of the intersection points I4, I5, and I6 may change as well.

The camera 720*a* can be configured to capture images of the screen 738*a*, including the intersection point I5 of the light beam L5 emitted by the light emitter 750*b*. The camera 720*a* may capture a video stream of these images. Similarly, although not shown in this illustration, the camera 720*b* can be configured to capture images of the screens 738*b* and the intersection points I4 and I6.

The captured images from the cameras 720 can then be transmitted to the motion determining device 206. The motion determining device 206 may determine, based on processing the images, the location of the intersection points I4, I5, and I6, and from those points the location of the light source assembly 742. In some implementations, a point of common intersection for the light beams L4, L5, and L6 can be determined based on the location of the intersection points I4, I5, and I6 (e.g., the point at which the light beams intersect or would intersect if extended). Based on the determined locations of the light beams, the location and orientation of the reference structure 730 relative to the screens 738 can be determined.

FIG. 9 is a flowchart of an example process 900 for fabricating a denture for a particular patient based on motion data of that patient's jaw. The process 900 can be performed by one or more of the computing systems described herein. For example, the process 900 can be performed by the system 100 described in FIG. 1. One or more operations of the process 900 may also be performed by other computing systems, cloud-based systems, computing devices, and/or network of computing devices/systems. For illustrative purposes, the process 900 is described from the perspective of a computer system.

Referring to the process 900, at operation 902, digital patient data, including motion data and a digital dental model, can be acquired by the computer system. For example, the digital patient data may include imaging data of the patient dentition, as captured by an imaging system. The imaging data may be captured using various imaging modalities, as described herein. In some implementations, the imaging data can include a 3D digital dental model of the patient's dentition. The 3D digital dental model may be captured using an intraoral scanner. The 3D digital dental model may be captured by scanning a physical impression or mold formed from a physical impression using a 3D scanner. In some implementations, the 3D digital dental model may also be generated by the computer system based on the imaging data and other digital patient data.

The acquired digital patient data may also include motion data of the patient's jaw. For example, the motion data may be captured using the motion capture system 200. The motion data may represent the patient's jaw moving through various jaw movements including, for example, excursive movements and protrusive movements. The motion data may also represent that patient's jaw position and movement as the patient pronounces specific phonetic sounds such as the "F" sound and the "S" sound. In some implementations, audio or video files may be captured as the patient pronounces the specific sounds. The computer system can map the motion data to frames or positions in the video or audio data, imaging data, or other digital patient data. Based on sound processing of the audio data or image processing of the video data, various positions in the patient's speech may be identified and the corresponding frame of the motion data may be identified. Moreover, the motion data can be annotated (automatically by the computer system and/or manually by a caregiver) with particular types of movements of the patient's jaw.

The acquired digital patient data may also include one or more anterior facial images of the patient. The anterior facial images may include two-dimensional images or 3D images. In some implementations, the anterior facial images include an image of the patient smiling and/or an image of the patient with lips in repose (e.g., relaxed). The anterior facial images may also include videos. For example, the videos may include video of the patient performing various jaw movements such as excursive movements and protrusive movements. The videos may also include video of the patient pronouncing specific phonetic sounds such as sibilants (e.g., the "S" sound) or fricatives (e.g., the "F" sound).

The acquired digital patient data may also include other types of patient images captured using imaging modalities such as CT, including CBCT, ultrasound, and/or magnetic resonance imaging (MRI).

At operation 904, the digital patient data can be integrated by the computer system. For example, the digital patient data may be integrated (e.g., formatted, fit) to a common coordinate system (e.g., positioned relative to the same XYZ axes). Different types of digital patient data may be integrated using different techniques. For example, 3D data sets may be integrated using an iterative alignment process such as an iterative closest point technique. Multiple types of the digital patient data can also include fiducial markers. The positions of the fiducial markers may be determined from the digital patient data and used to align one set of digital patient data with another.

In some implementations, the digital patient data includes two-dimensional images captured with a camera of the image capture system 107. A polygon may be generated within the common coordinate system. The two-dimensional images may be mapped to the polygon in operation 904.

At operation 906, a vertical dimension of occlusion and an occlusal plane position and orientation can be determined, by the computer system, for the particular patient. The determined vertical dimension of occlusion can indicate a desired position of the patient's mandible and maxilla when the patient's jaw is at rest. The vertical dimension of occlusion may correspond to a total distance between edentulous ridges to accommodate dentures with a desired amount of occlusal open space when the patient is at rest. The vertical dimension of occlusion influences function, comfort, and aesthetics of dentures. The determined occlusal plane may correspond to a plane disposed between the patient's maxilla and mandible that approximately corresponds to where the occlusal surfaces of the patient's teeth meet. The occlusal plane may, for example, be positioned at a desired location of the incisal edge of the patient's upper central incisors. The occlusal plane may be oriented based on the motion data. Although often referred to as an occlusal plane in the denture and dental fields, the occlusal plane need not be precisely planar and may vary from a plane to follow the curve of the patient's lips. One or more of Curve of Wilson and Curve of Spee values may also be provided by the operator to describe curvature of the occlusal plan in sagittal and coronal planes, respectively.

In some implementations, the vertical dimension of occlusion may be specified by a care provider such as dentist or physician. The vertical dimension of occlusion may also be determined based, at least in part, on motion data of the digital patient data, for example, motion data while the patient is pronouncing specific sounds such as sibilants (e.g., the "S" sound) or fricatives (e.g., the "F" sound). A desired vertical dimension of occlusion may be determined from relative positions of the maxilla and mandible as the sounds are pronounced. The vertical dimension of occlusion may also be determined from a two-dimensional facial image of the digital patient data.

The occlusal plane may, for example, be determined, by the computer system, based on applying a ratio to the vertical dimension of occlusion. In some implementations, the occlusal plane may be determined based on the two-dimensional facial image of the digital patient data. For example, the occlusal plane may be positioned so as to align the incisal edges of the upper central incisors with respect to the patient's lips.

At operation 908, the digital dental model of the digital patient data can be positioned, by the computer system, based on the position and orientation of the occlusal plane. For example, a portion of the digital dental model representing the mandibular dental arch may be positioned based on the motion data so as to be positioned at the determined vertical dimension with respect to the maxillary dental arch and so that the denture teeth on the mandibular arch align with the occlusal plane. In some implementations, a frame of the motion data that positions the mandibular dental arch at the determined vertical dimension can also be identified. In some implementations, the mandibular dental arch can be rotated about a hinge axis to open to the determined vertical dimension of occlusion. The position of the hinge axis may be inferred based on the motion data.

In some implementations, the denture design system 116 can include a user interface that displays the digital dental model, the occlusal plane, and/or both. The user interface may be configured to receive user input to adjust the vertical dimension of occlusion or the position of the occlusal plane. For example, the user interface may be configured to receive a drag (e.g., click-and-drag or touch-and-drag) input from a relevant user (e.g., care provider, dentist, physician) to interactively move the mandibular arch of the digital dental model up or down along an arch defined by the motion data or a hinge axis inferred from the motion data. Similarly, the user interface may be configured to interactively move the occlusal plane along the arch between the mandibular arch and maxillary arch of the digital dental model.

Figure 10:
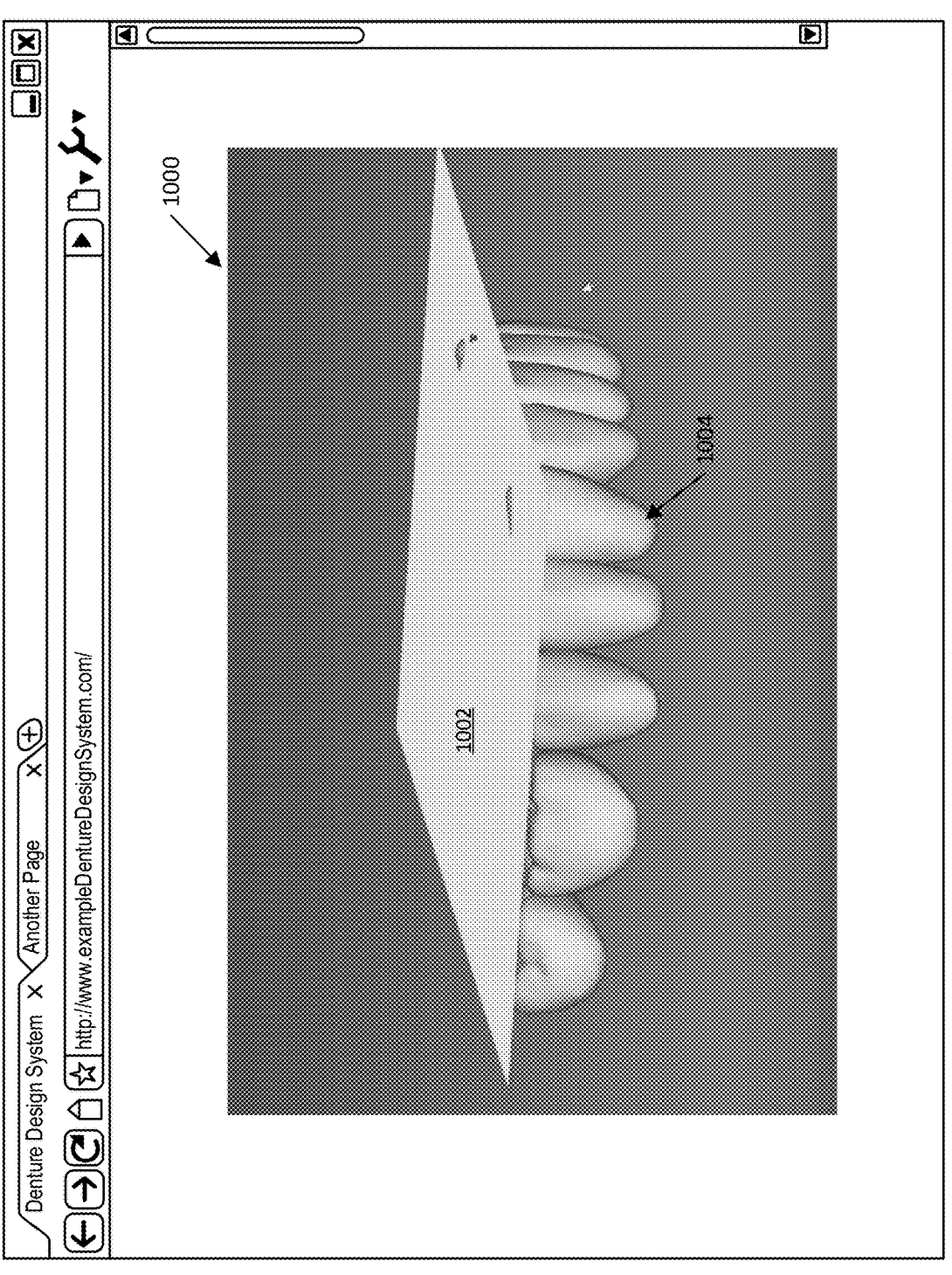
FIG. 10 is an example graphical user interface (GUI) screen generated by a denture design system to display an example occlusal plane in relation to example mandibular dentition.

For illustrative purposes, FIG. 10 is an example graphical user interface (GUI) screen 1000 generated by a denture design system 116 to display an example occlusal plane 1002 in relation to example mandibular dentition 1004. In this example, the occlusal plane 1002 can be highlighted, indicating that it is selected, by a user, and that the user may provide input to reposition the plane 1002. For example, the user interface 1000 may allow the user to drag the occlusal plane 1002 up or down, based on the motion data corresponding to movement of the patient's mouth/jaw. In some implementations, the digital denture teeth 1004 may be set into motion, by the computer system, with the occlusal plane 1002. For example, moving the plane 1002 can automatically cause the teeth 1004 to also move in response, thereby illustrating, to the user, one or more results of moving the plane 1002 as the user desires. In some implementations, the occlusal plane 1002 may be adjusted independently of the digital denture teeth 1004. The user interface 1000 may be configured to accept one or more inputs (e.g., a button or menu actuation) to cause the digital denture teeth 1004 to move (or snap) to the occlusal plane 1002. When such input is received, the computer system can automatically update the user interface 1000 such that the teeth 1004 snap to the movement of the plane 1002, based on the motion data associated with the patient. In some implementations, the occlusal plane 1002 may be displayed with respect to one arch, while the digital denture teeth of the other arch may move with the occlusal plane 1002.

Referring back to FIG. 9, at operation 910, an occlusal guidance surface can be generated, by the computer system, based on the motion data. The occlusal guidance surface may be used to guide positioning of denture teeth on one of the dental arches. The occlusal guidance surface may be generated for one or both of the mandibular arch and the maxillary arch.

In some implementations, the occlusal guidance surface can be generated for a dental arch by sweeping (or moving) at least a portion of the opposing dental arch according to the motion data. For example, a portion of the opposing dental arch may be swept through one or more of excursive and protrusive movements based on the motion data. In some implementations, the portion of the opposing dental arch may be swept through all of the movements represented in the motion data.

In some implementations, a midline polyline segment may be swept according to the motion data. The midline polyline segment may be a cross-section of the opposing dentition at the midline (e.g., middle of the dental arch). The cross-section may be generated by slicing or intersecting a vertically oriented plane through the opposing dentition.

In some implementations, the midline polyline segment may not be directly based on the opposing dentition. For example, the midline polyline segment may be a line segment on the occlusal plane that can extend in the anterior-posterior direction at the midline.

As the portion of the opposing dentition is swept according to the motion data, the occlusal guidance surface can be generated. For example, a midline polyline segment may be duplicated in multiple locations according to the motion data (e.g., the midline polyline segment may be duplicated every 25 micron, every 50 microns, every 100 microns, or another distance). The adjacent midline polyline segments may then be joined to form a surface.

In some implementations, a polygonal surface may be deformed based on the swept midline polyline segment. For example, the polygonal surface may initially be a flat surface that is positioned at the determined occlusal plane location. As the midline polyline segment is swept through different locations, the polygonal surface may be deformed vertically to the midline polyline segment.

At operation 912, digital denture teeth can be positioned, by the computer system, based on the occlusal guidance surface. The digital denture teeth may be loaded from a library of digital denture teeth (which can be stored in and accessible from a data store or other type of data repository). Some implementations may include multiple libraries of denture teeth. The digital denture teeth libraries may vary functionally, aesthetically, and/or based on manufacturer.

In some implementations, the digital denture teeth may include labels and/or annotations for anatomical landmarks such as cusps, marginal ridges, incisal edges, fossa, grooves, base boundaries, or other anatomical landmarks. These labels may be used to automatically position the digital denture teeth with respect to one another and digital denture teeth on the opposing dentition.

Figure 11:
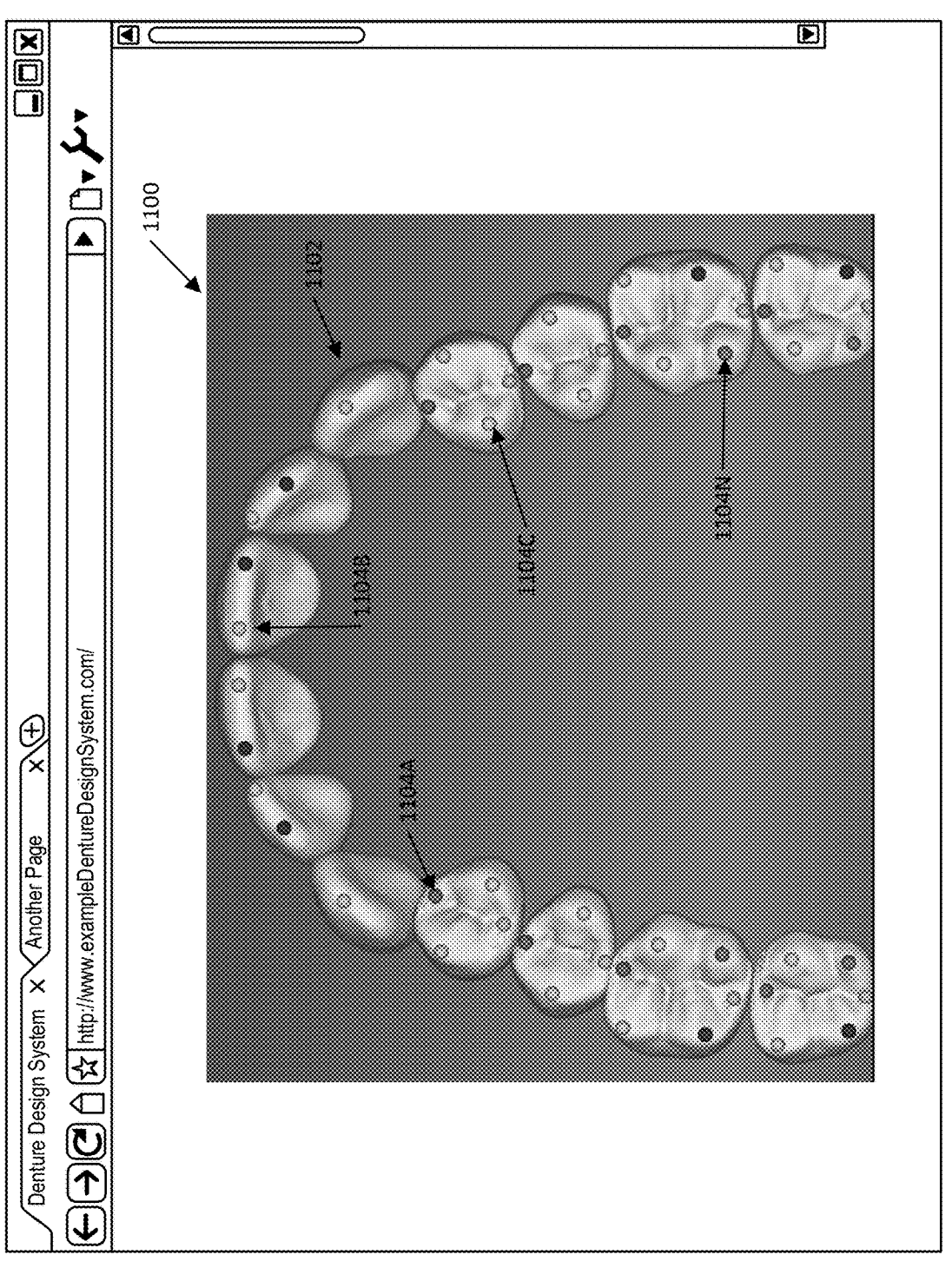
FIG. 11 is another example GUI screen generated by the denture design system to display digital denture teeth with example labels for anatomical landmarks.

With respect to operation 912, FIG. 11 is an example graphical user interface (GUI) screen 1100 generated by the denture design system 116 to display digital denture teeth 1102 with example labels 1104A-N for various anatomical landmarks. In this example, the labels 1104A-N can be displayed as spherical markers overlaid on the digital denture teeth 1102 at locations of such anatomical landmarks. Different types of anatomical landmarks may be shown with different visual characteristics and/or indicia. For example, each type of landmark can be represented by a different pattern, color, shape, grade, brightness, contrast, or other indicia. Here, different types of anatomical landmarks can be shaded differently (e.g., using different colors or shading characteristics). In some implementations, different types of anatomical landmarks may be shown using different textures. In FIG. 11, different label characteristics are used for mesial-labial cusp tips (or mesial end of the incisal edge, depending on the tooth), distal-labial cusp tips (or distal end of the incisal edge, depending on the tooth), mesial-lingual cusp tips, distal-lingual cusp tips, mesial end of the central fossa, and distal end of the central fossa.

Referring back to FIG. 9, the digital denture teeth may be initially positioned, by the computer system, in alignment with an arch curve (operation 912). The arch curve may be sized and shaped based on the digital dental model. Each of the digital denture teeth may include one or more labels that specify one or more locations on the digital denture teeth to align to the arch curve. The digital denture teeth may also be associated with a tip and torque with respect to one or more of the arch curve and the occlusal plane. When initially positioned, the digital denture teeth may be positioned based with respect to the arch curve based on the labels and automatically tipped and torqued with respect to the arch curve based on the associated values.

Figure 12:
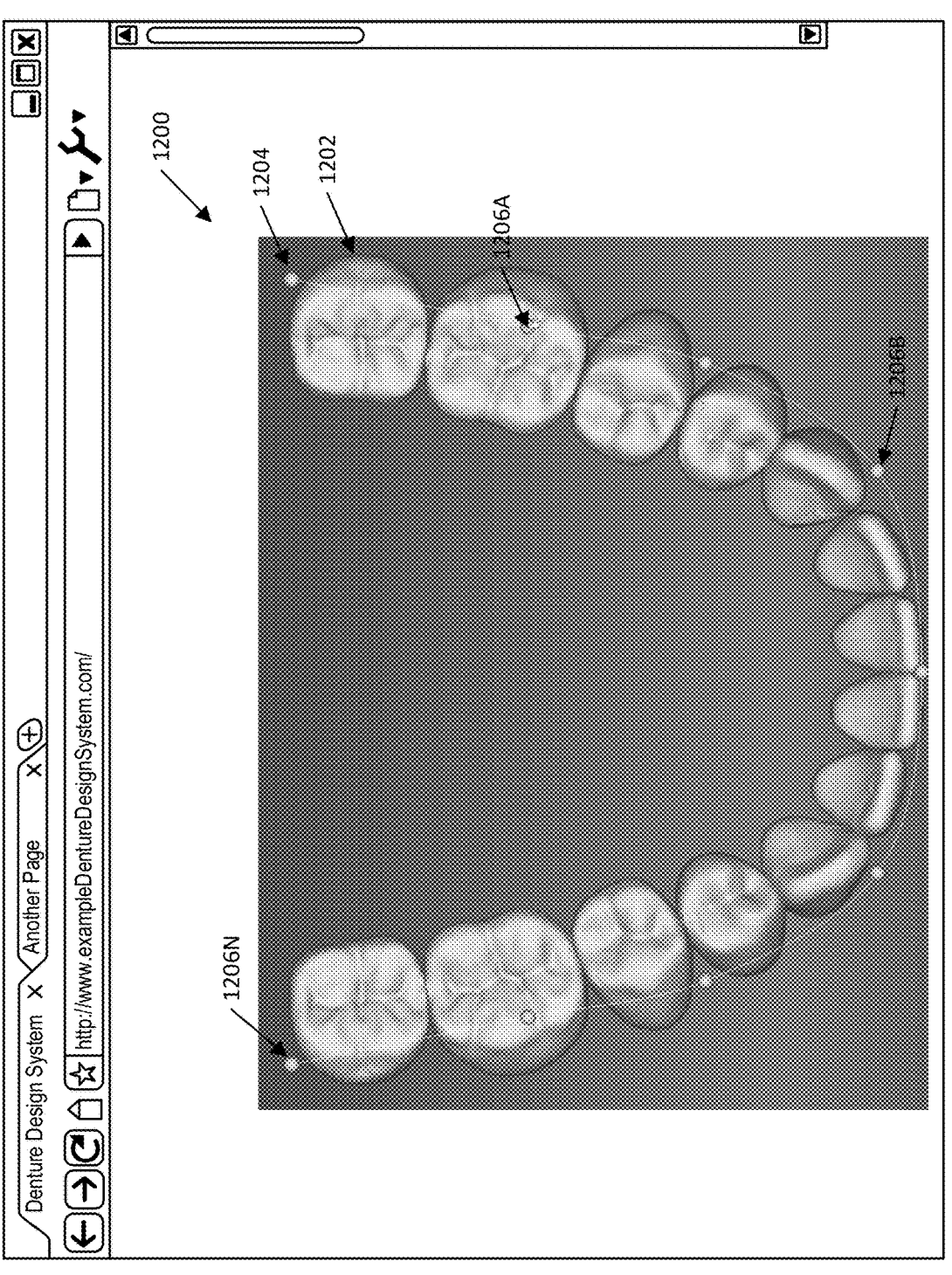
FIG. 12 is another example GUI screen generated by the denture design system to display digital denture teeth and an example arch curve.

For illustrative purposes, FIG. 12 is an example graphical user interface (GUI) screen 1200 generated by the denture design system 116 to display digital denture teeth 1202 and an example arch curve 1204. The example arch curve 1204 may be used to initially position the digital denture teeth 1202 (e.g., automatically by the computer system and/or manually by the user). Here, the arch curve 1204 is a spline curve shown with control points 1206A-N. The control points 1206A-N are shown as spheres, however the control points 1206A-N can be any other type of graphical indicia. In some implementations, the user interface 1200 can be configured to accept inputs provided by the user to change one or more positions of the control points 1206A-N (e.g., a drag may reposition a selected control point) and/or adjusts a shape of the arch curve 1204 accordingly. In some implementations, the digital denture teeth 1202 can be automatically repositioned by the computer system and updated in real-time in the user interface 1200 as the arch curve 1204 changes. In some implementations, the arch curve 1204 may be adjusted independently of the digital denture teeth 1202. The user interface 1200 may be configured to accept one or more inputs (e.g., a button or menu actuation) from the user to then cause the digital denture teeth 1202 to re-align to the arch curve 1204.

Figure 13:
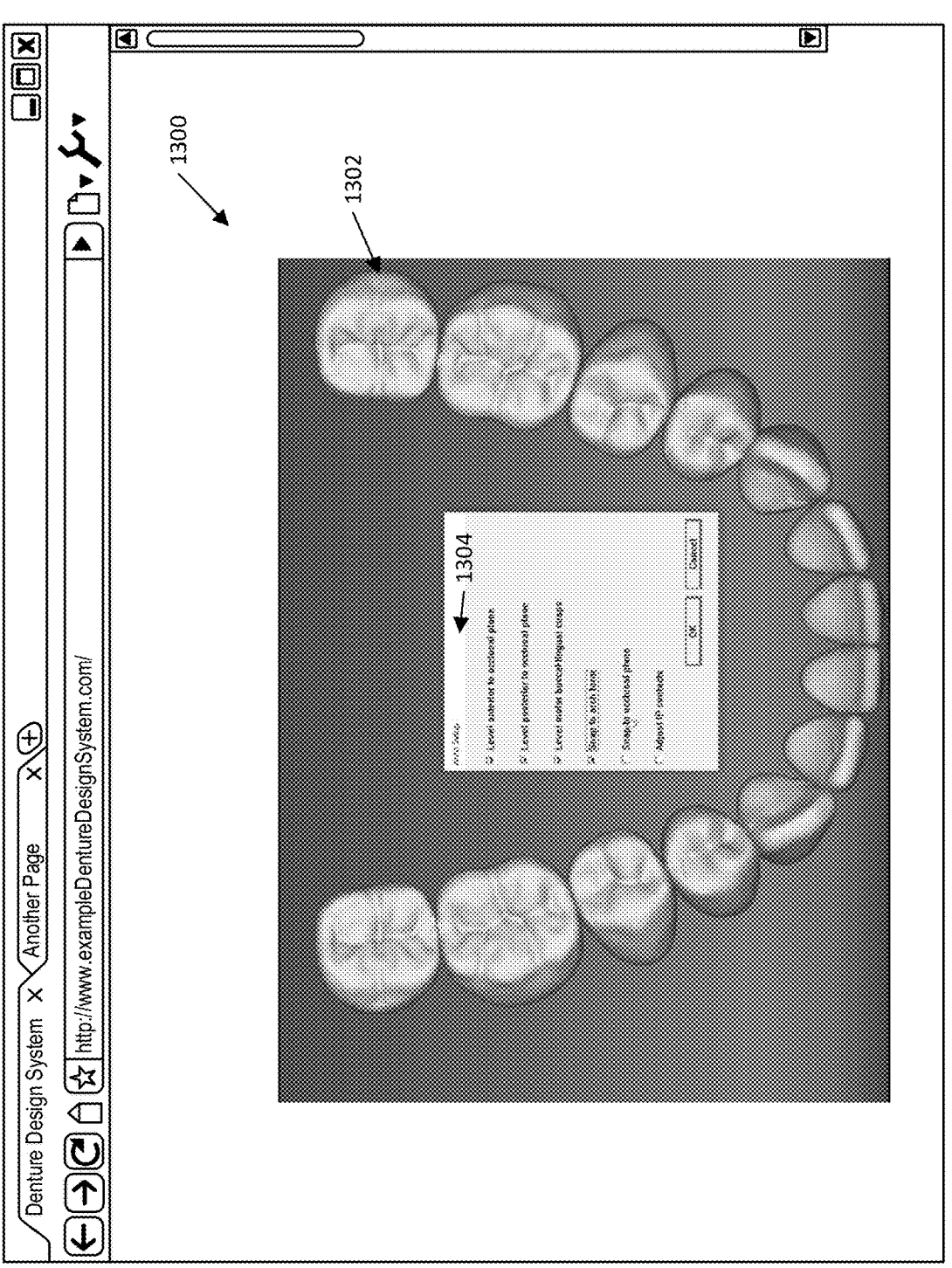
FIG. 13 is another example GUI screen generated by the denture design system with graphical elements to allow a user to adjust settings for automatically setting up (e.g., positioning) digital denture teeth for a particular patient.

As another illustrative example of operation 912 in FIG. 9, FIG. 13 is an example graphical user interface (GUI) screen 1300 generated by the denture design system 116 to allow a user to adjust settings for automatically setup (position) of digital denture teeth 1302. In this example, a dialog box 1304 can be displayed as a visual overlay of the digital denture teeth 1302. The dialog box 1304 can include checkboxes to control how the digital denture teeth 1302 may be automatically positioned. Here, the dialog box 1304 includes checkboxes for "level anterior to occlusal plane", "level posterior to occlusal plane", "level molar buccal-lingual cusps", "snap to arch form", "snap to occlusal plane", and "adjust IP contacts". One or more other options may also be presented in the dialog box 1304. The user may select one or more of the checkboxes and then upon clicking an "OK" button, the digital denture teeth 1302 can be automatically repositioned, by the computer system, accordingly.

In some implementations, the digital denture teeth 1302 may be aligned to an occlusal guidance surface. For example, cusp tips and incisal edges may be aligned to the occlusal guidance surface.

In some implementations, the digital denture teeth 1302 for at a first dental arch can be positioned according to an arch curve and an occlusal plane or occlusal guidance surface. The opposing dentition may then be aligned based on positions of the digital denture teeth 1302 of the first arch. For example, labels of anatomical landmarks may be used, by the computer system, to align the digital denture teeth 1302 of the opposing dentition with the digital denture teeth 1302 of the first dental arch (e.g., cusp tips in contact with opposing fossa). The digital denture teeth 1302 may also be positioned to achieve a desired overjet/overbite relationship. In some implementations, the digital denture teeth 1302 of the lower dentition may be positioned first based on the arch curve and occlusal guidance surface and the digital denture teeth 1302 of the upper dentition are then placed based on the lower dentition. The computer system can implement various positions of the digital denture teeth 1302 according to input provided by the user in the dialog box 1304.

Figure 14:
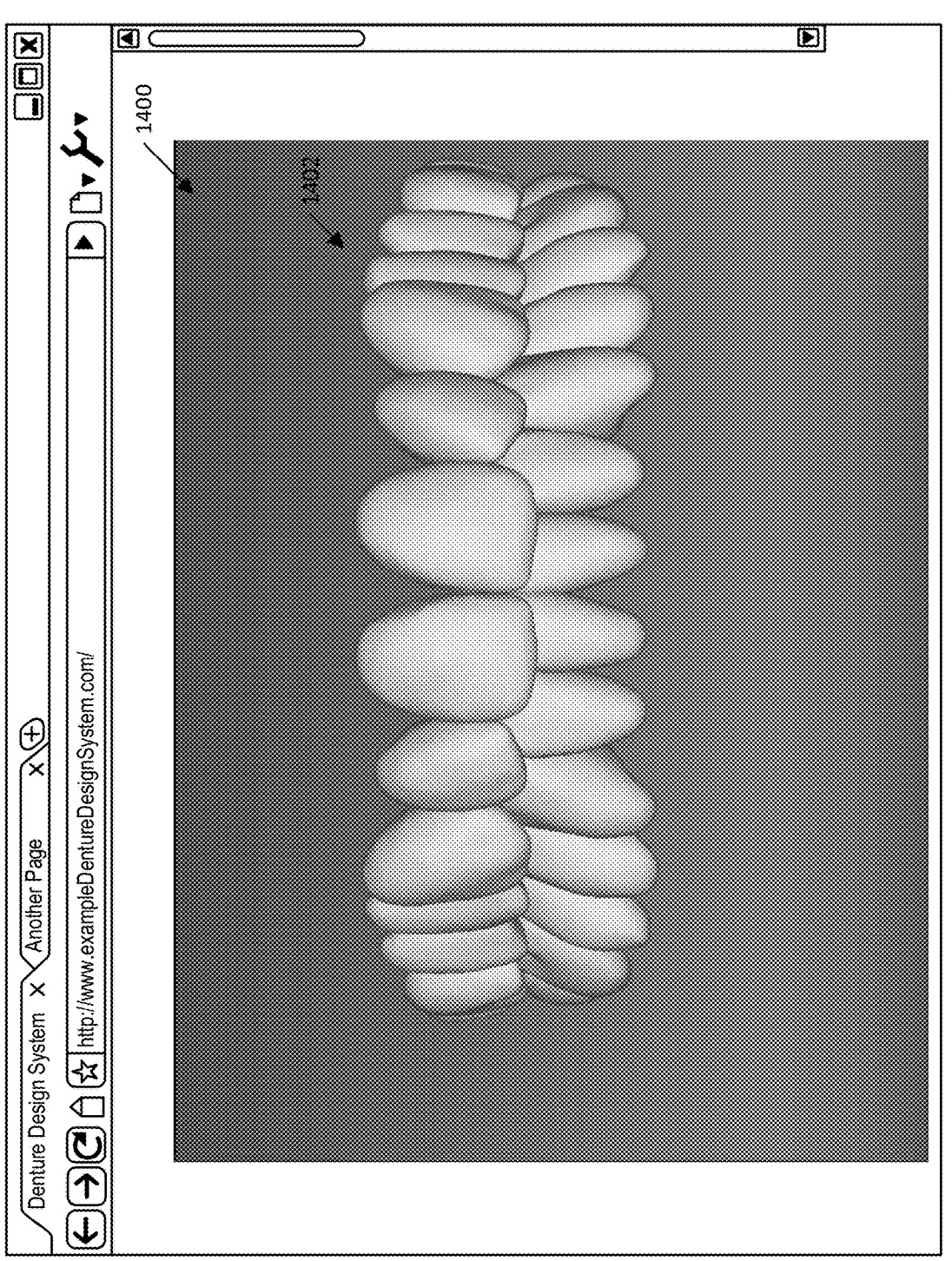
FIG. 14 is another example GUI screen generated by the denture design system to show a complete set of digital denture teeth.

As another illustrative example of operation 912 in FIG. 9, FIG. 14 is an example graphical user interface (GUI) screen 1400 generated by the denture design system 116 to show a complete set of digital denture teeth 1402. As described previously, the digital denture teeth of one of the arches (e.g., the lower arch) may be positioned based on one or more of an arch curve, an occlusal plane, or an occlusal guidance surface. The digital denture teeth of the other arch (e.g., the upper arch) may then be positioned based on the positions of the digital denture teeth of the first arch.

Once the digital denture teeth are in their initial positions, their positions may be further refined. For example, an additional user interface can be presented to the user at their computing device, which can be configured to receive user input to adjust the positions of one or more of the digital denture teeth relative to each other (or independently of each other).

Figure 15:
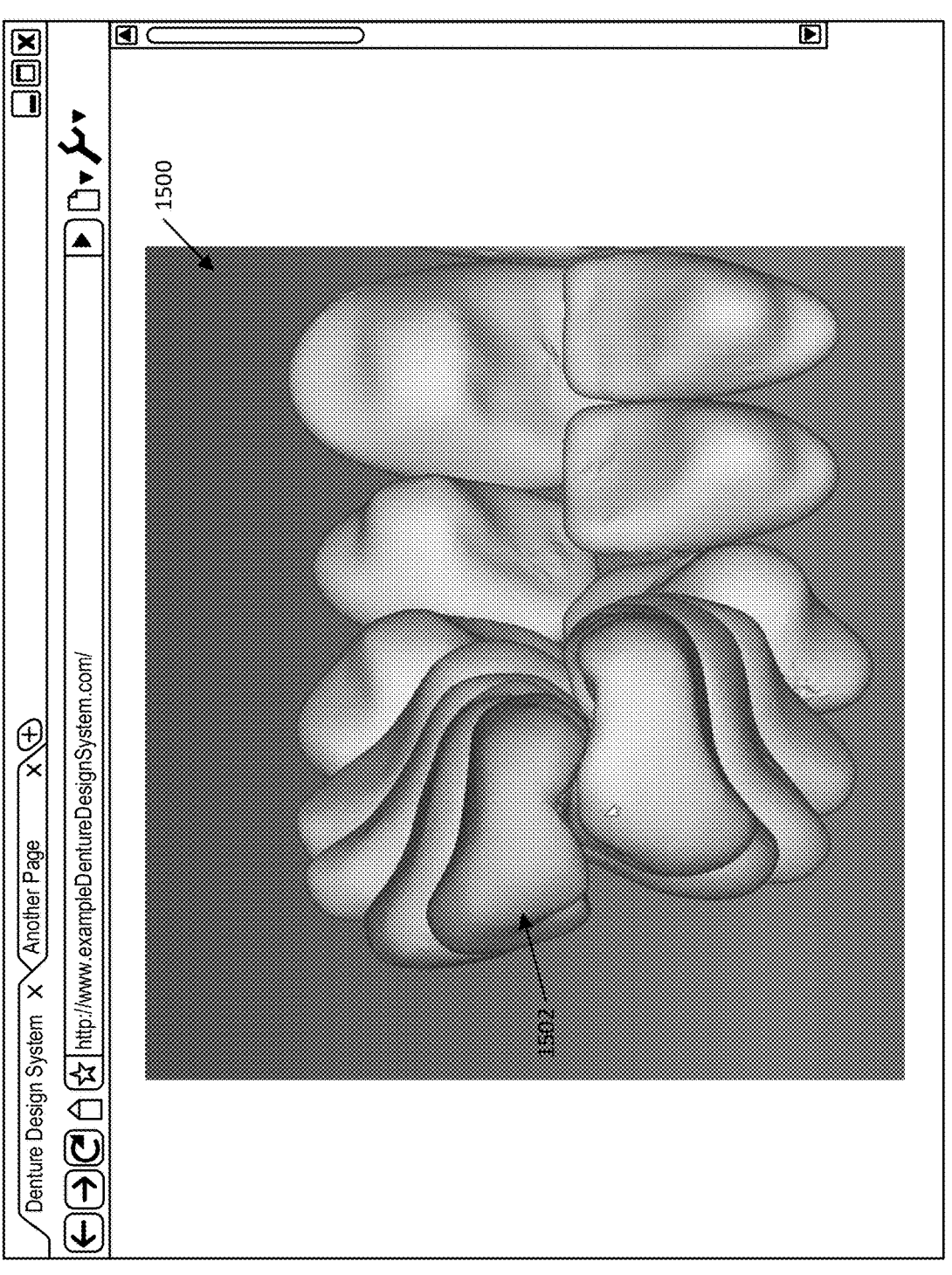
FIG. 15 is another example GUI screen generated by the denture design system with graphical elements to receive user input to reposition a digital denture tooth.

As another illustrative example of operation 912 in FIG. 9, FIG. 15 is an example graphical user interface (GUI) screen 1500 generated by the denture design system 116 with graphical elements to receive user input to reposition a digital denture tooth 1502. In this example, a user can select the digital denture tooth 1502 (an upper molar). The user may, for example, select the tooth 1502 by using a mouse to click on a visual/digital representation of the digital denture tooth 1502 shown in the user interface 1500. In some implementations, the user may select the digital denture tooth 1502 by touching a visual/digital representation of the tooth 1502 on a touchscreen. The selected digital denture tooth 1502 may then be displayed in a different indicia than the other, unselected teeth. For example, the selected tooth 1502 can be highlighted and/or displayed in a different color (e.g., turquoise) or shading than the other digital denture teeth. In some implementations, the user can select one or more teeth to be designated as moveable teeth (e.g., teeth that the user desires to move in one or more different directions, orientations, positions). In some implementations, the user can select one or more teeth to be designated as non-moveable teeth. As the moveable teeth are selected and moved according to the motion data (e.g., by going through the jaw movements of the patient as recorded in the motion data), the computer system can identify one or more other teeth that may be impacted or occluded based on certain movements. The user can view the impacted teeth in the user interface 1500 and make one or more adjustments to any of the teeth of the digital denture teeth to avoid the identified occlusion(s).

As an illustrative example, moving the patient's canines can cause other teeth to overlap/occlude. If the canines are kept fixed and one or more molars appear to be in the way when the motion data is applied to the digital denture teeth, the computer system can automatically push the molars away so that they do not cause the interference that was identified. The user can view this adjustment of the teeth and determine whether such an adjustment is preferred for the denture design for the particular patient.

The computer system may also receive user input to move the select digital denture tooth 1502. In some implementations, the user input can be a drag input such as a click-and-drag or touch-and-drag. Based on a direction of the drag and the motion data, the computer system can move the digital denture tooth 1502 in a corresponding direction. In some implementations, the movement may be in a direction that is parallel to an occlusal plane. For example, the computer system can apply the motion data to one or more of the teeth, including the selected/moved tooth 1502, to automatically displace the tooth 1502 such that it avoids interference with others of the digital denture teeth. The purpose of this movement can be to detect potential collisions (e.g., interference, overlap) of teeth as they would collide in real life based on moving the selected tooth 1502 as the user desires.

In some implementations, as the digital denture tooth 1502 is moved by the computer system and based on the drag input and the motion data, the digital denture tooth 1502 can also be moved in an occlusal-gingival direction to make contact with an opposing dentition. In some implementations, the digital denture tooth 1502 may be moved to contact with an occlusal guidance surface that can be generated, by the computer system, and based on opposing denture teeth and the motion data (e.g., by sweeping the opposing denture teeth through the motion of the motion data).

Beneficially, the digital denture teeth can remain in contact as they are positioned, potentially increasing efficiency for a user and/or computing device in positioning the digital denture teeth. For example, fewer processing cycles may be used to automatically move a tooth into contact with the motion data than would be used to generate a user interface and receive user inputs to manually position the digital denture tooth in contact. Another advantage of automatically moving the digital denture tooth 1502 into contact, by the computer system, is that a resulting arrangement of digital denture teeth may be more consistently high quality than an arrangement where each digital denture tooth can be moved manually into contact by a user. In some implementations, multiple digital denture teeth may be selected and moved together by the computer system.

Figure 16:
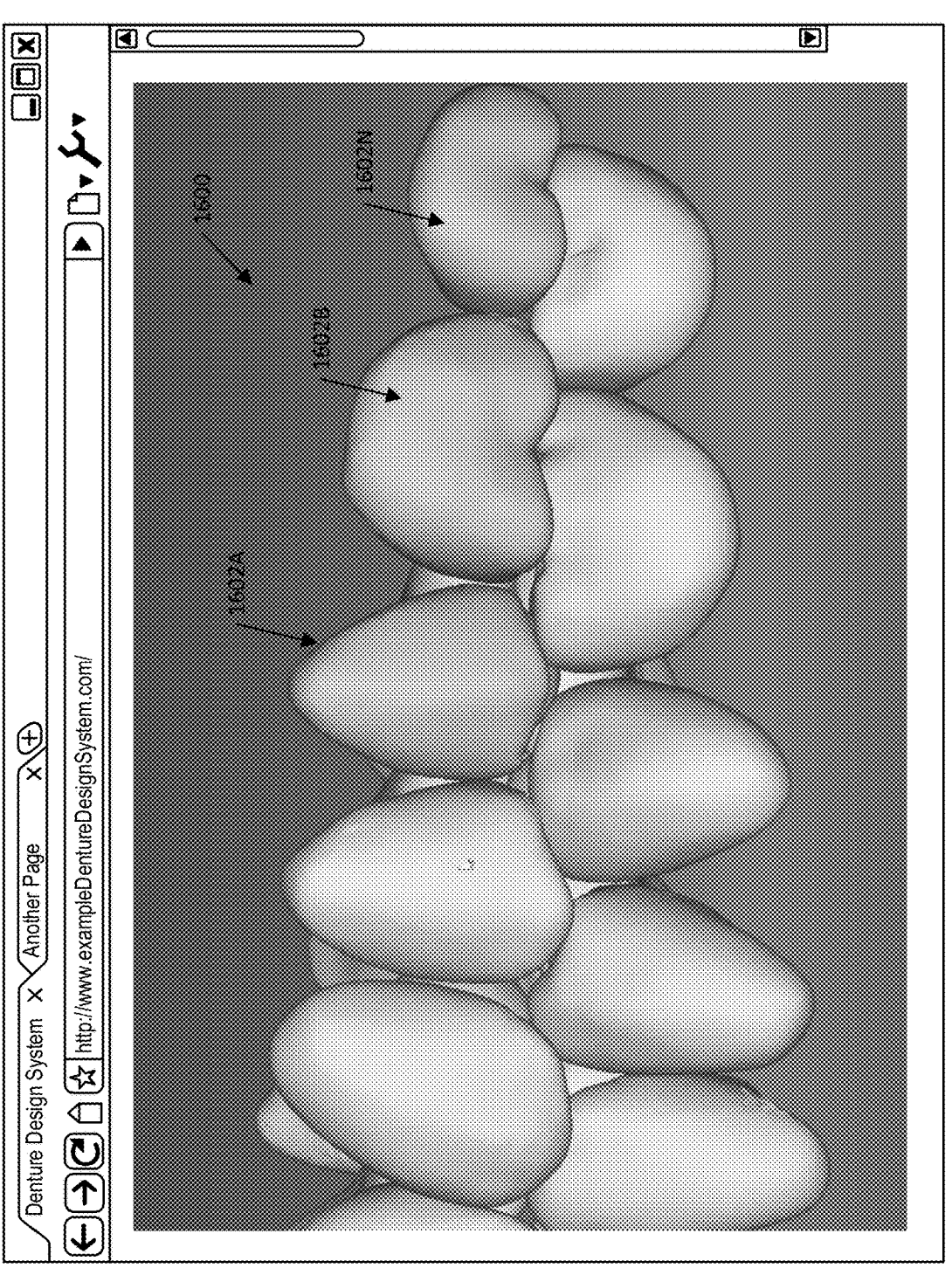
FIG. 16 is another example GUI screen generated by the denture design system with graphical elements to receive user input to reposition multiple digital denture teeth.

As another illustrative example of operation 912 in FIG. 9, FIG. 16 is an example graphical user interface (GUI) screen 1600 generated by the denture design system 116 with graphical elements to receive user input to reposition multiple digital denture teeth 1602A-N. In this example, three digital denture teeth 1602A-N are selected by the user and being repositioned by the computer system and based on user input. As the digital denture teeth 1602A-N are moved, by the computer system based on the motion data, in response to user input, each tooth 1602A-N can be individually moved into contact with opposing dentition. For example, the three selected digital denture teeth 1602A-N may be moved in a distal direction by the computer system. As they are moved, each tooth 1602A-N can be moved in a gingival or occlusal direction to maintain occlusal contact with opposing dentition while avoiding interference (e.g., overlap or collision of the digital denture teeth). Moving in these directions can be based on known, labeled, and/or annotated movements of the patient's jaw in the motion data. Moreover, the user interface 1600 can provide tools that can be used to rotate and reposition upper digital denture teeth into a bilaterally balanced, lingualized occlusion (e.g., by rotating the upper teeth so that the buccal cusps are oriented further in the buccal direction). Other tools can also be provided to the user to move various other digital denture teeth in various other orientations, positions, and/or directions. By moving the teeth in the various orientations, positions, and/or directions, the computer system can simulate the effects such movements would have on other teeth in the patient's mouth, thereby making it easier for the user to visualize and fabricate an appropriate denture design for the patient.

Figure 17:
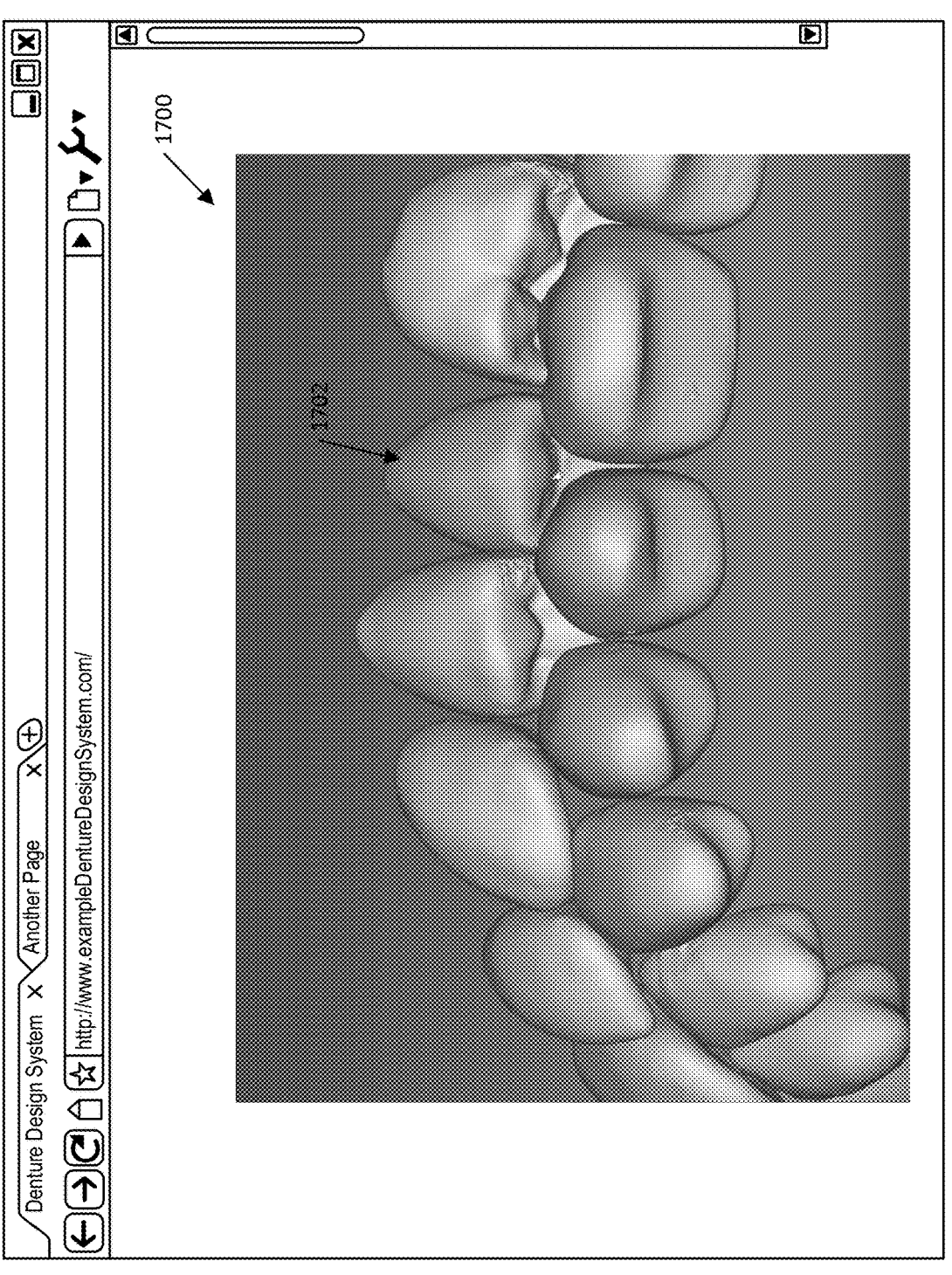
FIG. 17 is another example GUI screen generated by the denture design system with graphical elements to receive user input to reposition a digital denture tooth.

As another illustrative example of operation 912 in FIG. 9, FIG. 17 is an example graphical user interface (GUI) screen 1700 generated by the denture design system 116 with graphical elements to receive user input to reposition a digital denture tooth 1702. In this example, a user has selected one of the digital denture teeth 1702 (an upper bicuspid). The user may provide user input to cause the selected digital denture tooth 1702 to move in a mesial or distal direction. The computer system can detect, based on the motion data of the patient, contact of the selected tooth 1702 with adjacent digital denture teeth and therefore prevent further movement of the selected digital denture tooth 1702. The user can view the prevention of further movement in the user interface 1700. As a result, the user can determine an appropriate design of dentures for the patient that does not involve moving the selected tooth 1702 as the user initially tried with the user input.

Figure 18:
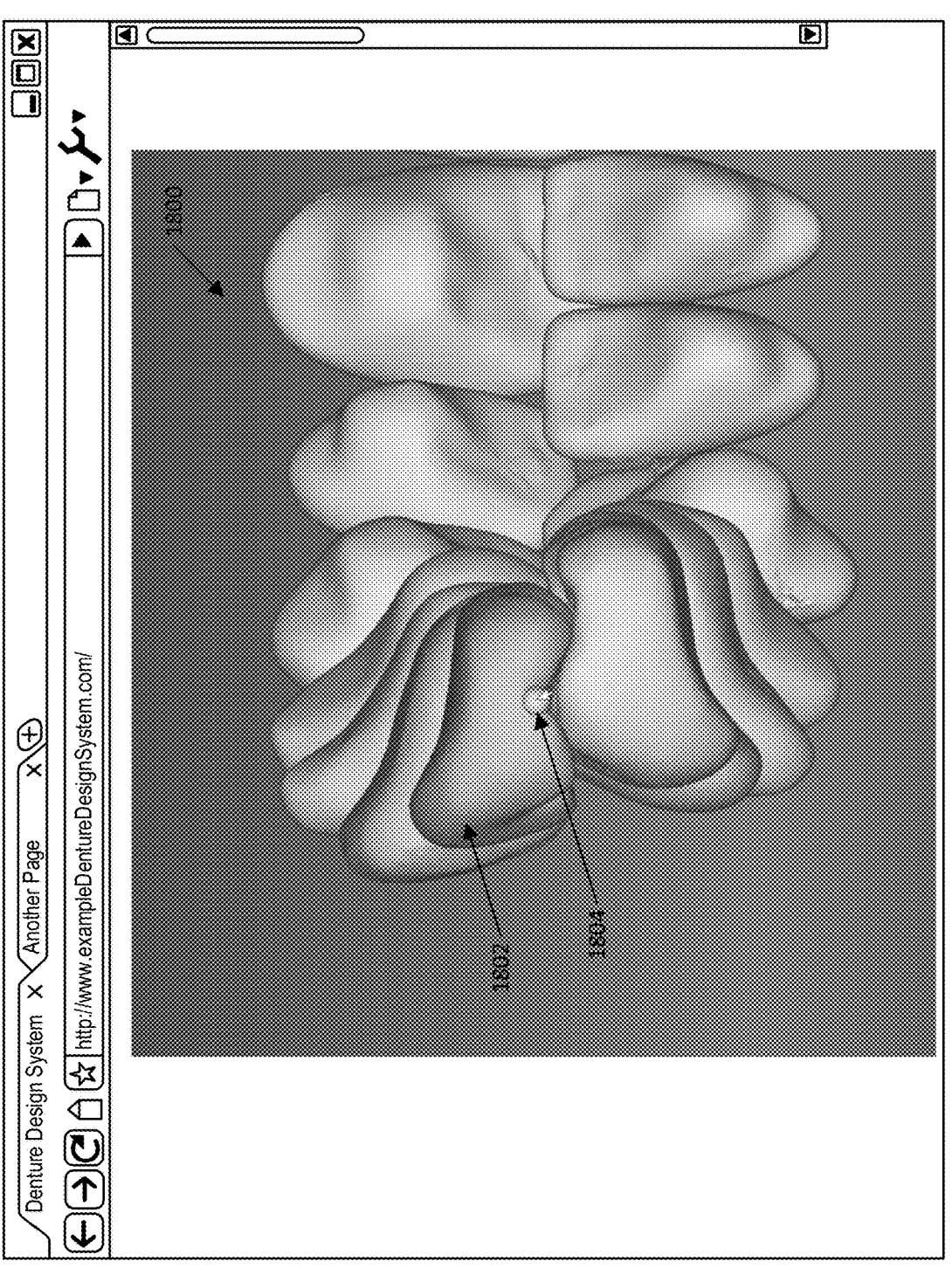
FIG. 18 is another example GUI screen generated by the denture design system with graphical elements to receive user input to reposition a digital denture tooth.

As another example of operation 912 in FIG. 9, FIG. 18 is an example graphical user interface (GUI) screen 1800 generated by the denture design system 116 with graphical elements to receive user input to reposition a digital denture tooth 1802. In this example, a user has selected one of the digital denture teeth 1802 (an upper molar). The user interface 1800 can be configured to allow the user to rotate the selected digital denture tooth 1802 by clicking and/or dragging on the tooth 1802 in a desired direction, position, and/or orientation. Based on the provided user input, the computer system can update the user interface 1800 in real-time to show the movement of the tooth 1802 and any impact that movement may have on other digital denture teeth. Here, the digital denture tooth 1802 is being rotated about an axis that is represented on the user interface 1800 by a sphere 1804. The sphere 1804 can represent a pivot point for the tooth 1802. In some implementations, this pivot point can be wherever a user's mouse, cursor, and/or pointer is. One or more other graphical elements and/or visual indicia can be used to represent the axis on which the tooth 1802 is being rotated. As the digital denture tooth 1802 rotates, by the computer system, it can be automatically moved in the occlusal or gingival direction to maintain contact and/or avoid overlap with opposing dentition.

In some implementations, any of the user interfaces described in reference to FIGS. 10-18 can allow the user to iterate through the techniques described herein for positioning digital denture teeth repeatedly and in any order/sequence. Therefore, the user can iterate through variations of digital denture teeth designs to efficiently determine a preferred design for the particular patient. Moreover, the digital denture teeth in the user interfaces of FIGS. 10-18 can behave as actual teeth would in the physical world, thereby enabling patient-specific standardization in denture design with time-saving functionality and improved efficiency and accuracy. Real-time collision detection techniques, as implemented by the computer system, can improve quality in denture design.

Mapping the motion data to the digital denture teeth in the user interfaces of FIGS. 10-18 can provide for accurate simulation of teeth movement to generate accurate denture teeth designs unique to the particular patient. After all, the motion data can include a series of transformations mapped to video frames and/or image data of the patient's jaw as it moves through various positions. Using the motion data, the computer system can accurately perform collision detection analysis of teeth each time that one or more teeth are set into motion (automatically by the computer system and/or manually by the user via user input). The user interfaces in FIGS. 10-18 can provide the relevant user with feedback about detected collections, which can then be used by the user to modify the digital denture teeth, then set the modified teeth into motion. The computer system can recursively go through various movements according to the motion data and/or user input until no more collisions are detected, an amount of collisions detected is less than some threshold collision level, and/or a design satisfies threshold quality features (e.g., a quality score satisfies a threshold quality level, a threshold quantity of teeth are impacted by the movement). Accordingly, the disclosed technology simplifies a process for the user to design dentures for a particular patient by selectively performing actions/movements on some teeth but not others. Results of such actions/movements on other teeth in the mouth can also be simulated/animated, by the computer system and based on the motion data, to provide a qualitative assessment of fit and/or configuration of the denture design. The user can then make adjustments to any of the digital denture teeth and run through the animation/movement processing as many times as the user desires to improve efficiency and accuracy in generating the denture design for the particular patient.

Referring back to FIG. 9, at operation 914, a digital representation of a denture base can be generated by the computer system. A soft-tissue boundary curve can be generated based on the digital dental model. The soft-tissue boundary curve can represent an edge of a denture base. The soft-tissue boundary curve may surround an edentulous ridge. The soft-tissue boundary curve may be represented by a spline curve. Sometimes, the user can adjust the spline curve using one or more selectable options and/or by providing user input in one or more user interfaces.

A soft-tissue interface surface may be generated based on the soft-tissue boundary curve and the digital dental model. For example, a portion of the digital dental model that is enclosed by the soft-tissue boundary curve may be offset (e.g., by 10 microns, 25 microns, 50 microns, 100 microns, or another amount) to form the soft-tissue interface surface. The soft-tissue interface surface may be an intaglio surface (i.e., the surface of the denture that touches the gum tissue). On upper dentures, the intaglio surface may be a posterior palatal seal. The offset may provide space for a dental adhesive that can secure the denture, when fabricated, to the patient's edentulous ridge. Some implementations may be configured to fit to the patient's edentulous ridge via suction or friction. In such scenarios, the soft tissue interface surface may not be offset from the digital dental model.

Tooth boundary curves may also be identified by the computer system for each of the positioned digital denture teeth. The tooth boundary curves may be identified based, for example, on labels stored (in a data store or other data repository) with each of the digital denture teeth that identify a portion of the tooth that should be embedded in the denture base. A surface may be formed to join outer edges of the tooth boundary curves to the soft-tissue interface surface. Sockets may be generated within the boundary curves, in some implementations. The sockets may be shaped to receive the denture teeth.

At operation 916, the denture can be fabricated by the computer system. For example, the denture base may be fabricated based on the digital representation. The denture base may be fabricated using a rapid fabrication technology, such as 3D printing or CNC milling. For example, the computer system can transmit instructions to a fabrication system to fabricate/generate/build the denture base from acrylic or another biocompatible material. The denture base may be made from a material that has aesthetic properties that substantially match gum tissue. In some implementations, pre-manufactured denture teeth that match the digital denture teeth library can be placed and bonded into the sockets of the denture base.

The denture teeth may also be manufactured using rapid fabrication technology. For example, the denture teeth may be fabricated using a 3D printer or a CNC mill. The denture teeth may be formed from a biocompatible material that has aesthetic properties that can be similar to the aesthetic properties of teeth. In some implementations, the digital denture teeth and the denture base can be printed as a single unit by a mixed material three-dimensional printer. In some implementations, one or both of the denture base and the denture teeth can be cast using a wax casting process using a pattern fabricated by a 3D printer of CNC mill.

As described throughout this disclosure, interferences between the digital denture teeth can be identified, by the computer system, by moving the dental arches according to the motion data. In implementations that use rapid fabrication technology to fabricate denture teeth, the digital models of the denture teeth may be adjusted to remove portions of the digital denture teeth models that may interfere before the denture teeth are fabricated. In implementations that place pre-manufactured denture teeth from a library into the denture base, a CNC mill may be used to remove interfering regions of the pre-manufactured denture teeth after they are placed in the denture base.

Figure 19:
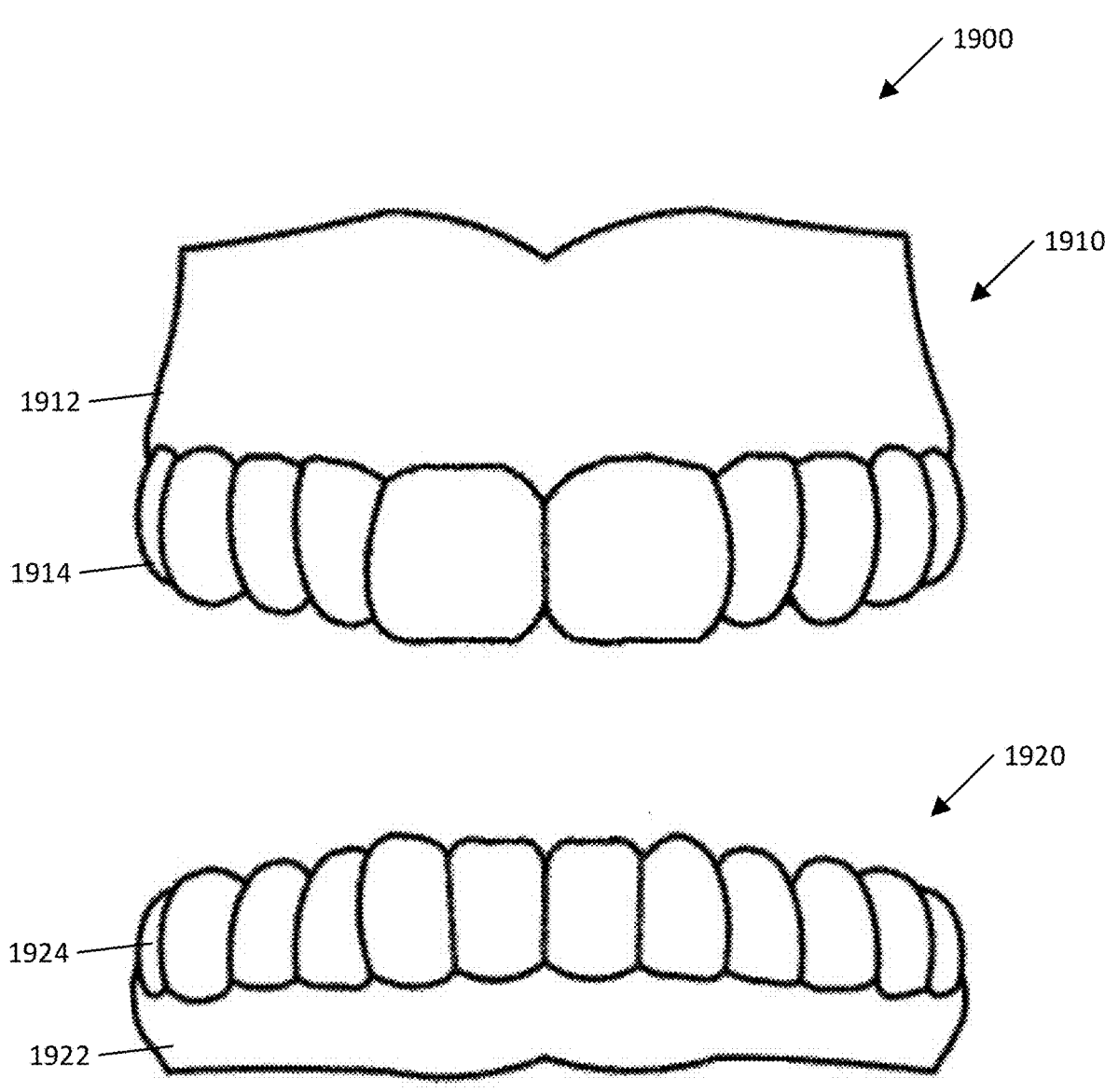
FIG. 19 is a schematic diagram of an example set of motion-based dentures.

FIG. 19 is a schematic diagram of an example set of motion-based dentures 1900. The motion-based dentures 1900 are an example of the dentures 124 described herein. The motion-based dentures 1900 can be generated, by any of the computing systems described herein, based on motion data captured for a patient using, for example, the motion capture system 200. The motion-based dentures 1900 may be fabricated using the process 900 described in FIG. 9.

Here, the motion-based dentures 1900 are complete dentures and include a maxillary denture 1910 and a mandibular denture 1920. The maxillary denture 1910 can be shaped to be worn on a maxillary dental arch of a patient. The mandibular denture 1920 can be shaped to be worn on a mandibular dental arch of the patient.

The maxillary denture 1910 can also include a maxillary denture base 1912 and maxillary denture teeth 1914. The mandibular denture 1920 can include a mandibular denture base 1922 and mandibular denture teeth 1924. As described above, the dentures 1900 can be designed using the process 900 of FIG. 9 and then fabricated/generated based on that design. The dentures 1900 can then be inserted into the particular patient's mouth.

Figure 20:
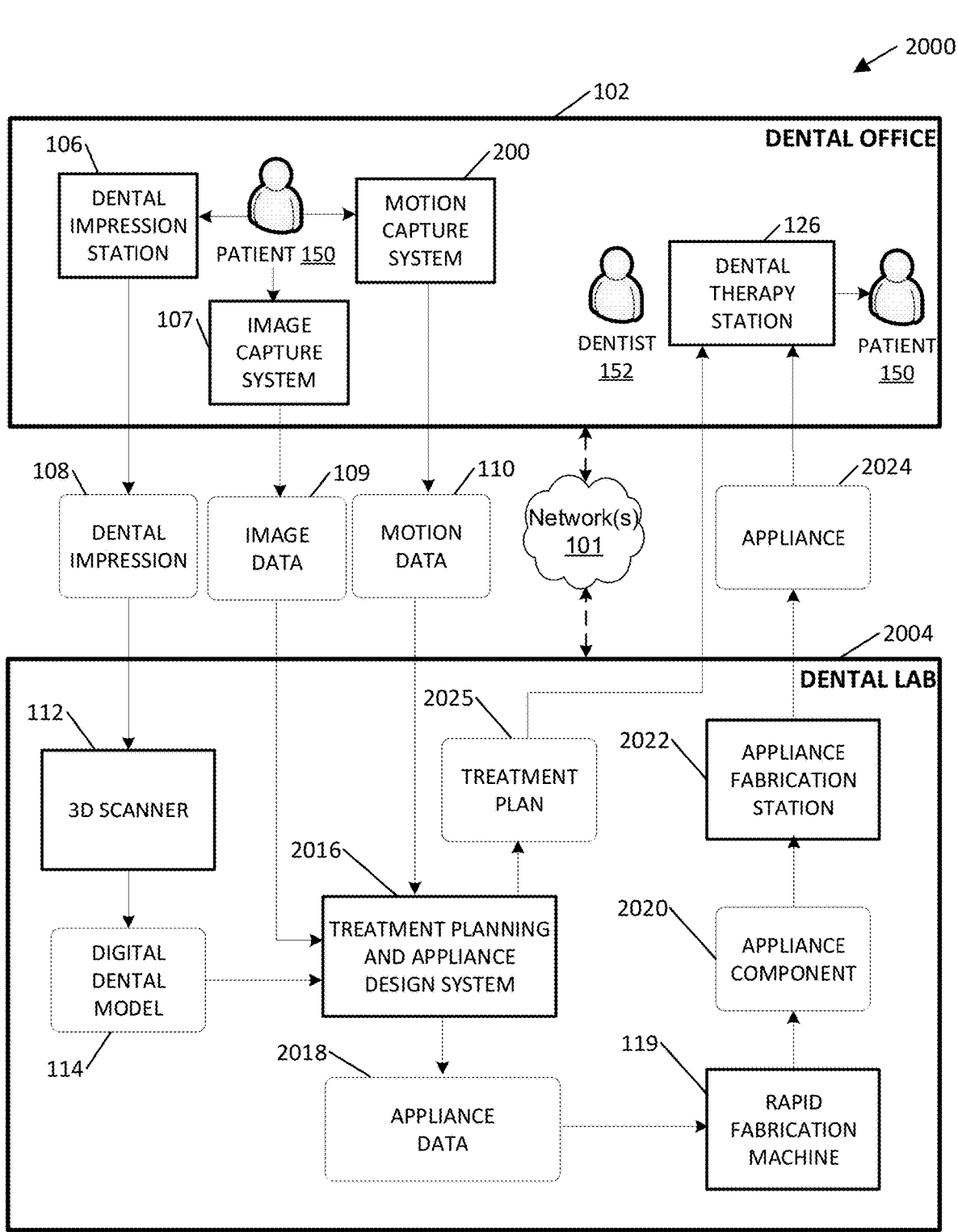
FIG. 20 is a schematic block diagram illustrating an example system for fabricating a motion-based denture.

FIG. 20 is a schematic block diagram illustrating an example system 2000 for setting up (arranging) teeth and fabricating dental appliances, such as appliance 2024. Components of the system 2000 can perform one or more operations in the process 900 described in FIG. 9. In some implementations, the tooth setup and dental appliance design can be performed using jaw motion data captured by the motion capture system 200. In this example, the system 2000 can include the dental office 102 (examples of which have been previously described with respect to at least FIG. 1) and a dental lab 2004.

The example dental lab 2004 can include the 3D scanner 112, a treatment planning and appliance design system 2016, the rapid fabrication machine 119, and an appliance fabrication station 2022. Although shown as a single dental lab, the dental lab 2004 can also include multiple dental labs. For example, the 3D scanner 112 can be in a different dental lab than one or more of the other components shown in the dental lab 2004. Further, one or more of the components shown in the dental lab 2004 may not be in a dental lab. For example, one or more of the 3D scanner 112, appliance design system 2016, rapid fabrication machine 119, and appliance fabrication station 2022 can be in the dental office 102. Sometimes, the system 2000 may not include all of the components shown in the dental lab 2004.

The treatment planning and appliance design system 2016 can be configured to generate one or both of appliance data 2018 and a treatment plan 2025. The appliance data 2018 can be 3D digital data that represents an appliance component 2020 and can be in a format suitable for fabrication using the rapid fabrication machine 119.

The treatment planning and appliance design system 2016 may use the digital dental model 114 and one or more of the image data 109 and the motion data 110 to generate the appliance data 2018 or the treatment plan 2025.

For example, the treatment planning and appliance design system 2016 may generate a treatment plan 2025 or an appliance component 2020 based on generating a tooth setup. The treatment plan 2025 may include but is not limited to an orthognathic surgery plan or an orthodontic treatment plan. The appliance component 2020 can include but is not limited to portions or all of any dental appliance, many of which have been previously described, including therapeutic appliances and restorative appliances.

The treatment planning and appliance design system 2016 can include the previously described denture design system 116 or some or all of the capabilities described with respect to the denture design system 116. For example, at least some implementations of the treatment planning and appliance design system 2016 may perform the process 900 in FIG. 9. In some implementations, the operations of the process 900 can be performed by the treatment planning and appliance design system 2016 for other appliances, as appropriate. Operations similar to operations 902, 904, 906, 908, 910, and 912 may be performed and applied to set up actual teeth (in addition to or instead of denture teeth) of a patient by the treatment planning and appliance design system 2016 based on a 3D scan of those teeth. For example, the operations may be performed on segmented tooth models extracted from the digital dental model 114 by any process for segmenting a digital dental model. The segmented tooth models may be individual models (of any type) that represent fewer than all teeth in a digital model. For example, the segmented tooth models may each represent a single tooth. The segmented tooth models may, for example, be generated by identifying portions of a full dental model that represent junctures between adjacent teeth and between teeth and gum tissue.

The treatment planning and appliance design system 2016 may also determine various parameters that can be used to generate the appliance data 2018 and/or the treatment plan 2025 based on the image data 109. For example, the treatment planning and appliance design system 2016 may use various image processing techniques to estimate a vertical dimension parameter from the image data 109. Additionally, the treatment planning and appliance design system 2016 may use the motion data 110 to design the appliance data 2018 and/or the treatment plan 2025. For example, the treatment planning and appliance design system 2016 may use the motion data to ensure that the patient 150's teeth are set up in an arrangement that avoids interferences with the opposing dentition during the bite motion as represented by the motion data 110.

The treatment planning and appliance design system 2016 can include a computing device that includes one or more user input devices. The treatment planning and appliance design system 2016 may include, but is not limited to, computer-aided-design (CAD) software that can generate a graphical display of the patient 150's teeth and/or of the appliance data 2018 and allows an operator to interact with and manipulate the patient 150's teeth or the appliance data 2018. In some implementations, the treatment planning and appliance design system 2016 may include a user interface that allows a user to specify or adjust parameters of the appliance design or the positions of the patient 150's teeth, such as vertical dimension, overbite, overjet, or tip, torque, and rotation parameters for one or more denture teeth. Refer to FIGS. 10-18 for example user interfaces.

For example, the treatment planning and appliance design system 116 may include virtual tools that mimic tools and techniques used by a laboratory technician to physically set up teeth or physical designs of an appliance. Additionally, the denture design system 116 can include a server that partially or fully automates the tooth setup, generation of a treatment plan 2025, and/or design of the appliance data 2018, which may use the dental impression 108, image data 109, and/or the motion data 110.

In some implementations, the treatment planning and appliance design system 2016 may automatically perform some or all of the following operations to set up a patient 150's teeth to generate a treatment plan or to design a dental appliance: detecting tooth landmarks (e.g., incisal edges, cusps, marginal ridges), leveling and aligning marginal ridges and incisal edges, leveling posterior buccal-lingual cusps, determining arch forms based on tooth landmarks, setting incisor torque and/or tip based on caregiver's prescription (e.g., Roth, MBT, Andrews, etc.), setting occlusal planes, aligning teeth to the arch form, moving teeth of at least one dental arch (e.g., the lower teeth) to the occlusal plane, moving teeth of at least one dental arch (e.g., the upper teeth) to contact the opposing arch, eliminating interproximal overlap (if any), adjusting tooth positions, if necessary, to ensure molar teeth have not been repositioned in the posterior direction, adjusting anterior in-out (or torque) to achieve a desired overbite, and intercuspating teeth (e.g., performing minor rotations and movements to increase tripodization/"sock in" of cusp-to-fossa relationship). In some implementations, the treatment planning and appliance design system 2016 can include interactive tools that allow a user to adjust the outcome of any of the above-mentioned steps.

In some implementations, detecting tooth landmarks can include segmenting the digital dental model 114 and/or receiving segmented tooth models based on the digital dental model 114. Detecting the tooth landmarks may also include labeling the tooth type (e.g., according to its type and location). This operation of labeling the tooth type may also be referred to as numbering the teeth as it is can be used as a numbering system to refer to specific teeth. The segmented teeth may be labeled based on adjacency and a total number of segmented teeth present (e.g., by making assumptions about which teeth are present such as if fourteen teeth are present, the patient 150 likely does not have third molars (wisdom teeth) present). Other techniques for labeling (numbering) teeth may be performed as well, including labeling the teeth based on determining a surface area of individual teeth and/or a surface area of individual teeth compared to a total surface area of all of the patient 150's teeth.

Some implementations of the disclosed technology can include labeling the teeth based on geometric or statistical classification. For example, the segmented teeth may be projected onto a plane and a shape of the projection may be classified (e.g., thinner rectangles may be classified as anterior teeth, rounder teeth may be classified as cuspids or bi-cuspids, and thicker rectangles may be classified as molars). The segmented teeth may be fit to a sphere, differences between a model of the segmented tooth and the sphere may be calculated, and based on a magnitude (or types) of differences between the model of the segmented tooth and the sphere, the segmented tooth may be labeled by the system. A position of the teeth along an arch may be used to determine or influence the classification as well. User input may also be used to determine and/or adjust the labeling.

Detect incisal edges by fitting a line to an occlusal portion of a segmented tooth that may be labeled as an incisor. For example, the occlusal-most 10% (or another fraction) of the segmented tooth may be identified. A line may then be fit to that identified portion of the model of the segmented tooth (e.g., by fitting a line to vertices or faces in the identified portion). The fit line may be a straight line that can be positioned to minimize a cumulative distance between identified vertices and/or faces and the line. The line may then be projected back onto the occlusal (top) surface of the mesh to identify the incisal edge of the tooth.

Some implementations can identify locations of cusps by dividing a segmented tooth into occlusal regions based on the label associated with the segmented tooth. For example, a tooth labeled as a first molar may be divided into four occlusal regions. The top point (e.g., the most occlusal point) may be identified as the cusp. In some implementations, the cusp can be identified by finding a most prominent point. The most prominent point may be found be determining an average surface normal for all of the faces of a region, projecting all of the points (vertices) of the region on to the average surface normal vector, and identifying the cusp as the point (vertex) having the largest magnitude when projected onto an average surface normal vector.

Some implementations of the disclosed technology can identify marginal ridges based on locations of identified cusps for a particular tooth. For example, a line may be generated between two cusps of a segmented tooth that has been labeled as a bicuspid. The marginal ridge may then be identified by offsetting a midpoint of the line between the cusps in a direction perpendicular to a line between the cusps and projecting down onto the occlusal surface of the segmented tooth. A saddle point near the projected point can be used as a margin ridge location. Similar techniques may be used for identifying marginal ridges in molars.

Leveling and aligning marginal ridges and incisal edges may include rotation of a segmented tooth about a marginal ridge point. A vector may be generated, using the disclosed technology, between two marginal ridges of a segmented tooth, the vector may be projected onto the occlusal plane, and the segmented tooth may be rotated about the marginal ridge point to make the vector between the marginal ridges parallel to the occlusal plane.

In some implementations, leveling posterior buccal-lingual cusps may include rotating a segmented tooth about an axis running in the posterior-anterior dimension. A vector may be generated between a buccal cusp of a segmented tooth and its corresponding lingual cusp. The vector may then be projected onto the occlusal plane and the segmented tooth may be rotated about one of the cusps to make the vector between the cusps marginal ridges parallel to the occlusal plane. After the cusp tips and marginal ridges have been leveled to the occlusal plane, the segmented tooth may then be translated, by the disclosed technology, in the occlusal dimension to align the cusp tips with the occlusal plane.

In some implementations, determining an arch form based on tooth landmarks may include fitting an arch to the buccal cusps of molars and bicuspids, cusps of canines, and incisal edges of incisors of the segmented teeth of the lower arch. The upper arch may use the same arch that is fit to the lower teeth. In some implementations, an arch may be fit to the buccal surfaces of the teeth of either arch.

In some implementations, setting an occlusal plane may include moving the occlusal plane to a highest point (most occlusal point) of the lower teeth. The occlusal plane may also be determined at least in part based on the motion data 110 or a desired vertical dimension. Although often referred to as an occlusal plane, some implementations may set an occlusal surface that can be curved rather than planar. The surface may be curved based on the curves of Spee and Wilson. These curves may be detected for a patient based on fitting curves to the projected locations of cusp tips (e.g., from a transverse position for the curve of Wilson, and from a lateral perspective for the curve of Spee).

In some implementations, aligning teeth to an arch form may include rotating each of the lower segmented teeth to align the anterior-posterior axis with the arch form. This rotation may require moving (translating) the segmented teeth to prevent overlap. This rotation process may start with the teeth adjacent to the midline (e.g., the central incisors) and work backwards by rotating and then repositioning teeth as needed to align cusp tips or the outer edges of the incisal edges with the arch form. After all teeth on the arch have been repositioned by the technology described herein, the teeth may be automatically moved forward (anteriorly) as a group by an amount necessary to ensure that the posterior molars may not be moved back (posteriorly) in the tooth setup. Upper teeth may be moved in a similar process but with the arch form being used to align different points on the tooth models, such as marginal ridges and the inner edge/side of the incisal edge.

In some implementations, intercuspating the teeth may include identifying landmarks from teeth on opposite dental arches that should fit together (e.g., lingual cusps on upper teeth and fossas on lower teeth) and making small (micro) adjustments to the upper teeth or lower teeth to increase contact between these features. The small (micro) adjustments may include translations and rotations.

In some implementations, tip values of segmented teeth can be adjusted, using the disclosed technology, and then fixed before torque values of the segmented teeth are set. To determine rotations necessary to adjust tip and torque, a coordinate system may be determined for a tooth, as described herein. A local coordinate system for a segmented tooth can determined by identifying a portion of buccal surface at a midpoint in a world occlusal-gingival dimension. The portion may, for example, be approximately a same size as an orthodontic bracket. An average surface normal of that portion of the buccal surface may then be determined. That average surface normal value may be used as the Y-axis (buccal-lingual) of the local coordinate system (which in this example corresponds to the buccal-lingual axis of the tooth). A cross-product of this Y-axis (buccal-lingual) and the world Z-axis may be calculated to determine an X-axis (mesial-distal) of the local coordinate system (which in this example corresponds to the mesial-distal axis of the tooth). A cross-product of the X-axis and the Y-axis may be calculated and used as the Z-axis (vertical) for the local coordinate system of the tooth (which in this example corresponds to the vertical axis of the tooth). In some implementations, the Z-axis of the coordinate system can be found based on vertical cross sections of the segmented tooth. For example, the Z-axis may be found by fitting a line to centroids of multiple horizontal cross-sections. In some implementations, tooth roots may also be used to determine a coordinate system for a tooth. The positions and shapes of the tooth roots may be determined from CT scan data and/or other imaging data of the particular tooth.

Once these coordinate systems (or local coordinate systems) are determined for the segmented teeth, the teeth may be automatically torqued or tipped by any of the computing systems described herein. Here, torque refers to rotation about the tooth's X-axis, and tip refers to rotation about the tooth's Y-axis. In some implementations, the torque values may be set according to specific preferences from a caregiver or industry standards (e.g., MBT, Andrews, or Roth values).

Torque may be set for some or all anterior teeth. In some implementations, torque values can be set for at least the canine teeth. In some implementations, the upper anterior teeth can be torqued (flared) to achieve a desired amount of overlap (overbite and/or overjet) with lower teeth. The desired overlap may be specified by a user or caregiver. Default values may also be used and automatically implemented by any of the computing systems described herein. In some examples, a desired overlap (overbite) can be approximately 2 millimeters for a central incisor and approximately 1.5 millimeters for lateral incisors. As the torque is automatically adjusted, by one or more computing systems described herein, for one or more upper teeth, the adjusted teeth may be close to contact with the lower teeth, and the amount of overlap may be calculated by the computing system(s). This process may iterate until a desired amount (e.g., threshold level of overlap) of overlap is achieved. In addition to determining a desired overlap value, the torque values may be iterated to determine a desired overbite, overjet, and lip protrusion specified by a caregiver, a user, or industry standards.

As described above, the user interfaces described in FIGS. 10-18 may include tools to allow the user to adjust desired torque values of one or more teeth and then cause the system to re-perform an auto-setup of the teeth and/or animation of the teeth through various movements. Some implementations may include limits on an amount of torque that is automatically applied. Some implementations may present graphical features, alerts, or notifications that advise the user if the torque value exceeds certain values, such as threshold industry-standard values (e.g., via a user interface element or a report). These torque values may require review by a caregiver to ensure that the torque value is safe from a physiological perspective. In some implementations, the torque values applied to a patient's teeth may be represented using colors to indicate an estimated safety or feasibility level (e.g., green—within industry norms; orange—border-line; red—recommend alternative such as extracting teeth, performing interproximal reduction, etc.). Other indicia described herein may also be used to indicate estimated safety and/or feasibility levels of torque values applied to the patient's teeth.

In some implementations, the computing system(s) described herein may generate a report that specifies whether one or more tooth movements are within or beyond ranges of movement that are likely to be achievable using a specific type of appliance, such as an aligner. Movements or tooth setups that go beyond the appliances expected movement capabilities may be flagged (e.g., a tooth angulation relative to occlusal plane (or other changes) that go beyond recommendations (e.g., more than 1 standard deviation from a normal range of angulation) may be flagged). The computing system(s) may also generate one or more qualitative values, such as scores, indicating feasibility of various designs and teeth movements.

In some implementations, tooth setups that are generated automatically may be limited by industry normative values or standards. In at least some implementations, users may disable these limitations. Any of these standards can be applied and used by the computing system(s) to assess movement of various teeth in the patient's mouth.

Reports and/or images generated by the disclosed technology may be useful for patient presentations to explain limits of certain treatments and/or to explain why certain procedures are being recommend. For example, a tooth setup may be generated without performing interproximal reduction (e.g., narrowing of teeth by grinding between teeth to create space) to show an outcome of an orthodontic treatment without modification to a shape/size of a patient's teeth. Similarly, a tooth setup can be generated after digitally performing interproximal reduction to demonstrate a difference in outcome. In a similar vein, tooth setups may be performed with and without extractions to educate patient's on why a caregiver is or is not recommending an extraction.

Some implementations may incorporate facially generated treatment plans. In this case, the desired positions of upper canines may be determined based on the patient's upper lip position at rest and when smiling (which may be determined based on the image data 109, as described herein). A position of the canine relative to the lip may be altered by changing the torque value of the canine. Some systems determine a torque value for the upper canines to achieve a desired relationship between the canine and the upper lip. The other upper teeth may then be repositioned to fit harmoniously with the upper canines. The lower teeth can then be repositioned to fit with the uppers. In some implementations, an image of the patient's lips, which may be extracted from the image data 109, may be overlaid on the tooth setup. In some implementations, a generated image of lips may be overlaid on the tooth setup. Such overlays can provide for user-friendly visuals of an impact that various tooth setups may have on the patient's smile and mouth. Moreover, some implementations may incorporate one or more of the following records for treatment planning: photos, cone beam, motion data, etc.

In some implementations, the treatment planning and appliance design system 2016 can include tools to interactively allow a user to adjust the torque of anterior teeth using user-actuatable controls on a user interface. For example, the user-actuatable controls may include a slider or buttons (e.g., "+" and "−" buttons) to increase or decrease the torque value(s). As the torque of the anterior teeth changes, an alignment of all of the teeth may be adjusted, by the computing system(s), to maintain interproximal and occlusal contact. Some implementations of the system 2016 can also include tools that allow a user to transform (e.g., translate or rotate) teeth while maintaining occlusal contact or proximal contact with neighboring teeth.

In some implementations, the treatment planning and appliance design system 2016 can store (in a data store or other data repository) setting values that a user may modify to determine an allowable amount of interproximal overlap in a tooth setup and whether any interproximal overlap should be distributed evenly among all of the teeth. These settings values may then be used by the treatment planning and appliance design system 2016 to perform automatic tooth setup.

Still referring to FIG. 20, the appliance fabrication station 2022 can operate to fabricate an appliance 2024 for the patient 150. In some implementations, the appliance fabrication station 2022 can use the appliance component 2020 produced by the rapid fabrication machine 119. The dental impression 108 can also be used in the fabrication of the appliance 2024. The dental impression 108 can be used to form a plaster model of the dentition of the patient 150. Additionally, a model of the dentition of the patient 150 can be generated by the rapid fabrication machine 119. In some implementations, the appliance fabrication station 2022 can include equipment and processes to perform some or all of the techniques used in traditional dental laboratories to generate dental appliances. Other implementations of the appliance fabrication station 2022 may also be possible.

The appliance 2024 can be seated in the mouth of the patient 150 in the dental therapy station 126 by the dentist 152. The treatment plan 2025 may then be applied to the patient 150 in the dental therapy station 126 by the dentist 152 or other relevant caregiver.

Figure 21:
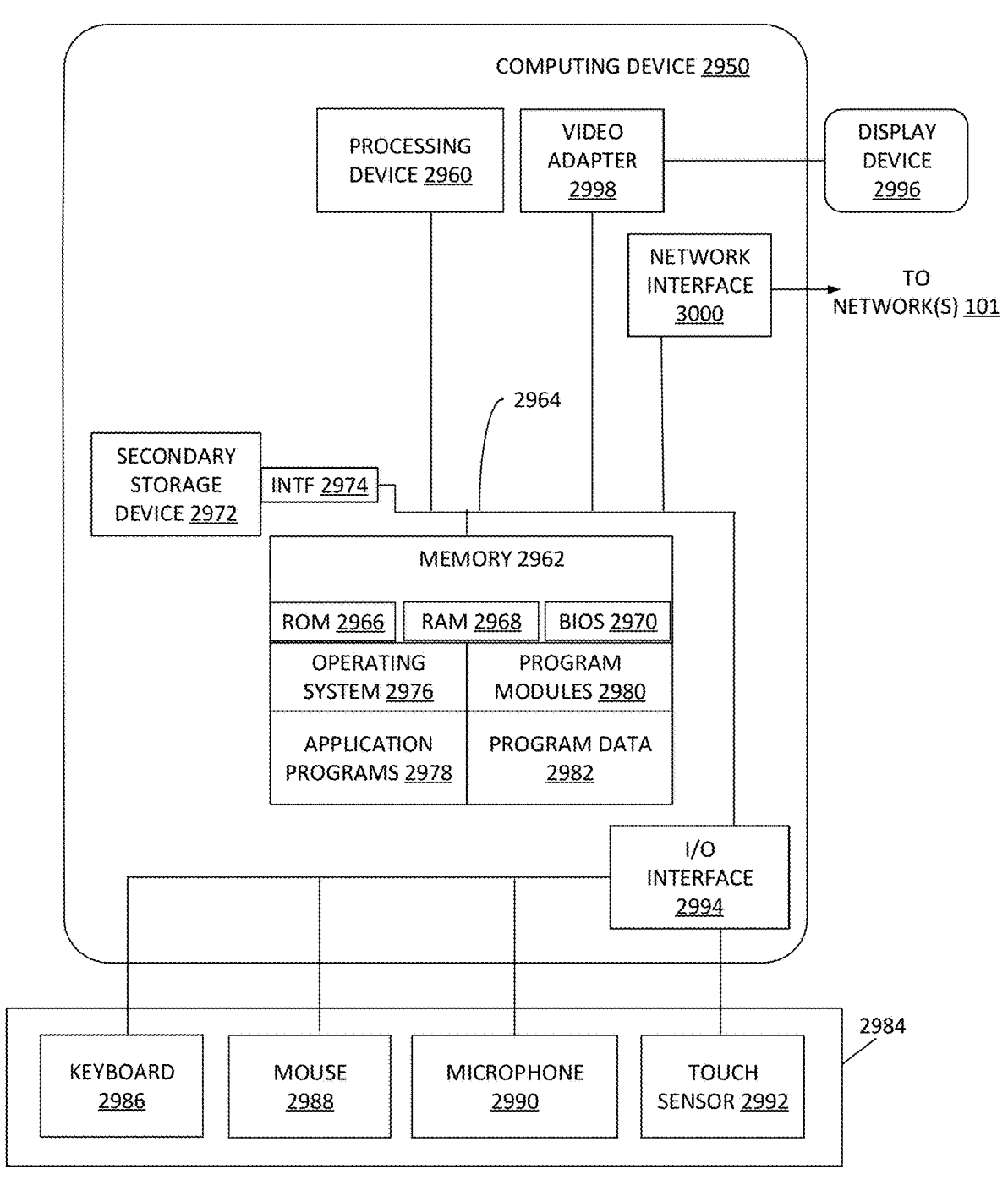
FIG. 21 illustrates an example architecture of a computing device, which can be used to implement aspects according to the present disclosure.

FIG. 21 illustrates an example architecture of a computing device 2950 that can be used to implement aspects of the present disclosure, including any of the plurality of computing devices described herein, such as a computing device of the denture design system 116, the motion determining device 206, or any other computing devices that may be utilized in the various possible embodiments.

The computing device illustrated in FIG. 21 can be used to execute the operating system, application programs, and software modules described herein.

The computing device 2950 includes, in some embodiments, at least one processing device 2960, such as a central processing unit (CPU). A variety of processing devices are available from a variety of manufacturers, for example, Intel or Advanced Micro Devices. In this example, the computing device 2950 also includes a system memory 2962, and a system bus 2964 that couples various system components including the system memory 2962 to the processing device 2960. The system bus 2964 is one of any number of types of bus structures including a memory bus, or memory controller; a peripheral bus; and a local bus using any of a variety of bus architectures.

Examples of computing devices suitable for the computing device 2950 include a desktop computer, a laptop computer, a tablet computer, a mobile computing device (such as a smartphone, an iPod® or iPad® mobile digital device, or other mobile devices), or other devices configured to process digital instructions.

The system memory 2962 includes read only memory 2966 and random-access memory 2968. A basic input/output system 2970 containing the basic routines that act to transfer information within computing device 2950, such as during start up, is typically stored in the read only memory 2966.

The computing device 2950 also includes a secondary storage device 2972 in some embodiments, such as a hard disk drive, for storing digital data. The secondary storage device 2972 is connected to the system bus 2964 by a secondary storage interface 2974. The secondary storage devices 2972 and their associated computer readable media provide nonvolatile storage of computer readable instructions (including application programs and program modules), data structures, and other data for the computing device 2950.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory computer-readable media. Additionally, such computer readable storage media can include local storage or cloud-based storage.

A number of program modules can be stored in secondary storage device 2972 or system memory 2962, including an operating system 2976, one or more application programs 2978, other program modules 2980 (such as the software engines described herein), and program data 2982. The computing device 2950 can utilize any suitable operating system, such as Microsoft Windows™, Google Chrome™ OS or Android, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 2950 through one or more input devices 2984. Examples of input devices 2984 include a keyboard 2986, mouse 2988, microphone 2990, and touch sensor 2992 (such as a touchpad or touch sensitive display). Other embodiments include other input devices 2984. The input devices are often connected to the processing device 2960 through an input/output interface 2994 that is coupled to the system bus 2964. These input devices 2984 can be connected by any number of input/output interfaces, such as a parallel port, serial port, game port, or a universal serial bus. Wireless communication between input devices and the interface 2994 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 2996, such as a monitor, liquid crystal display device, projector, or touch sensitive display device, is also connected to the system bus 2964 via an interface, such as a video adapter 2998. In addition to the display device 2996, the computing device 2950 can include various other peripheral devices (not shown), such as speakers or a printer.

When used in a local area networking environment or a wide area networking environment (such as the Internet), the computing device 2950 is typically connected to the network through a network interface 3000, such as an Ethernet interface or WiFi interface. Other possible embodiments use other communication devices. For example, some embodiments of the computing device 2950 include a modem for communicating across the network.

The computing device 2950 typically includes at least some form of computer readable media. Computer readable media includes any available media that can be accessed by the computing device 2950. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 2950.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 21 is also an example of programmable electronics, which may include one or more such computing devices, and when multiple computing devices are included, such computing devices can be coupled together with a suitable data communication network so as to collectively perform the various functions, methods, or operations disclosed herein.

FIGS. 22A-C is a flowchart of a process 2200 for applying motion data to a digital representation of teeth to determine a teeth setup. The process 2200 can be performed by any of the systems and/or computing systems described herein. For illustrative purposes, the process 2200 is described from the perspective of a computer system.

Referring to the process 2200 in FIGS. 22A-C, the computer system can receive a digital representation of a patient's jaw movement as motion data in operation 2202. As described herein, the patient can be instructed to move through a series of predetermined movements. While the patient moves through those movements, the movements can be recorded with any of the devices and/or systems described herein. For example, various motion frames can be captured and each frame can include a variety of predetermined motions. The motion frames (e.g., static snapshots) can include, but are not limited to, IOS registration, centric relation (CR, when teeth are coming into first contact before they slide against each other into centric occlusion), centric occlusion (CO, when the patient is biting), open, incisors end on, protrusive, left, right, head orientation, and other. The motions that can be recorded for each of the frames may include, but are not limited to CR, open-close, protrusive, left, right, occlusal slide, and other. Refer to FIGS. 1, 2, and 9 for further discussion.

In operation 2204, the computer system can receive a model of at least a portion of upper and/or lower teeth of the patient. The model can be digital dental model that can be generated using imaging data and/or motion data of the patient's teeth. Sometimes, the model may include all of the patient's teeth. The model may sometimes include only an upper arch of the patient's teeth. The model may sometimes include only a lower arch of the patient's teeth. In some implementations, the model may include a subset of all the patient's teeth (e.g., some teeth in the upper arch, some teeth in the lower arch, or any combination thereof). Refer to FIGS. 1 and 9 for further discussion.

The computer system may also receive user input indicating selection of at least a first tooth as moveable, a second tooth as fixed, and/or a third tooth as invisible (operation 2206). If a tooth is identified as moveable, then the tooth can be automatically repositioned by the computer system when the motion data is applied to the model. If a tooth is identified as fixed, then the tooth may be non-moveable and therefore the tooth's fixed position can include the repositioning of moveable teeth when the motion data is applied to the model. If a tooth is identified as invisible, then the tooth may be non-moveable but can be ignored so that other teeth can pass through the tooth or otherwise interfere with the tooth.

Using a GUI as described herein, the user can select one or more teeth that may be moveable, fixed, and/or invisible/ignored. While animating a denture or natural tooth setup using motion data as described herein, the setup can be improved by selecting teeth to be moveable, fixed, and/or invisible/ignored. The use can select teeth that they wish to move. In some implementations, the user can select one or more teeth that they desire to remain fixed in position (non-moveable). Therefore, when the motion data is applied to the model, any of the teeth that were not selected (therefore moveable teeth) can be automatically moved out of the way by the computer system to avoid interferences with the fixed teeth and other teeth. The non-selected teeth can be moved along vertical axes (up and down) of the teeth and/or torqued to avoid interference with one or more other teeth. The non-selected teeth can be moved according to any other type of motion that may be defined by the user. The non-selected teeth can also be automatically moved based on a specified amount of movement permitted (e.g., a maximum vertical movement of teeth in the upper arch relative teeth in the lower arch). In some implementations, the user can simply select teeth to be identified as moveable. Then, when the motion data is applied to the model, the non-selected teeth may remain fixed and the computer system can automatically reposition the selected moveable teeth to avoid interference with the non-selected, fixed teeth. Refer to FIGS. 9, 15-18, and 26A-B for further discussion.

The computer system can apply the motion data to the model to move at least the first tooth along pathways that correspond to the motion data in operation 2208. In other words, as described herein, the computer system can move the tooth or teeth that have been identified as moveable according to the motion data. For each motion frame, the selected moveable teeth can be automatically repositioned to avoid interferences with fixed teeth. For example, the at least first tooth can be moved in such a way that avoids interference(s) with other teeth, such as the fixed, non-movable teeth in the model. Refer to FIGS. 1, 9, and 24-25 for further discussion.

For example, the computer system can move at least one of the selected teeth (e.g., the at least first tooth that has been identified as moveable) that prevents a first contact of the teeth according to the patient's jaw movement (operation 2210). In other words, the computer system can move one or more teeth that may prevent that first contact that is desired based on the natural jaw motion of the patient. As an illustrative example, an upper tooth can be automatically raised by a threshold amount so that it does not prevent the first contact between the upper tooth and a lower tooth. This automatic adjustment advantageously eliminates a need of a human user to manually determine whether a particular tooth comes into contact with another tooth and if so, how to adjust the particular tooth so that an appropriate first contact can be achieved for the patient. As a result, human error in manually determining and/or adjusting contact between teeth can be eliminated.

As another example, the computer system can move at least one of the selected teeth to achieve a desired type of contact for the patient (operation 2212). The computer system can adjust teeth to achieve predetermined desired horizontal and/or vertical contact. For example, the computer system can automatically lower an upper tooth until the upper tooth makes a predetermined amount of contact with a cusp of a lower tooth. As another example, the computer system can automatically lower the upper tooth until the upper tooth drops a predetermined distance into a valley defined by two adjacent lower teeth. For example, the computer system can automatically adjust an upper tooth until it is socked into a cusp or valley of a lower tooth along any predetermined degrees of rotation and/or movement.

In some implementations, the desired type of contact can be where an upper tooth is at its lowest point to contact a lower tooth. Having a smallest distance between the upper tooth and the lower tooth can be preferred, so the computer system can identify a lowest point of contact between 2 teeth and/or lowest point of contacts between multiple teeth to determine the desired type of contact and appropriate repositioning of the teeth. The computer system can then automatically adjust positioning (angle, torque, movement, height) of the teeth to achieve this desired type of contact.

The computer system can also automatically adjust positioning of one or more of the selected teeth based on detecting collision(s) when the motion data is applied to the model (operation 2214). As an illustrative example, the computer system can automatically apply movements to the teeth until upper and lower canines collide. Once the canines collide, the computer system can push out other teeth in the patient's mouth so that the canines remain fixed. Once the other teeth are moved, the computer system can iterate back through the same movement(s) to determine whether the upper and lower canines collide. The computer system can recursively adjust the other teeth until the upper and lower canines no longer collide and/or until the upper and lower canines collide by a threshold amount.

For example, as part of the operation 2214, the computer system can detect when at least one of the selected teeth intersect with another tooth (operation 2216). The computer system can show, in an example GUI, when a moveable tooth passes through at least a portion of another tooth, thereby indicating that the teeth would intersect.

As another example, the computer system can adjust a position of a tooth until an upper position limit (e.g., vertical movement up and down) is met (operation 2218). A lower arch tooth, for example, may be raised a maximum distance before a root of the tooth may be dislodged from a lower gum tissue. Similarly, an upper arch tooth may be lowered a maximum distance before a roof of that tooth may be dislodged from an upper gum tissue. The computer system can determine the maximum distance one or more of the teeth can be moved and apply movements corresponding to the maximum distance. The computer system can then assess whether such movements cause interference and/or desirable contact with other teeth.

Additionally or alternatively, the computer system can adjust an angle of a tooth until a threshold angle of movement is met (operation 2220). As described in reference to operation 2218, a tooth may be angled up to a threshold angle of movement before causing harm to the patient and/or interference/contact with other teeth. As an illustrative example, it can be desired for all teeth roots to be parallel to each other. Angling a tooth beyond the threshold angle of movement can cause roots of the tooth to change and interfere with other roots, thereby causing harm to the patient. Thus, the computer system can automatically adjust angles of teeth in such a way that maintains or corrects root placement/location and protects the patient from potential harm of interfering/colliding roots.

Additionally or alternatively, the computer system can adjust at least one tooth until a threshold amount of contact between the tooth and one or more other teeth is met (operation 2222). The threshold amount can be determined by the computer system. The threshold amount can be different based on a type of teeth that are being moved relative each other. For example, the threshold distance between two molars can be larger than a threshold distance between two incisors. Moreover, the threshold distance can vary depending on whether vertical or lateral contact is being established. For example, the threshold distance can be larger for contact between two teeth in the upper arch or the lower arch versus contact between a tooth in the upper arch and a tooth in the lower arch. One or more other variations in threshold amounts of contact can be determined by the computer system and/or retrieved, by the computer system, from a library of predetermined distances stored in a data store or other type of data repository.

In some implementations, before applying the motion data to the model and/or repositioning any of the teeth represented by the model, the computer system can apply one or more rules and/or industry-wide standards, as described above in reference to FIGS. 1-20, to level the teeth represented by the model. Then, the computer system can reposition one or more of the teeth in such a way that does not cause the repositioned teeth to appear at unusual angles and/or positions in the patient's mouth.

The computer system can then return information about any detected collisions and/or a teeth setup (operation 2240). The computer system can identify motions and/or movements of teeth that satisfy contact and/or interference criteria. For example, the computer system can select movements of teeth that cause the patient to achieve a desired first contact. As another example, the computer system can select movements of teeth that cause the patient to maintain first contact(s) during the patient's normal jaw motions/movements. The computer system can output any of the detected collisions and/or selected teeth movements in GUIs displayed at a computing device. As depicted and described throughout this disclosure, the computer system can output the information about the detected collisions and/or teeth setup in real-time, as the motion data is applied to the model and/or as the computer system automatically repositions one or more of the teeth represented by the model. As a result, the relevant user can view how movement of the teeth may cause interference and/or collisions. The operation 2240 advantageously automates a process for setting up teeth, as described herein, thereby saving both time and costs for designing accurate teeth setups unique to particular patients. Refer to FIGS. 10-18 and 24-26 for further discussion about returning the information in operation 2240.

In some implementations, before performing, during, or after operation 2240, the computer system can optionally receive user input indicating selection of one or more manual tools to adjust the teeth represented by the model (operation 2224). The computer system can then implement any of the selected manual tools to detect collision(s) and/or determine/generate the teeth setup. The manual tools can be presented in a dialog box or other pop-out window in a GUI presented at the user's computing device. Refer to FIG. 13 for an example of the GUI with the dialog box.

For example, the computer system can receive user input to display and/or adjust one or more tooth datums (operation 2226). The tooth datums can indicate points according to standards in the industry that are used to properly align teeth. The user can provide input (e.g., selecting a selectable option such as a button or checkbox) indicating a desire to view the datums overlaying the teeth in the model. Refer to FIG. 11 for further discussion about displaying the datums. The user can also provide input at their computing device to move locations of one or more of the tooth datums as they are depicted overlaying the teeth in the model. For example, the user can click and drag on a datum that the user desires to move. The user can move the datum to another desired location over one or more of the teeth.

The computer system can optionally receive user input to display and/or adjust an arch form curve (operation 2228). The arch form curve can be presented as a visual overlay overlaying the teeth in the model, as depicted and described in reference to FIG. 12. The arch form curve can be presented with one or more points. Any of those points can be selected by the user and moved around to adjust a shape of the arch form curve. For example, the user can desire to move one or more of the points to fit the arch form curve to an actual curve of the patient's teeth. Sometimes, the user can desire to adjust sides of the curve to be asymmetrical. Other times, the user can adjust sides of the curves to be symmetrical. The arch form curve can be used to relate the upper arch teeth to the lower arch teeth (e.g., the lower arch teeth should fit into cusps of the upper arch teeth).

The computer system can optionally receive user input to set an occlusal plane (operation 2230). The occlusal plane can be automatically set to a highest point of the lower arch teeth and/or a lowest point of the upper arch teeth. Refer to FIG. 10 for further discussion about an example of the occlusal plane being set to the highest point of the lower arch teeth of the patient. Once the occlusal plane is established for one set of teeth, the same occlusal plane can be used for the other teeth. For example, the user can select an option to set the occlusal plane for the lower arch teeth. The same occlusal plane will automatically be applied/used for the upper arch teeth.

The computer system can optionally snap teeth to the occlusal plane (operation 2232). For example, if the occlusal plane is set for the lower arch teeth, the user can select an option that causes the upper arch teeth to automatically snap down to the occlusal plane. In other words, the computer system can automatically move the upper arch teeth such that a lowest point of the upper arch teeth comes in contact with the occlusal plan. The same can be done if the occlusal plane is set for the upper arch teeth instead of the lower arch teeth.

The computer system can optionally snap, anchor, and/or adjust a position of one or more user-selected teeth in any particular direction relative the occlusal plane, for example (operation 2234). The operation 2234 can be part of an auto setup feature of the disclosed technology. The user can select whether they would like any one or more of the teeth in the model to be leveled (e.g., relative to a plane of other teeth, such as leveling the upper arch teeth relative a horizontal plane of the lower arch teeth and/or leveling teeth in the upper arch relative each other). The user can also select whether they would like any one or more of the teeth to be snapped to the arch form curve and/or the occlusal plane. The user can select an option to adjust one or more interproximal (IP) contacts. An IP contact is a point of contact between two adjacent teeth in an arch. The user can select whether to anchor one or more molars in the upper arch and/or the lower arch. Anchoring the molars can be beneficial to ensure that the molars are not moved or affected my movement of other teeth when the motion data is applied to the teeth represented by the model.

The user can make any one or more of the selections represented by the operations 2226-2234. Any of the selected operations can be applied automatically, by the computer system, at the same time to the teeth represented by the model. For example, the user can make a selection to fit or snap the teeth to the arch form curve while anchoring the molars in place. Once the computer system adjusts the model according to these selections and the motion data is applied to the adjusted model, the computer system can generate/return output indicating that one or more of the teeth have been moved to snap to the arch form curve while the molars remain in place. One or more gaps may appear between the teeth as a result.

In some implementations, the user can provide additional user input in response to making any of the selections represented by the operations 2226-2234. For example, the user can click and drag on a specific tooth to move that tooth along the arch form curve. When the user clicks on the tooth, the tooth can be highlighted or otherwise colored in a different indicia than the non-selected teeth in the model. Refer to FIGS. 15-18 for further discussion about selecting teeth and visualizing the selected teeth in different indicia than non-selected teeth.

In some implementations, the user can select one or more options/manual tools for performing the auto setup of the teeth represented by the model. Such options/manual tools can include but are not limited to leveling molar buccallingual cusps, leveling molar marginal ridges, leveling bicuspid marginal ridges, leveling incisors, snapping all the teeth to the arch form curve, adjusting the IP contacts, and/or snapping all the teeth to the occlusal contact. Such tools can also be used interactively. For example, as described herein, the user can click and drag on any of the teeth represented in the model to affect any of the tools described above.

Optionally, the computer system can also adjust the model based on the user input that was received in operational operations 2224-2234 (operation 2236). As described above, the user can select an option, such as a button, to accept the selection(s) of manual tool(s) that the user made. Once the user selects the option, the computer system can automatically implement the actions described above. The adjusted model can be presented in real-time in the GUI at the user's computing device.

The computer system can apply the motion data to the adjusted model to detect collisions (operation 2238). Refer to blocks 2208-2222 for further discussion.

The computer system can then return the information about the detected collision(s) and teeth setup in operation 2240, as described above.

As described above, the computer system can iterate through the process 2200 and/or any number of operations in the process 2200 until a desired teeth setup and/or quantity/type of collisions are determined.

The process 2200 and any of the other processes described herein can be performed to design various types of teeth setups. For example, the process 2200 can be performed to design crowns, dentures, and/or other ortho procedures. The process 2200 and the other processes described herein can also be performed to match library dentures, crowns, and/or other teeth setups with computer-automated movements of the teeth represented by the model.

Figures 23A, 23B:
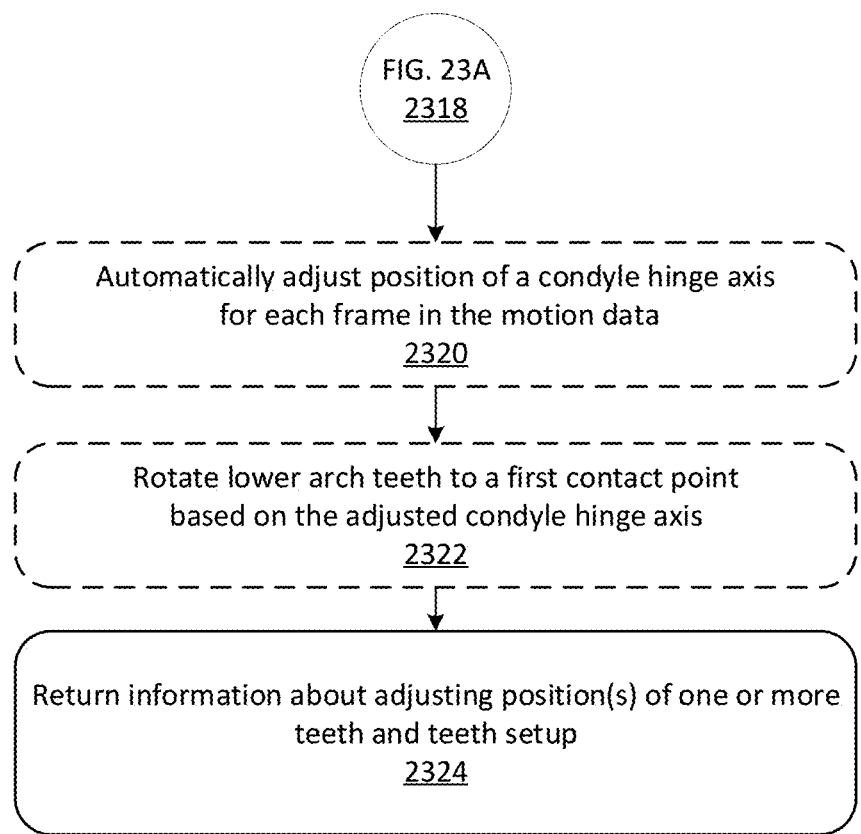
FIGS. 23A-B is a flowchart of another example process for applying motion data to a digital representation of teeth to determine a teeth setup.

FIGS. 23A-B is a flowchart of another example process 2300 for applying motion data to a digital representation of teeth to determine a teeth setup. The process 2300 can be performed by any of the systems and/or computing systems described herein. For illustrative purposes, the process 2300 is described from the perspective of a computer system.

Referring to the process 2300 in both FIGS. 23A-B, the computer system can receive a digital representation of a patient's jaw movement as motion data in operation 2302. Refer to operation 2202 in FIGS. 22A-C.

In operation 2304, the computer system can receive a model of at least a portion of upper and/or lower teeth of the patient. Refer to operation 2204 in FIGS. 22A-C.

The computer system may also receive user input indicating selection of a first set of teeth as moveable, a second set of teeth as fixed, and/or a third set of teeth as invisible (operation 2306). As described in reference to FIGS. 22A-C, the user can select any number of teeth to be identified as moveable, fixed, and/or invisible (e.g., ignored). Sometimes, for example, the user can select one tooth to be moveable. The user may not make any other selections in operation 2306. As another example, the user may only select one tooth to be fixed and may not make any other selections. As another example, the user can select one tooth per set. The user can make any other selection of teeth for one set, two sets, and/or all three sets. Refer to operation 2206 in FIGS. 22A-C for further discussion.

The computer system can apply the motion data to the model to move the first set of teeth along pathways that correspond to the motion data in operation 2308. Refer to operation 2208 in FIGS. 22A-C for further discussion.

For each frame in the motion data, the computer system can automatically adjust positioning of the first set of teeth to avoid interference(s) with the second and/or third sets of teeth (operation 2310). If the third set of teeth are identified (e.g., teeth deemed invisible or ignored), the computer system can automatically adjust positioning of the first set of teeth, regardless if they interfere with the third set of teeth. The computer system, however, can identify and output (e.g., in any of the GUIs described herein) indications of the first set of teeth interfering with or coming in contact with the second set of teeth, which are the non-moveable teeth. This output can help guide the user to determine a preferred teeth setup that may avoid or otherwise limit the identified interference and/or contact.

For example, the computer system can receive user input indication a motion correction to be made on a per tooth basis (operation 2312). As described herein, the user can click on and move (e.g., drag) a particular tooth into a different position, location, angle, torque, movement, or other motion. The user can also select multiple teeth at a time to correct their positioning as described above.

As another example, the computer system can automatically (or based on user input) correct motion in at least one of 6 degrees of freedom for one or more of the teeth represented by the model (block 2314). The degrees of freedom can include 3D translation along X, Y, and/or Z axis and/or 3D rotation about X, Y, and/or Z axis. A coordinate system used for each tooth can typically be relative the particular tooth, where the Z axis is vertical, the Y axis is buccal-lingual, and the X axis is medial-distal, as described throughout this disclosure. Refer to FIGS. 1, 2, 6, and 26A-B for further discussion about the coordinate system.

Additionally or alternatively, the computer system can apply a predetermined amount of position correction to the upper arch teeth and/or the lower arch teeth (operation 2316). The predetermined amount of position correction can be applied to one of the upper arch teeth and the lower arch teeth. In some implementations, the predetermined amount of position correction can be applied to both upper arch and lower arch teeth. The predetermined amount of position correction can be a threshold translation distance and/or a threshold rotation angle. The predetermined amount of position correction can be determined by the computer system or other computing systems and stored/accessible in a data store/data repository. The predetermined amount of position correction can be specific to particular types of teeth and/or other characteristics of the teeth.

Additionally or alternatively, the computer system can apply an amount of position correction to each of the upper and lower arch teeth based on a predetermined ratio of correction (operation 2318). For example, the determined amount of correction can be equally split between the upper arch teeth and the lower arch teeth (a ratio of 1:1). An equal amount of correction can then be applied to all the teeth. As other examples, the user can specify the ratio of correction. The ratio of correction can also be predetermined by a computing system and retrieved by the computer system from the data store in operation 2318. The ratio of correction can be any ratio, including but not limited to 1:2, 2:1, 1:3, 3:2, etc.

Figure 26A:
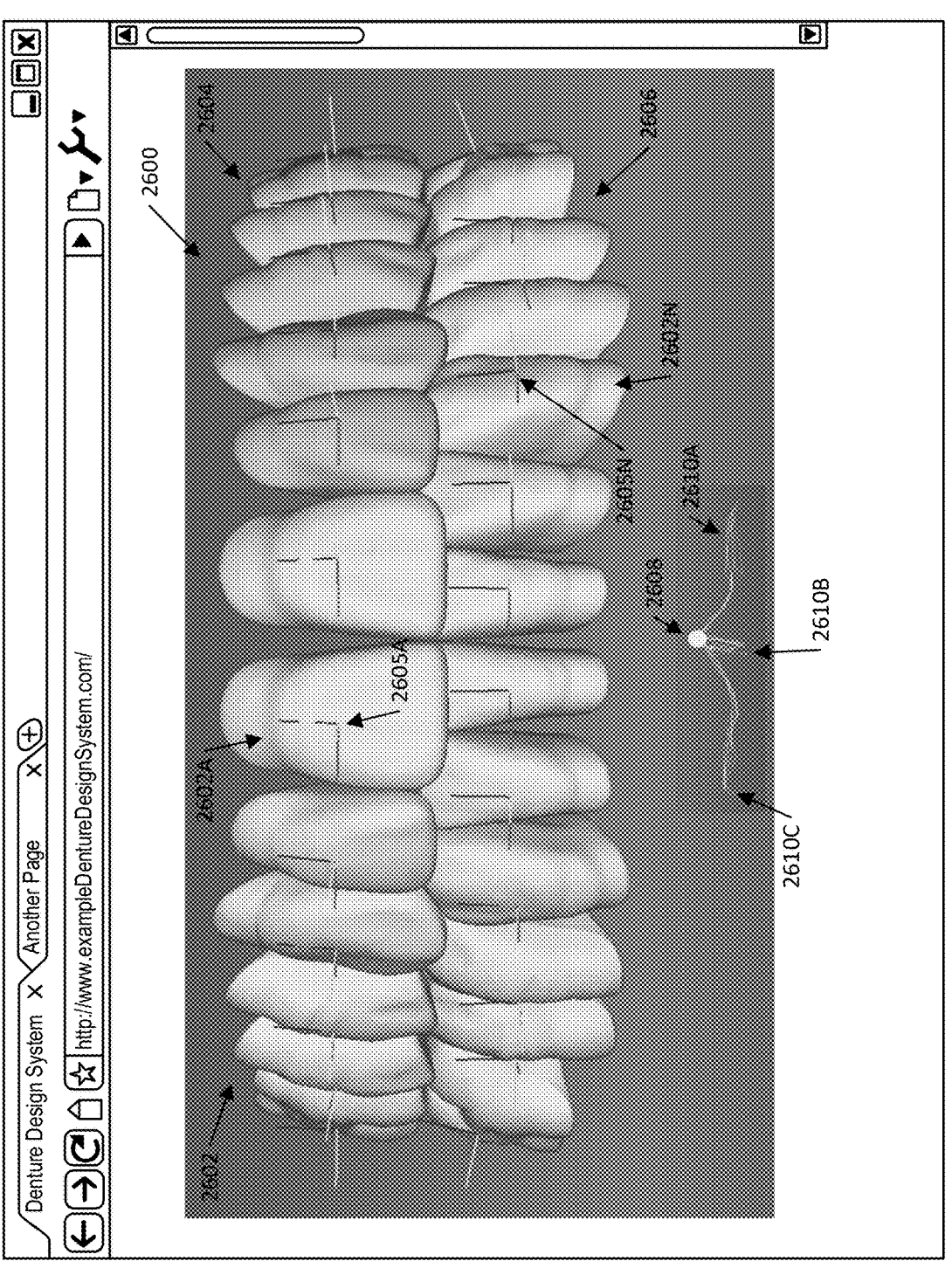
FIG. 26A is an example GUI screen of a denture tooth setup with a coordinate system attached to each tooth.
Figure 26B:
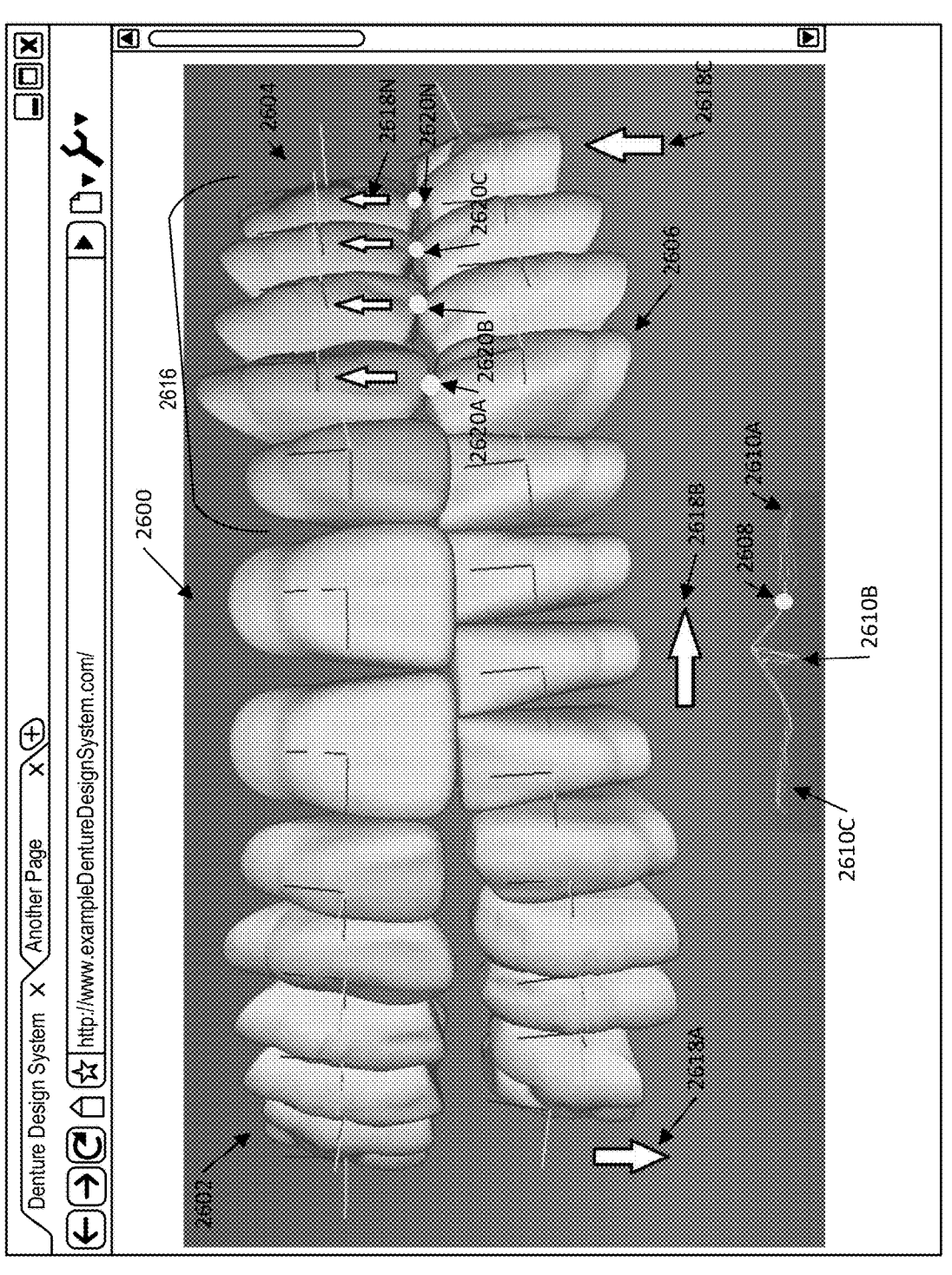
FIG. 26B is an example GUI screen of the denture tooth setup of FIG. 26A in which selected moveable upper teeth are repositioned to a first vertical contact.

Optionally, the computer system can automatically adjust a position of a condyle hinge axis for each frame in the motion data (operation 2320). In other words, the computer system can perform an auto-close motion of the teeth in the model in every frame of motion data in order to identify first contact between teeth at each frame. The condyle hinge axis can be determined based on opening and closing motions of the patient's mouth, which can be captured in the motion data. The computer system can then keep applying the movement to the condyle hinge axis in every frame to perform the auto-close motion and identify the first contact point between teeth in each frame. The condyle hinge axis can be repositioned, by the computer system, for each animation frame in the motion data and used to rotate the lower arch teeth closed to the first contact point (e.g., first contact of a lower fixed tooth contacting an upper fixed tooth). Refer to FIGS. 26A-B for a visual depiction of this adjustment of the teeth according to the condyle hinge axis.

As mentioned above, the computer system can also optionally rotate the lower arch teeth to a first contact point based on the adjusted condyle hinge axis (operation 2322). As another example of operation 2322, the computer system can move the first set of teeth (e.g., teeth that have been selected and/or identified as moveable) out of the way so that the desired first contact point can be achieved.

The computer system can then return information about adjusting the position(s) of one or more teeth and/or a teeth set in operation 2324. Refer to operation 2240 in the FIGS. 22A-C for further discussion.

Figure 24:
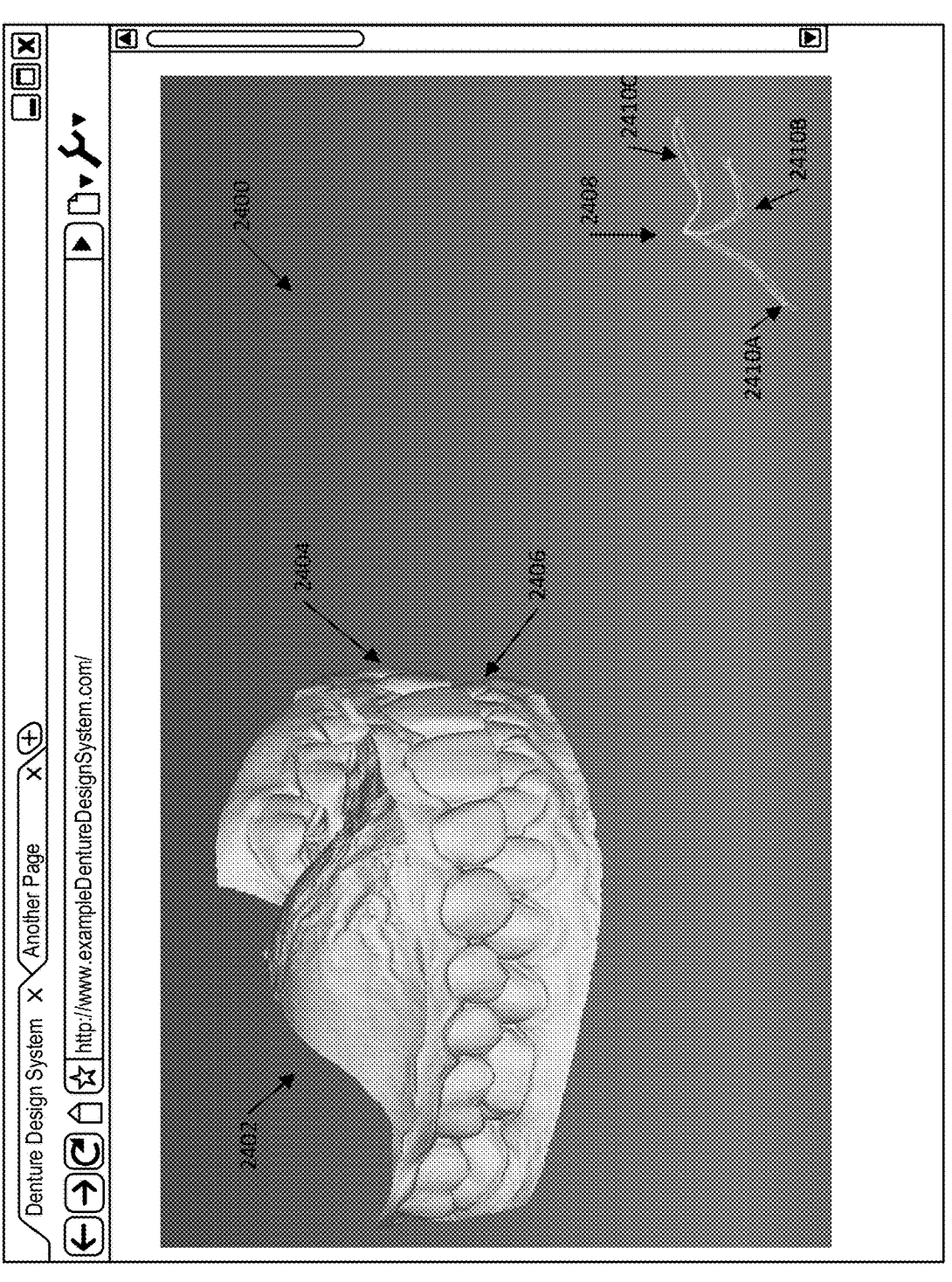
FIG. 24 is an example GUI screen for applying motion data to a digital representation of teeth.

FIG. 24 is an example GUI screen 2400 for applying motion data 2408 to a digital representation of teeth 2402. The digital representation of teeth 2402 can have at least a portion of upper arch teeth 2404 and at least a portion of lower arch teeth 2406. The motion data 2408 can be outputted in the GUI screen 2400 according to a coordinate system with visual indications of paths of motion taken during the motion capture described in reference to FIGS. 1 and 2. When the user selects an option to animate the digital representation of teeth 2402 according to the motion data 2408 (or the digital representation of teeth 2402 is automatically sent into motion by the computer system), the digital representation of teeth 2402 can move, in the GUI screen 2400, according to the axes of motion 2410A, 2410B, and 2410C (e.g., motion paths) shown as the motion data 2408. The axis of motion 2410A can indicate a leftward movement of the digital representation of teeth 2402. The axis of motion 2410C can indicate a rightward movement of the digital representation of teeth 2402. The axis of motion 2410B can indicate a forward movement (e.g., protrusive) of the digital representation of teeth 2402.

The example GUI screen 2400 can also be used for generating a functionally informed design guide based on applying the motion data to the digital representation of teeth 2402. For the motion represented by the axes 2410A, 2410B, and 2410C (e.g., motion paths), a functionally informed design guide can be generated, thereby showing the movement of the lower arch teeth 2406 relative the upper arch teeth 2404. The guide can be a form of a terrain map including ridges that mimic the movement of the lower arch teeth 2406 according to the motion data 2408. The guide can be used to design teeth and/or crowns that do not intersect with or go through the guide. The guide can be especially beneficial for accurate teeth setup when one or more teeth are identified as non-moveable teeth (e.g., the lower arch teeth 2406).

Figure 25:
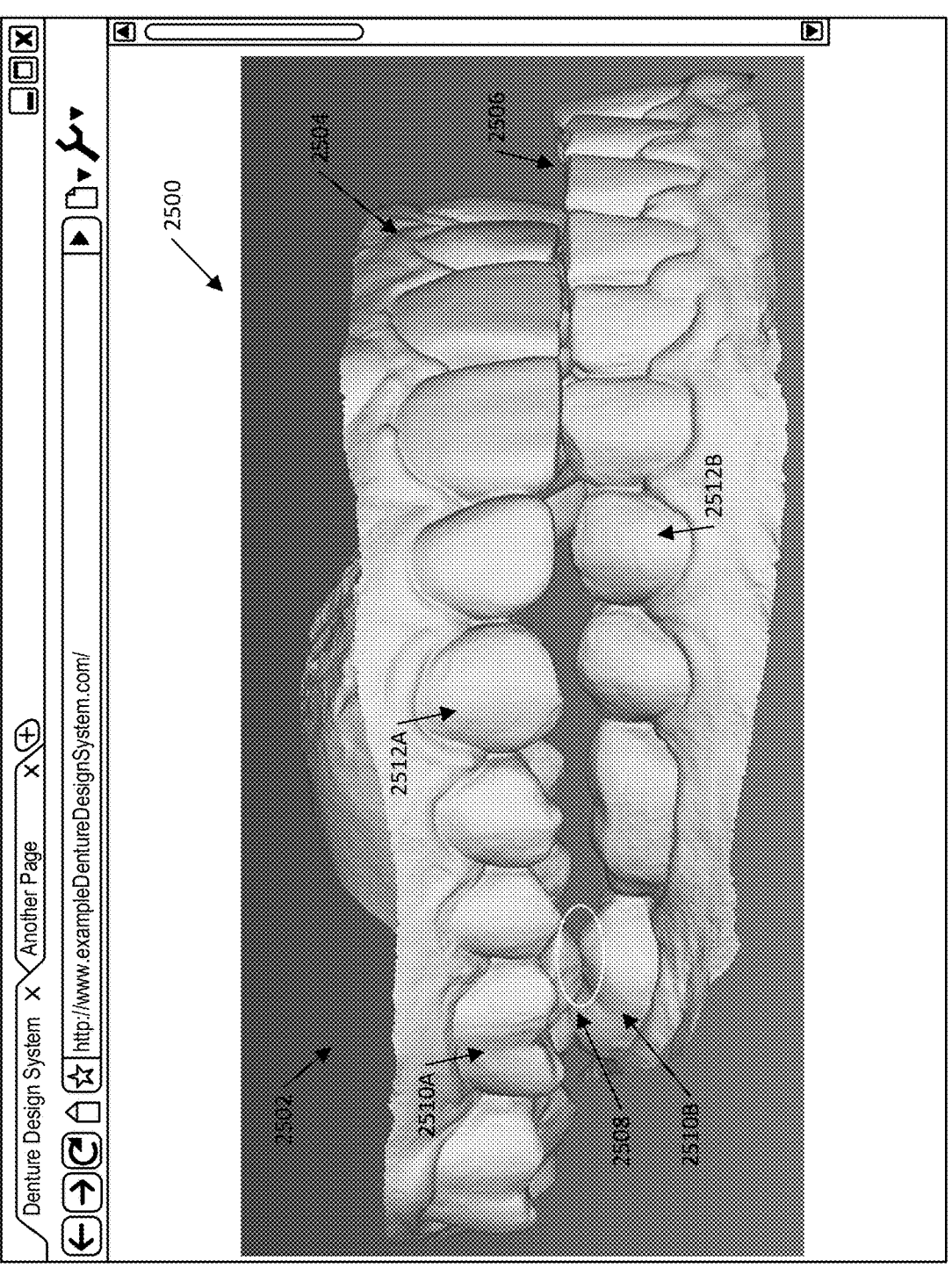
FIG. 25 is an example GUI screen for identifying a first contact point based on applying motion data to a digital representation of teeth.

FIG. 25 is an example GUI screen 2500 for identifying a first contact point 2508 based on applying motion data to a digital representation of teeth 2502. In this example, the digital representation of teeth 2502 includes upper arch teeth 2504 and lower arch teeth 2506. The first contact point 2508, when the digital representation of teeth 2502 is set into motion, occurs between molars 2510A and 2510B. This first contact point 2508 is molar cusp contact, which establishes a bite relationship during motion of the patient's jaw. This type of contact 2508 can be problematic for the patient's teeth. A preferred contact is between canines 2512A and 2512B. Thus, the user can view the GUI screen 2500 to determine how the digital representation of teeth 2502 should be set up with canine guidance so that the upper canine 2512A contacts the lower canine 2512B to provide the bite relationship (instead of the upper molar 2510A and the lower molar 2510B first coming into contact). The user can select any of the tools described above to cause the computer system to reposition one or more of the teeth to provide for the bite relationship between the canines 2512A and 2512B.

FIG. 26A is an example GUI screen 2600 of a denture tooth setup 2602 with a coordinate system 2605A-N attached to each tooth 2602A-N. The denture tooth setup 2602 can include upper arch teeth 2604 and lower arch teeth 2606. As described in reference to FIGS. 1, 2, and 6, each of the teeth 2602A-N can be assigned a respective coordinate system 2604A-N relative the particular tooth.

The GUI screen 2600 also shows a current motion 2608 of the denture tooth setup 2602 along motion pathways 2610A, 2610B, and/or 2610C. The current motion 2608 is approximately a centered view (e.g., front view) of the denture tooth setup 2602 before the denture tooth setup 2602 is set into motion along one of the pathways 2610A, 2610B, and/or 2610C. Refer to FIG. 24 for further discussion about the motion pathways 2610A-C.

FIG. 26B is the example GUI screen 2600 of the denture tooth setup 2602 of FIG. 26A in which selected moveable upper teeth 2616 have been repositioned (e.g., moved) to make first vertical contact 2620A-N with at least a portion of the lower arch teeth 2606. In this example, the lower arch teeth 2606 can be set into motion, as indicated by arrows 2618A-N, and only the selected moveable teeth 2616 may be automatically repositioned, by the computer system. The GUI screen 2600 has also been updated to show that the current motion 2608 of the lower arch teeth 2606 is along the motion pathway 2610A. At the current motion 2608, the selected moveable upper teeth 2616 make the first vertical contact 2620A-N with respective teeth of the lower arch teeth 2606.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for setting up a digital dental model, the method comprising:

receiving, at a treatment planning and appliance design system, a digital dental model for a patient and motion data corresponding to a series of jaw movements performed by the patient and recorded by a motion capture system, wherein the digital dental model comprises (i) a plurality of digital tooth models that each represent an individual tooth, (ii) upper dental arch information (a) identifying a first subset of the plurality of digital tooth models as upper teeth and (b) defining a position and orientation for the upper teeth relative to each other, and (iii) lower dental arch information (a) identifying a second subset of the plurality of digital tooth models as lower teeth and (b) defining a position and orientation for the lower teeth relative to each other;

identifying, by the treatment planning and appliance design system, tooth landmarks for the plurality of digital tooth models based on the upper dental arch information and the lower dental arch information, wherein the tooth landmarks include cusp tip landmarks;

determining, by the treatment planning and appliance design system, curves of Spee and Wilson for the digital dental model based on the cusp tip landmarks;

determining, by the treatment planning and appliance design system, a curved occlusal surface based on the curves of Spee and Wilson;

positioning, by the treatment planning and appliance design system, (i) the first subset of the plurality of digital tooth models representing the upper teeth and (ii) the second subset of the plurality of digital tooth models representing the lower teeth in the digital dental model based on the curved occlusal surface;

iteratively repositioning, by the treatment planning and appliance design system, at least a first portion of the digital dental model comprising the first subset of the plurality of digital tooth models by adjusting the position and orientation for the upper teeth relative to each other;

iteratively repositioning, by the treatment planning and appliance design system, at least a second portion of the digital dental model comprising the second subset of the plurality of digital tooth models by adjusting the position and orientation for the upper teeth relative to each other and relative to the adjusted position and orientation of the first subset of the plurality of digital tooth models;

receiving, by the treatment planning and appliance design system, user input indicating selection of at least one tooth represented by the digital dental model as a moveable tooth, wherein the movable tooth is moveable within a position, by the computing system, when the motion data is applied to the digital dental model;

receiving, by the treatment planning and appliance design system, user input indicating selection of a second tooth as a fixed tooth, wherein the fixed tooth remains in a fixed position when the motion data is applied to the digital dental model;

automatically moving, by the treatment planning and appliance design system, the selected at least one tooth that corresponds the moveable tooth;

automatically adjusting, by the treatment planning and appliance design system, the position of the moveable tooth based on detecting at least one collision of the moveable tooth with other teeth represented by the digital dental model when the motion data is applied to the digital dental model, wherein the computing system determines the adjusted position of the moveable tooth as a new position of the moveable tooth in which the moveable tooth does not interfere with the other teeth represented by the digital dental model; and returning, by the treatment planning and appliance design system, the repositioned digital dental model as appliance data configured to be used by a fabrication system to fabricate a dental appliance corresponding to the repositioned digital dental model.

2. The method of claim 1, wherein returning, by the treatment planning and appliance design system, the repositioned digital dental model comprises outputting the repositioned digital dental model in a graphical user interface (GUI) display at a user computing device.

3. The method of claim 1, wherein the digital dental model represents at least a portion of upper teeth and at least a portion of lower teeth of the patient.

4. The method of claim 1, wherein the position of the moveable tooth is automatically adjusted, by the treatment planning and appliance design system, for each frame in the motion data.

5. The method of claim 1, wherein automatically adjusting, by the treatment planning and appliance design system, the position of the moveable tooth comprises at least one of a group consisting of: (i) translating the position of the moveable tooth along an X axis, (ii) translating the moveable tooth along a Y axis, (iii) translating the moveable tooth along a Z axis, (iv) rotating the moveable selected tooth about the X axis, (v) rotating the moveable tooth about the Y axis, and (vi) rotating the moveable tooth about the Z axis, wherein the method further comprises applying, by the treatment planning and appliance design system, a coordinate system to each tooth represented by the digital dental model, the coordinate system relative the tooth, wherein the Z axis is in a vertical dimension, the Y axis is buccal-lingual, and the X axis is mesial-distal.

6. The method of claim 1, wherein the at least one collision includes the moveable tooth passing through at least one other tooth that is in vertical alignment with the moveable tooth.

7. The method of claim 1, wherein automatically adjusting, by the treatment planning and appliance design system, the position of the moveable tooth comprises at least one of rotating the moveable tooth, adjusting a height of the moveable tooth, torqueing the moveable tooth, and adjusting an angle of the moveable tooth.

8. The method of claim 1, wherein automatically adjusting, by the treatment planning and appliance design system, the position of the moveable tooth is based on a current position of the moveable tooth preventing a first contact between one or more teeth during a natural jaw movement of the patient.

9. The method of claim 1, wherein automatically adjusting, by the treatment planning and appliance design system, the position of the moveable tooth is based on adjusting a current position of the moveable tooth to achieve a predetermined type of first contact between one or more teeth during a natural jaw movement of the patient.

10. The method of claim 1, further comprising receiving, by the treatment planning and appliance design system, user input indicating selection of a third tooth as an ignored tooth, wherein the ignored tooth remains in a fixed position when the motion data is applied to the digital dental model and the moveable tooth is configured to pass through or contact the ignored tooth.

11. The method of claim 1, wherein automatically adjusting, by the treatment planning and appliance design system, the position of the moveable tooth comprises adjusting the position of the moveable tooth until a threshold position limit is met, wherein the threshold position limit indicates a maximum amount of distance the moveable tooth is moveable in a vertical or horizontal direction while remaining in a gum tissue of the patient.

12. The method of claim 1, wherein automatically adjusting, by the treatment planning and appliance design system, the position of the moveable tooth comprises adjusting an angle of the moveable tooth until a threshold angle movement is met.

13. The method of claim 1, wherein automatically adjusting, by the treatment planning and appliance design system, the position of the moveable tooth comprises adjusting the position of the moveable tooth until a threshold amount of contact is met between the moveable tooth and another tooth.

14. The method of claim 1, wherein repositioning, by the treatment planning and appliance design system, the digital dental model comprises performing the steps of receiving the user input indicating selection of the moveable tooth, automatically moving the moveable tooth, and automatically adjusting the position of the moveable tooth.

15. The method of claim 1, further comprising:

receiving, by the treatment planning and appliance design system, user input indicating selection of at least one manual tool to adjust one or more teeth represented by the digital dental model;

automatically adjusting, by the treatment planning and appliance design system, the one or more teeth represented by the digital dental model based on the user-selected manual tool; and applying, by the treatment planning and appliance design system, the motion data to the adjusted teeth represented by the digital dental model to determine at least one of interferences, collisions, and a teeth setup.

16. The method of claim 15, wherein the user input includes selection of at least one of a group comprising a manual tool to: (i) display tooth datums overlaying the teeth represented by the digital dental model in a GUI display at a user computing device, (ii) adjust one or more of the tooth datums as the tooth datums overlay the teeth in the GUI display, (iii) display an arch form curve overlaying at least a portion of the teeth represented by the digital dental model in the GUI display, (iv) adjust one or more points of the arch form curve as the arch form curve and the one or more points overlay the at least portion of the teeth in the GUI display, (v) set the occlusal guidance surface for the at least portion of the teeth, (vi) snap at least another portion of the teeth to the occlusal guidance surface, (vii) anchor at least one user-selected tooth, (viii) snap the user-selected tooth to a predetermined reference point, and (vix) adjust a position of the user-selected tooth.

17. The method of claim 1, wherein repositioning, by the treatment planning and appliance design system, the digital dental model comprises:

automatically adjusting a position of a condyle hinge axis for each frame in motion data;

rotating at least a portion of lower teeth represented by the digital dental model to a first contact point based on the adjusted condyle hinge axis; and returning a tooth setup indicating an arrangement of the portion of lower teeth based on the first contact point.

18. The method of claim 1, wherein returning, by the treatment planning and appliance design system, the repositioned digital dental model comprises generating a digital representation of a dental appliance based on the repositioned digital dental model.

19. The method of claim 18, wherein the digital representation of the dental appliance includes instructions for manufacturing the dental appliance.

20. The method of claim 19, further comprising transmitting, by the computing system, at least one of the digital representation of the dental appliance and the instructions for manufacturing the dental appliance to a rapid fabrication machine configured to fabricate the dental appliance.

21. The method of claim 18, further comprising:

transmitting, by the treatment planning and appliance design system, the digital representation of the dental appliance to a user computing device for presentation in a GUI display at the user computing device;

receiving, by the treatment planning and appliance design system, user input indicating one or more adjustments to the digital representation of the dental appliance; and automatically adjusting, by the treatment planning and appliance design system, the digital representation of the dental appliance based on the received user input.

22. The method of claim 18, wherein the dental appliance is at least one of dentures, a crown, and an aligner.

23. The method of claim 1, wherein the motion data comprises inferred motion data for the patient.

24. The method of claim 1, wherein the motion data comprises actual motion data captured from the patient.

* * * * *